United States Patent
Takahashi et al.

(10) Patent No.: US 11,343,559 B2
(45) Date of Patent: May 24, 2022

(54) METHOD AND APPARATUS FOR RECEIVING, SENDING AND DATA PROCESSING INFORMATION RELATED TO TIME SUCH AS LEAP SECOND AND DAYLIGHT SAVING TIME (DST)

(71) Applicant: Saturn Licensing LLC, New York, NY (US)

(72) Inventors: Kazuyuki Takahashi, Chiba (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 17/025,844

(22) Filed: Sep. 18, 2020

(65) Prior Publication Data

US 2021/0105524 A1 Apr. 8, 2021

Related U.S. Application Data

(63) Continuation of application No. 15/765,646, filed as application No. PCT/JP2016/078984 on Sep. 30, 2016, now Pat. No. 10,798,439.

(30) Foreign Application Priority Data

Oct. 15, 2015 (JP) .............................. JP2015-204124

(51) Int. Cl.
*H04N 21/43* (2011.01)
*H04N 21/84* (2011.01)
(Continued)

(52) U.S. Cl.
CPC .......... *H04N 21/4307* (2013.01); *G04G 5/00* (2013.01); *H04L 7/00* (2013.01); *H04N 21/43* (2013.01);
(Continued)

(58) Field of Classification Search
CPC ...... G04G 5/00; H04N 21/43; H04N 21/4302; H04N 21/4307; H04N 21/4622; H04N 21/84; H04N 21/4305; H04L 7/00
See application file for complete search history.

(56) References Cited

U.S. PATENT DOCUMENTS

| 6,563,765 B1 | 5/2003 | Ishigaki |
| 2003/0163480 A1* | 8/2003 | Takahashi ............... G06F 16/78 |

(Continued)

FOREIGN PATENT DOCUMENTS

| CN | 1537386 | 10/2004 |
| CN | 101141582 | 3/2008 |

(Continued)

OTHER PUBLICATIONS

Partial Supplementary European Search Report dated Jul. 2, 2018 in corresponding European Patent Application No. 16855275.0 (12 pages).

(Continued)

*Primary Examiner* — Paulos M Natnael
(74) *Attorney, Agent, or Firm* — Chris Kolefas

(57) ABSTRACT

A receiving apparatus is provided. The receiving apparatus includes circuitry configured to receive reference time information and metadata including information for executing processing related to the reference time information. The circuitry is configured to execute processing related to the reference time information based on the metadata. The metadata includes a first offset value between the reference time information and a discontinuous time, a second offset value between the discontinuous time and a local time, and a date and time at which a change in a daylight savings time (DST) status is to occur. The local time is determined based on the reference time information and the metadata.

13 Claims, 39 Drawing Sheets

(51) Int. Cl.
*H04N 21/462* (2011.01)
*G04G 5/00* (2013.01)
*H04L 7/00* (2006.01)

(52) U.S. Cl.
CPC ..... *H04N 21/4302* (2013.01); *H04N 21/4622* (2013.01); *H04N 21/84* (2013.01)

(56) References Cited

U.S. PATENT DOCUMENTS

| | | |
|---|---|---|
| 2003/0233654 A1 | 12/2003 | Tsukamoto et al. |
| 2009/0089078 A1 | 4/2009 | Bursey |
| 2014/0280200 A1 | 9/2014 | Dwan |
| 2014/0282791 A1 | 9/2014 | Schmidt |
| 2014/0366068 A1 | 12/2014 | Burkitt et al. |
| 2015/0185706 A1 | 7/2015 | Hasegawa et al. |
| 2015/0198928 A1 | 7/2015 | Hasegawa |
| 2015/0253740 A1 | 9/2015 | Nishijima et al. |
| 2016/0359603 A1 | 12/2016 | Fay |
| 2017/0019688 A1 | 1/2017 | Lee et al. |
| 2017/0257647 A1 | 9/2017 | Iguchi et al. |
| 2017/0277141 A1 | 9/2017 | Sekitsuka et al. |
| 2017/0359611 A1 | 12/2017 | Iguchi et al. |
| 2018/0227626 A1* | 8/2018 | Nakazawa ............ H04H 20/30 |
| 2019/0053013 A1 | 2/2019 | Markhovsky et al. |

FOREIGN PATENT DOCUMENTS

| | | |
|---|---|---|
| JP | 2010-141530 | 6/2010 |
| JP | 2010-252130 | 11/2010 |
| JP | 2015-132537 | 7/2015 |
| WO | WO 2015/105400 A1 | 7/2015 |

OTHER PUBLICATIONS

International Search Report dated Dec. 13, 2016 in Application PCT/JP2016/078984.
Digital Hoso ni Okeru MMT ni yoru Media Transport Hoshiki, ARIB STD-B60 1.0 edition, MMT-Based Media Transport Scheme in Digital Broadcasting Systems, Association of Radio Industries and Businesses, Jul. 31, 2014, 7 pages (with English translation).
ATSC (Advanced Television Systems Committee) Standard: Program and System Information Protocol for Terrestrial Broadcast and Cable, Aug. 7, 2013 (142 pages).
Extended European Search Report dated Oct. 4, 2018 in corresponding European Patent Application No. 16855275.0 (11 pages).

* cited by examiner

FIG. 4

| Syntax | No of Bits | Format |
|---|---|---|
| daylight_saving() { | | |
|     DS_status | 1 | bslbf |
|     reserved | 2 | '11' |
|     DS_day_of_month | 5 | uimsbf |
|     DS_hour | 8 | uimsbf |
| } | | |

FIG. 5

| Conditions | DS_status | DS_day_of_month | DS_hour |
|---|---|---|---|
| At the beginning of the year (January) daylight saving is off. This is the status of the fields until: | '0' | 0 | 0 |
| When the transition into daylight saving time is between one day less than one month away and the actual transition, the DS_day_of_month field takes the value day_in, and the DS_hour field taks the value hour_in. The DS_status bit is 0 indicating it is not yet daylight saving time. (The transition is to occur on the day_in day of the month at hour=hour_in, for example, if the transition were on April 15 at 2 a.m., then day_in=15 and hour_in=2) | '0' | day_in | hour_in |
| After all time zone daylight transitions (within the span of the network) have occurred, the DS_status bit takes the value 1, indicating that daylight saving time is on. The DS_day_of_month field and the DS_hour field take the value 0. (In the U.S., this transition has to occur no later than 7 p.m. Pacific Time on the day day_in). This is the status of the fields until: | '1' | 0 | 0 |
| When the transition out of daylight saving time is between one day less than one month away and the actual transition, the DS_day_of_month field takes the value day_out, and the DS_hour field takes the value hour_out. The DS_status bit is 1 indicating it is still daylight saving time. (The transition is to occur on the day_out day of the month at hour=hour_out, for example, if the transition were on October 27 at 2 a.m., then day_out=27 and hour_out=2) | '1' | day_out | hour_out |
| After all time zones (within the span of the network) have shifted out of daylight saving time, the DS_status bit takes the value 0, indicating that daylight saving time is off. The DS_day_of_month field and the DS_hour field take the value 0. (In the U.S., this transition has to occur no later than 7 p.m. Pacific on the day day_out). This finishes the cycle. | '0' | 0 | 0 |

FIG. 6

| No. | TIME INFORMATION MODE | TIME FORMAT | CLOCK SYNC | COMPONENT (UTC) | COMPONENT (NON-UTC) | ESG (UTC) | ESG (NON-UTC) | TIME DISPLAY & ESG DISPLAY |
|---|---|---|---|---|---|---|---|---|
| 1-1 | UTC MODE A | UTC | • OFFSET VALUE CORRECTION (LEAP SECOND) | • CORRECTION NOT REQUIRED | - | • CORRECTION NOT REQUIRED | - | • TIME ZONE CORRECTION • DST CORRECTION |
| 1-2 | UTC MODE B | UTC | | - | • COMPONENT TIME ZONE CORRECTION (TIME ZONE -> LOCAL TIME) | - | • ESG TIME ZONE CORRECTION (TIME ZONE -> LOCAL TIME) | • CORRECTION NOT REQUIRED |
| 2-1 | PTP MODE A | PTP | • CORRECTION NOT REQUIRED | • CORRECTION NOT REQUIRED | - | • CORRECTION NOT REQUIRED | - | • OFFSET VALUE CORRECTION (PTP-UTC OFFSET) • TIME ZONE CORRECTION • DST CORRECTION |
| 2-2 | PTP MODE B | PTP | | - | • COMPONENT TIME ZONE CORRECTION (TIME ZONE -> LOCAL TIME) | - | • ESG TIME ZONE CORRECTION (TIME ZONE -> LOCAL TIME) | • OFFSET VALUE CORRECTION (PTP-UTC OFFSET) |
| 3-1 | LOCAL TIME MODE A | LOCAL TIME | • OFFSET VALUE CORRECTION (LEAP SECOND + DST) | • COMPONENT TIME ZONE CORRECTION (UTC -> LOCAL TIME) | - | • ESG TIME ZONE CORRECTION (UTC -> LOCAL TIME) | - | • CORRECTION NOT REQUIRED |
| 3-2 | LOCAL TIME MODE B | LOCAL TIME | | - | • COMPONENT TIME ZONE CORRECTION (TIME ZONE -> LOCAL TIME) | - | • ESG TIME ZONE CORRECTION (TIME ZONE -> LOCAL TIME) | • CORRECTION NOT REQUIRED |

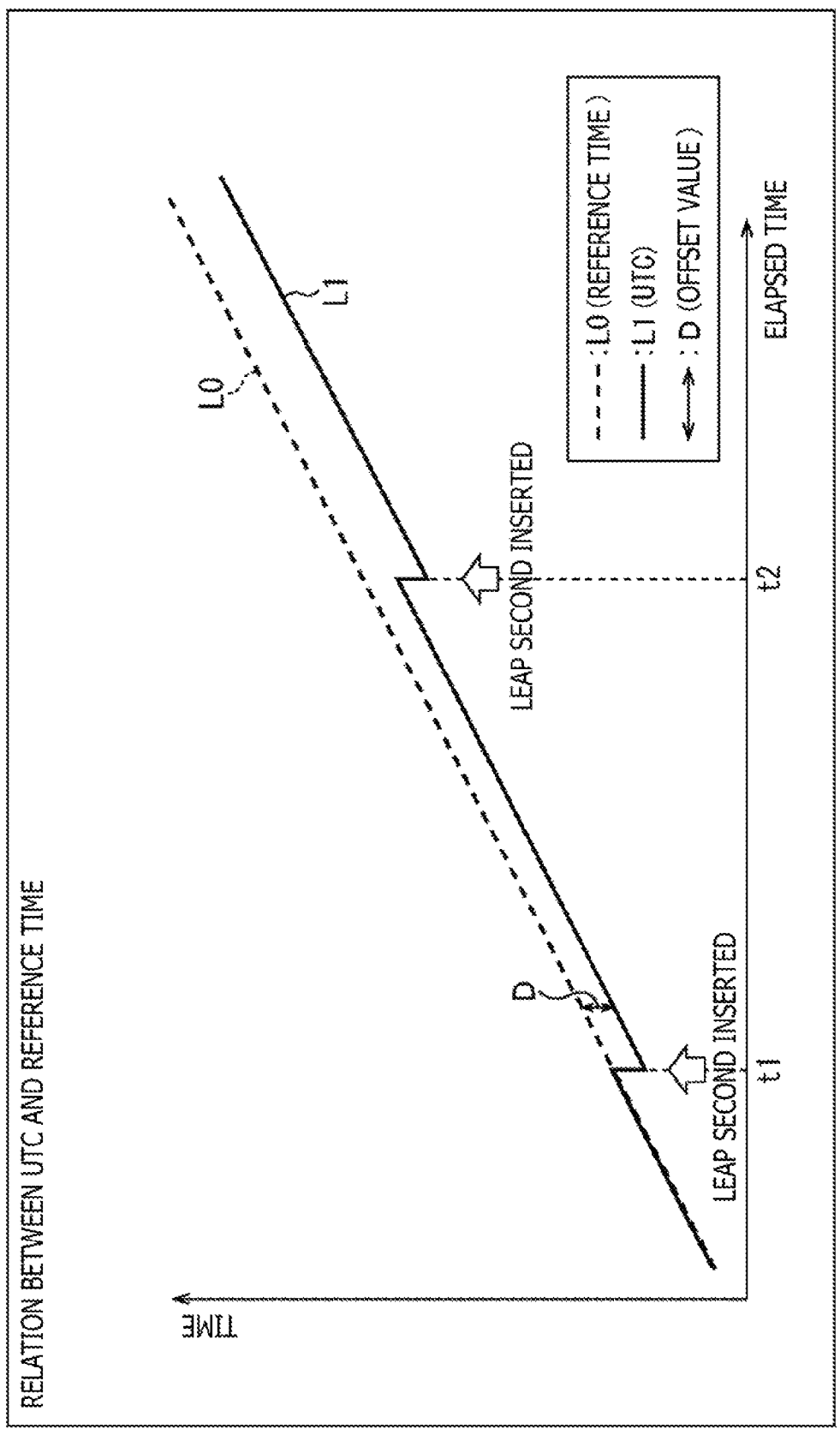

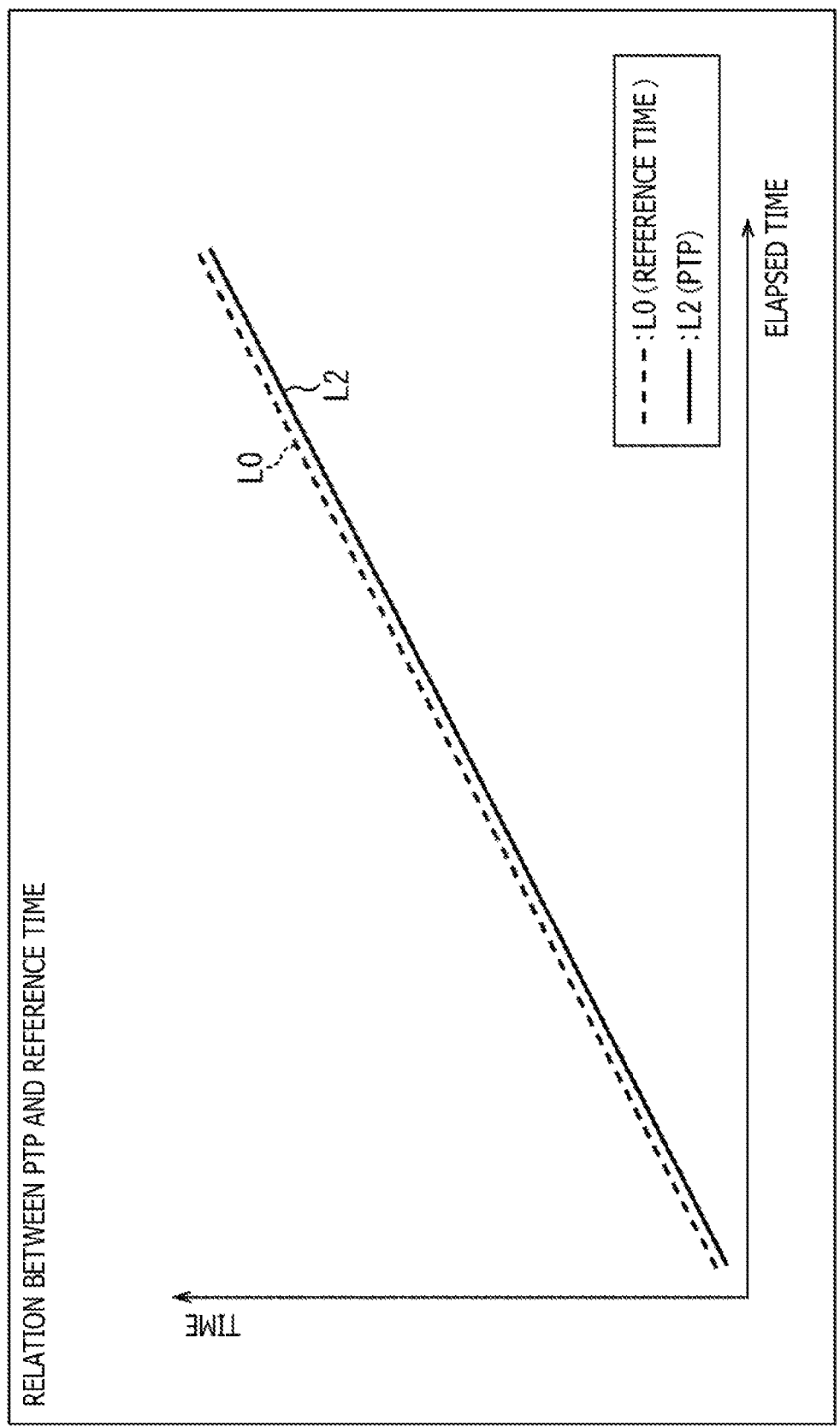

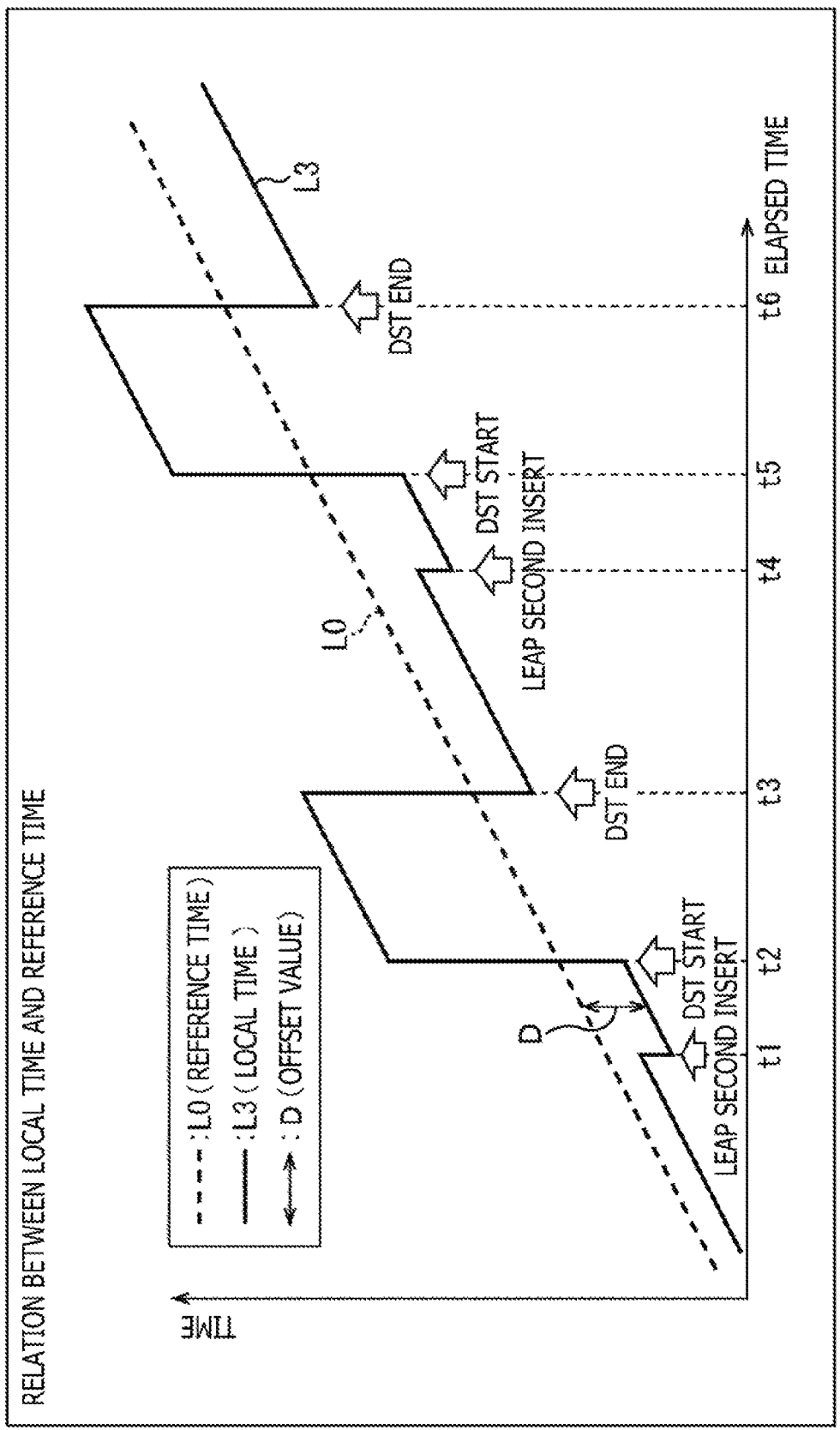

FIG. 11

| Parameter | No. of Bits | Scale Factor (LSB) | Effective Range*** | Units |
|---|---|---|---|---|
| $A_0$ | 32* | $2^{-30}$ | | seconds |
| $A_1$ | 24* | $2^{-50}$ | | sec/sec |
| $\Delta t_{LS}$ | 8 | 1 | | seconds |
| $t_{ot}$ | 8 | $2^{12}$ | 602,112 | seconds |
| $WN_t$ | 8 | 1 | | weeks |
| $WN_{LSF}$ | 8 | 1 | | weeks |
| $DN$ | 8**** | 1 | 7 | days |
| $\Delta t_{LSF}$ | 8* | 1 | | seconds |

\* Parameters so indicated are two's complement, with the sign bit (+ or −) occupying the MSB.
\*\* See Figure 2-8 for complete bit allocation in subframe.
\*\*\* Unless otherwise indicated in this column, effective range is the maximum range attainable with indicated bit allocation and scale factor.
\*\*\*\* Rigth justified.

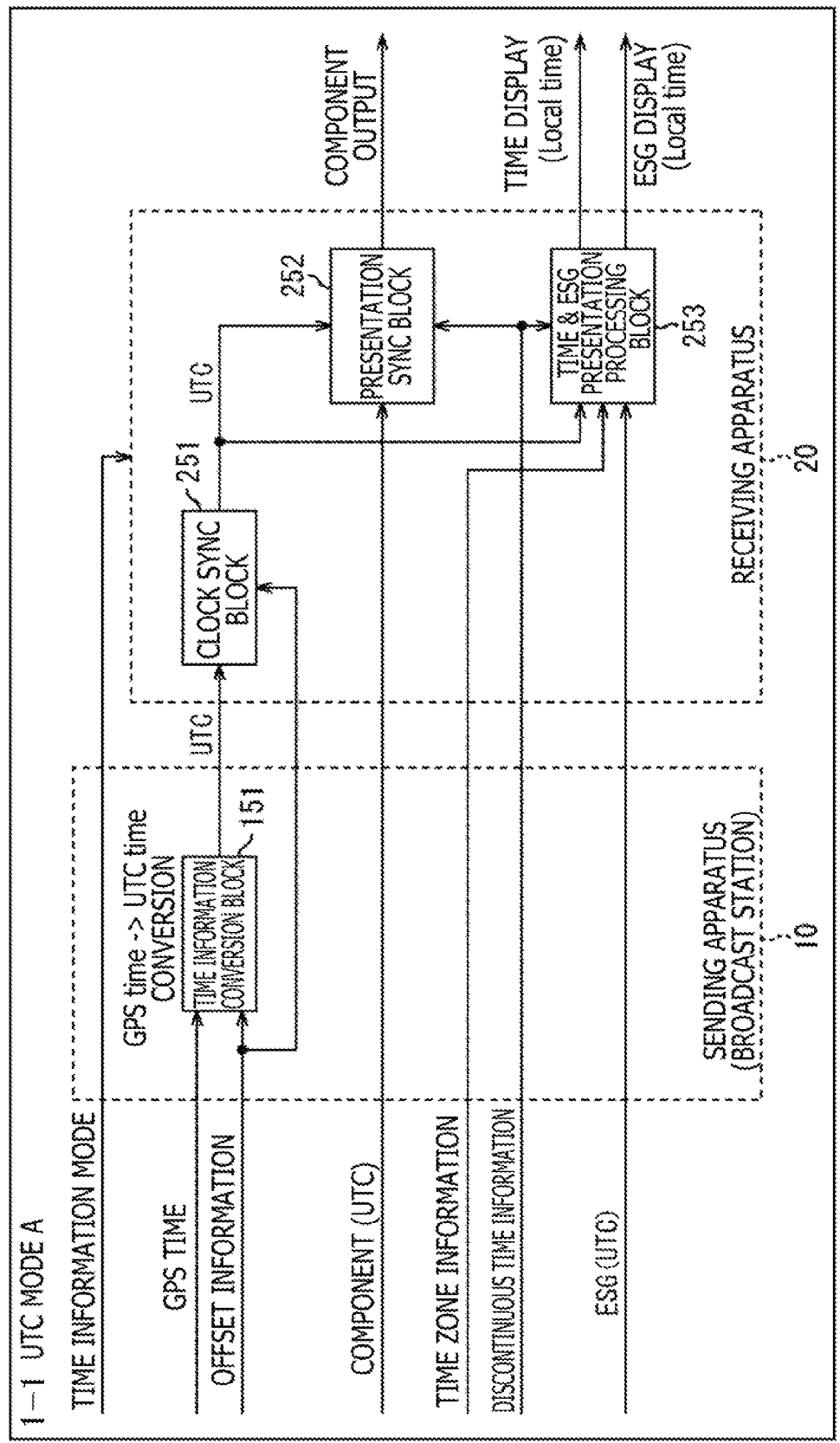

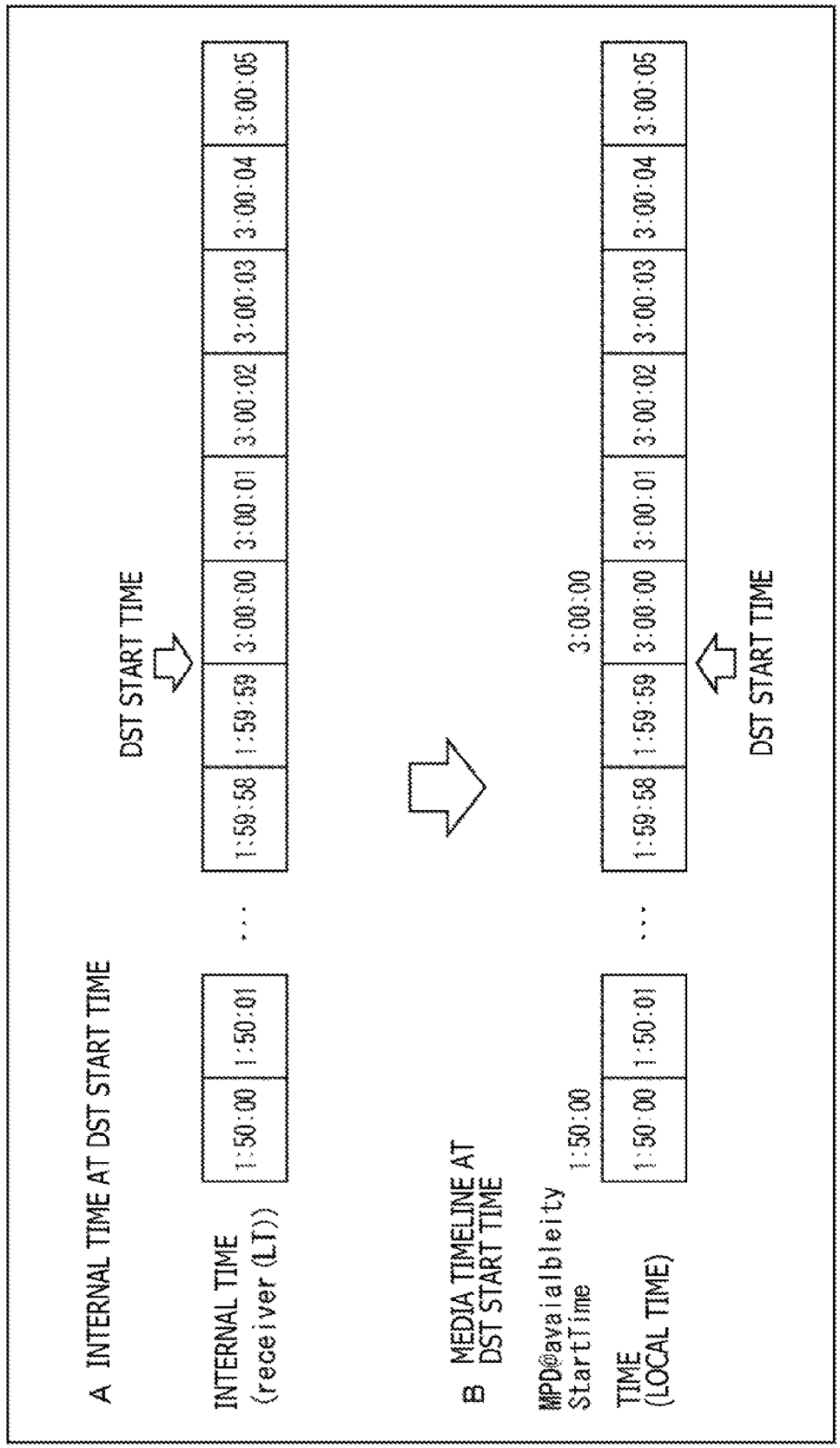

FIG. 24

| Syntax | No of Bits | Mnemonic | Semantics |
|---|---|---|---|
| time_info () { | | | |
| time_mode | 3 | uimsbf | FORMAT OF TIME INFORMATION e.g. 0: UTC, 1: PTP, 2: Local time |
| timezone | 5 | uimsbf | TIME ZONE (+/-12 TO UTC) |
| timeOffset | 16 | tcimsbf (two's complement integer, most significant bit first) | OFFSET VALUE BETWEEN REFERENCE TIME AND DISCONTINUOUS TIME (REFERENCE TIME SPECIFIED BY STANDARD (PTP, FOR EXAMPLE)) |
| nextTimeJumpday | 8 | uimsbf | DATE ON WHICH TIME BECOMES DISCONTINUOUS NEXT |
| nextTimeJumphour | 8 | uimsbf | TIME AT WHICH TIME BECOMES DISCONTINUOUS NEXT |
| timeJumpValue | 16 | tcimsbf | VARIATION OF TIME THAT BECOMES DISCONTINUOUS NEXT TYPE |
| timeJumpType | 3 | bslbf | TYPE OF TIME AT WHICH TIME BECOMES DISCONTINUOUS NEXT e.g. 0: LEAP SECOND, 1: DST |
| media_timezone | 5 | uimsbf | TIME ZONE OF MEDIA (COMPONENT) |
| reserved | 3 | bslbf | |
| esg_timezone | 5 | uimsbf | TIME ZONE OF ESG |
| } | | | |

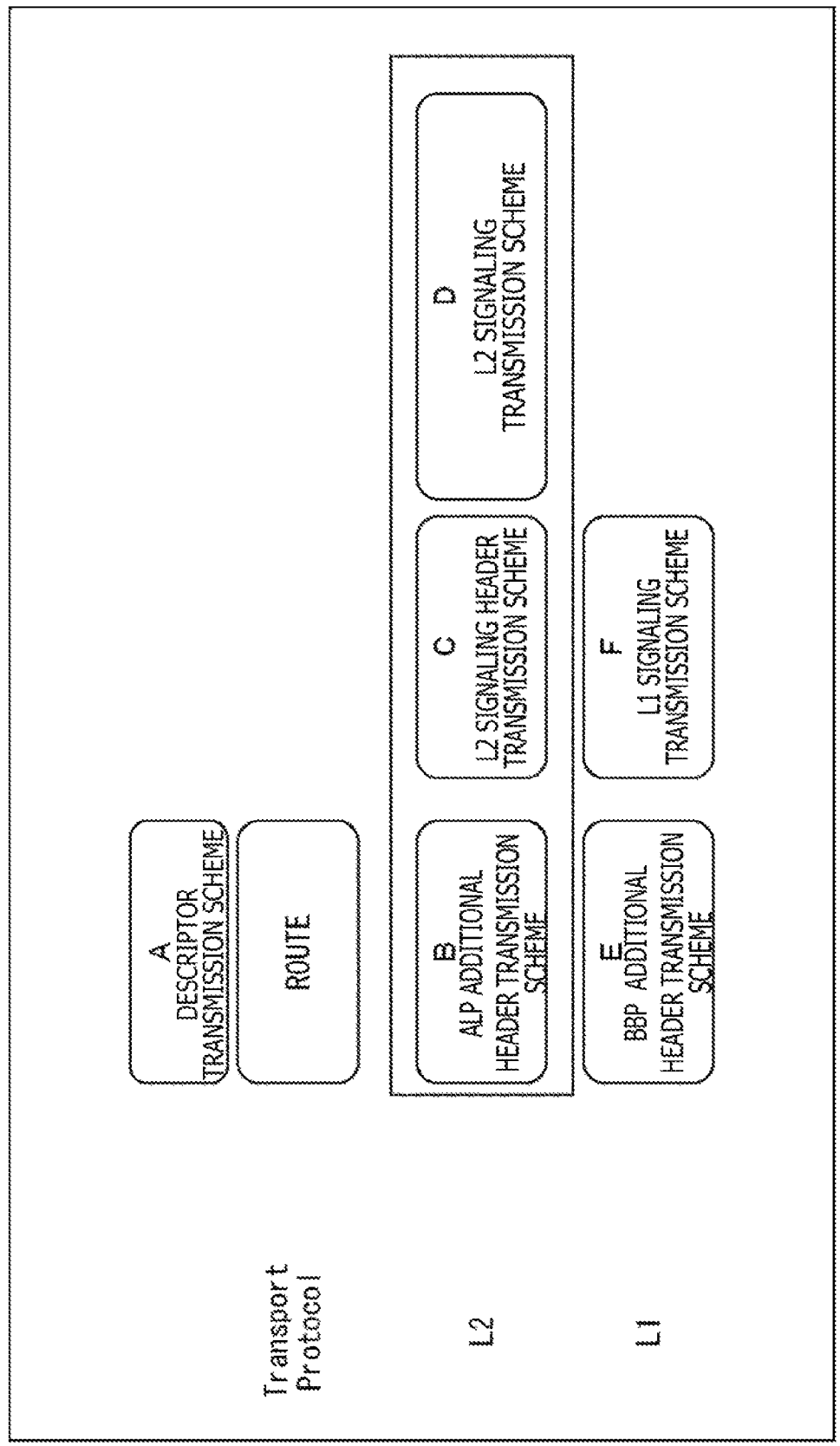

FIG. 27

A DESCRIPTOR TRANSMISSION SCHEME

| Syntax | No of Bits | Mnemonic | Semantics |
|---|---|---|---|
| time_info(){ | | | |
| time_info_id | 8 | uimsbf | ID INDICATIVE OF TYPE OF DESCRIPTOR |
| time_mode | 3 | uimsbf | FORMAT OF TIME INFORMATION e.g. 0: UTC, 1: PTP, 2: Local time |
| timezone | 5 | uimsbf | TIME ZONE (+/-12 TO UTC) |
| timeOffset | 16 | tcimsbf (two's complement integer, most significant bit first) | OFFSET VALUE BETWEEN REFERENCE TIME AND DISCONTINUOUS TIME (REFERENCE TIME SPECIFIED BY STANDARD (PTP, FOR EXAMPLE)) |
| nextTimeJumpday | 8 | uimsbf | DATE ON WHICH TIME BECOMES DISCONTINUOUS NEXT |
| nextTimeJumphour | 8 | uimsbf | TIME AT WHICH TIME BECOMES DISCONTINUOUS NEXT |
| timeJumpValue | 16 | tcimsbf | VARIATION OF TIME THAT BECOMES DISCONTINUOUS NEXT TYPE |
| timeJumpType | 3 | bslbf | TYPE OF TIME AT WHICH TIME BECOMES DISCONTINUOUS NEXT e.g. 0: LEAP SECOND, 1: DST |
| media_timezone | 5 | uimsbf | TIME ZONE OF MEDIA (COMPONENT) |
| reserved | 3 | bslbf | |
| esg_timezone | 5 | uimsbf | TIME ZONE OF ESG |
| } | | | |

FIG. 31

| LLS Index | Object Version | time_info |

- LLS Index: index value for delivery object of compression scheme, type, type extension for each fragment type
- Object Version: version of fragment object

FIG. 32

D) L2 SIGNALING TRANSMISSION SCHEME

| Syntax | No of Bits | Mnemonic | Semantics |
|---|---|---|---|
| time_info(){ | | | |
| time_info_id | 8 | uimsbf | ID INDICATIVE OF TYPE OF DESCRIPTOR |
| time_mode | 3 | uimsbf | FORMAT OF TIME INFORMATION e.g. 0: UTC, 1: PTP, 2: Local time |
| timezone | 5 | uimsbf | TIME ZONE (+/-12 TO UTC) |
| timeOffset | 16 | tcimsbf (two's complement integer, most significant bit first) | OFFSET VALUE BETWEEN REFERENCE TIME AND DISCONTINUOUS TIME (REFERENCE TIME SPECIFIED BY STANDARD (PTP, FOR EXAMPLE)) |
| nextTimeJumpday | 8 | uimsbf | DATE ON WHICH TIME BECOMES DISCONTINUOUS NEXT |
| nextTimeJumphour | 8 | uimsbf | TIME AT WHICH TIME BECOMES DISCONTINUOUS NEXT |
| timeJumpValue | 16 | tcimsbf | VARIATION OF TIME THAT BECOMES DISCONTINUOUS NEXT TYPE |
| timeJumpType | 3 | bslbf | TYPE OF TIME AT WHICH TIME BECOMES DISCONTINUOUS NEXT e.g. 0: LEAP SECOND, 1: DST |
| media_timezone | 5 | uimsbf | TIME ZONE OF MEDIA (COMPONENT) |
| reserved | 3 | bslbf | |
| esg_timezone | 5 | uimsbf | TIME ZONE OF ESG |
| } | | | |

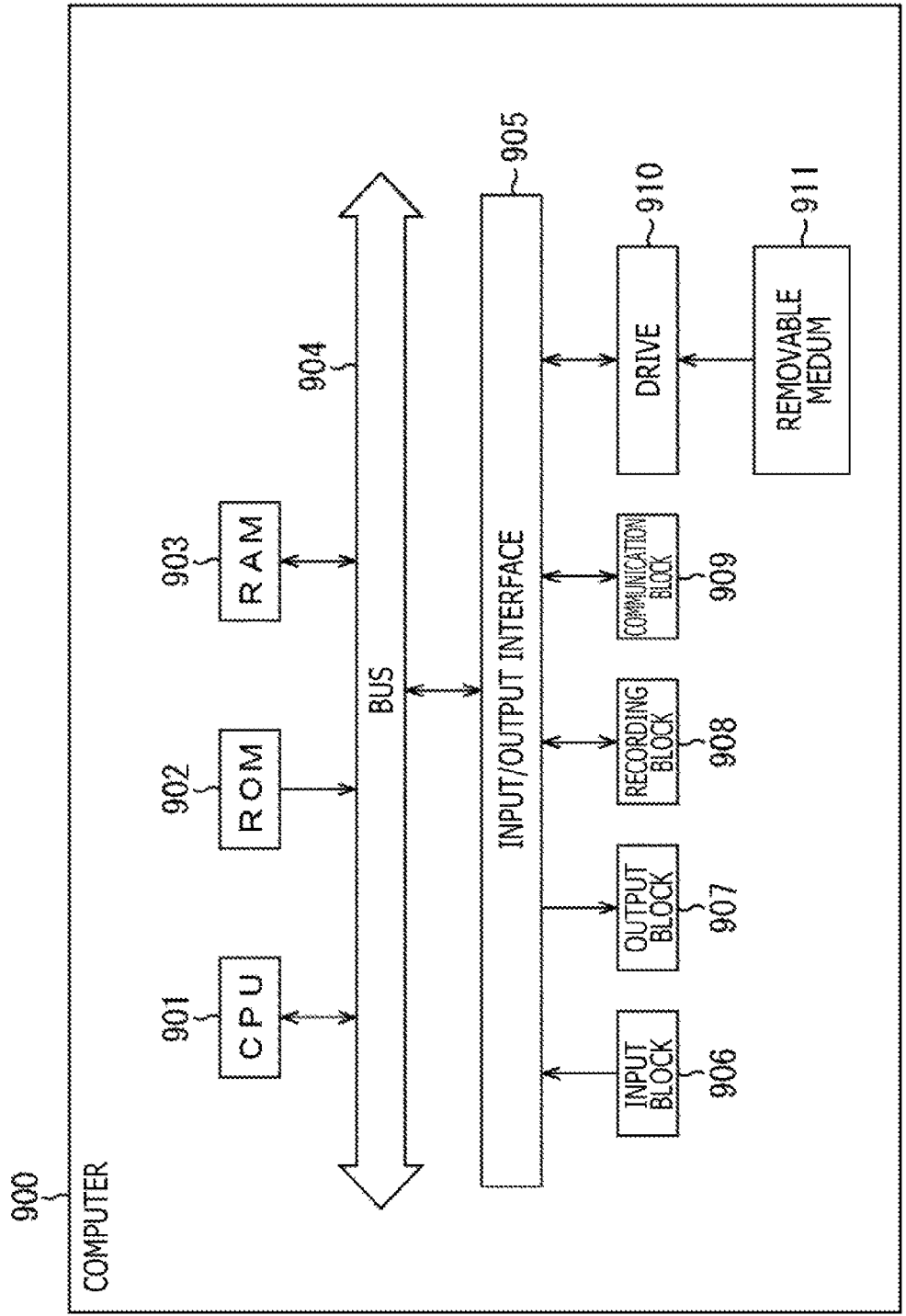

METHOD AND APPARATUS FOR RECEIVING, SENDING AND DATA PROCESSING INFORMATION RELATED TO TIME SUCH AS LEAP SECOND AND DAYLIGHT SAVING TIME (DST)

CROSS-REFERENCE TO RELATED APPLICATIONS

This application is a continuation of U.S. Ser. No. 15/765,646, filed on Apr. 3, 2018, which is incorporated by reference. U.S. Ser. No. 15/765,646 is a National Stage of PCT/JP2016/078984, filed on Sep. 30, 2016, and claims the benefit of priority under 35 U.S.C. § 119 of Japanese Application No. 2015-204124, filed Oct. 15, 2015.

TECHNICAL FIELD

The present technology relates to a receiving apparatus, a sending apparatus, and a data processing method and, more particularly, to a receiving apparatus, a sending apparatus, and a data processing apparatus that are configured to be capable of executing the processing related with the time information corresponding to various kinds of operations.

BACKGROUND ART

In the field of broadcasting, time information is transmitted so as to provide synchronization between the sending side and the receiving side. In using such time information, measures are required because, if a discontinuous time occurs due to leap second or the summer time (DST: Daylight Saving Time), for example, normal processing may not be ensured.

For example, in ATSC (Advanced Television Systems Committee) employed in the United State of America and other countries, a descriptor for describing the summer time (DST) (Daylight Saving Time Descriptor) is specified (refer to NPL 1 below, for example).

CITATION LIST

Patent Literature

[NPL 1]
ATSC Standard: Program and System Information Protocol for Terrestrial Broadcast and Cable (Doc. A65/2013)

SUMMARY

Technical Problems

Since some operations use different kinds of time information, even in the case where two or more kinds of time information are used, propositions for enabling the handling of the times that are discontinuous due to the leap second or the summer time (DST), for example have been demanded.

Therefore, the present technology addresses the above-identified problem and is intended to solve the addressed problem by providing measures for processing related with the time information corresponding to various kinds of operations.

Solutions to Problems

In carrying out the present technology and according to a first aspect thereof, there is provided a receiving apparatus. This receiving apparatus has a receiving block configured to receive metadata including information for executing processing related with time information in accordance with a mode corresponding to two or more pieces of information and a processing block configured to execute processing related with the time information on the basis of the metadata.

The receiving apparatus according to the first aspect of the present technology may be a discrete unit of an apparatus or an internal block of one unit of an apparatus. The data processing method according to the first aspect of the present technology is a data processing method corresponding to the above-mentioned receiving apparatus of the first aspect of the present technology.

In the receiving apparatus and the data processing method according to the first aspect of the present technology, the metadata that includes the information for executing the processing related with the time information in accordance with a mode corresponding to two or more pieces of time information is received and the processing related with the above-mentioned time information is executed on the basis of the above-mentioned metadata.

In carrying out the present technology and according to a second aspect thereof, there is provided a sending apparatus. This sending apparatus has a generation block configured to generate metadata including information for executing processing related with time information in accordance with a mode corresponding to two or more pieces of time information; and a sending block configured to send the metadata.

The sending apparatus according to second first aspect of the present technology may be a discrete unit of an apparatus or an internal block of one unit of an apparatus. The data processing method according to the second aspect of the present technology is a data processing method corresponding to the above-mentioned sending apparatus of the second aspect of the present technology.

In the sending apparatus and the data processing method in the second aspect of the present technology, the metadata that includes the information for executing the processing related with the time information in accordance with a mode corresponding to tow or more pieces of information is generated and the generated metadata is sent.

In carrying out the present technology and according to a third aspect thereof, there is provided a receiving apparatus. This receiving apparatus has a receiving block configured to receive metadata including information for executing processing related with time information in accordance with a mode corresponding to two or more pieces of time information, the metadata including a flag indicative of one of insertion and deletion of the leap second; a counter configured to count a value in accordance with the flag; and a processing block configured to correct the leap second of the time information in accordance with a value of the counter.

The receiving apparatus according to the third aspect of the present technology may be a discrete unit of an apparatus or an internal block of one unit of an apparatus. The data processing method according to the third aspect of the present technology is a data processing method corresponding to the above-mentioned receiving apparatus of the third aspect of the present technology.

In the receiving apparatus and the data processing method according to the third aspect of the present technology, metadata including information for executing processing related with time information in accordance with a mode corresponding to two or more pieces of time information is received, the metadata including a flag indicative of one of insertion and deletion of the leap second; a value in accordance with the flag is counted; and the leap second of the time information in accordance with a value of the counter is corrected.

Advantageous Effect of Invention

According to the first aspect through the third aspect of the present technology, the processing related with the time information in accordance with a variety of operations can be executed.

It should be noted that the effects described here are not necessarily restricted; namely, any of the effects described in the present disclosure may be effects denoted here.

BRIEF DESCRIPTION OF DRAWINGS

FIG. 4 is a diagram illustrating daylight_saving descriptor.

FIG. 5 is a diagram illustrating a basic method of using daylight_saving descriptor throughout the year.

FIG. 6 is a diagram illustrating the contents of the processing corresponding to time information modes.

FIG. 7 is a diagram illustrating a relation between UTC and reference time.

FIG. 8 is a diagram illustrating a relation between PTP and reference time.

FIG. 9 is a diagram illustrating a relation between local time and reference time.

FIG. 11 is a diagram illustrating an example of UTC parameters.

FIG. 12 is a diagram illustrating an overview of the processing by the sending side and the receiving side corresponding to UTC mode A.

FIG. 23 is a diagram illustrating a relation between internal time and media time line at the start of the summer time (DST).

FIG. 24 is a diagram illustrating an example of a syntax of time information metadata.

FIG. 25 is a diagram illustrating an overview of a transmission scheme of time information metadata.

FIG. 27 is a diagram illustrating a descriptor transmission scheme.

FIG. 31 is a diagram illustrating an L2 signaling header transmission scheme.

FIG. 32 is a diagram illustrating an L2 signaling transmission scheme.

FIG. 40 is a diagram illustrating an example of a structure of a computer.

DESCRIPTION OF EMBODIMENTS

The following describes embodiments of the present technology with reference to the attached drawings. It should be noted that the description is done in the following sequence.

Figure 1:
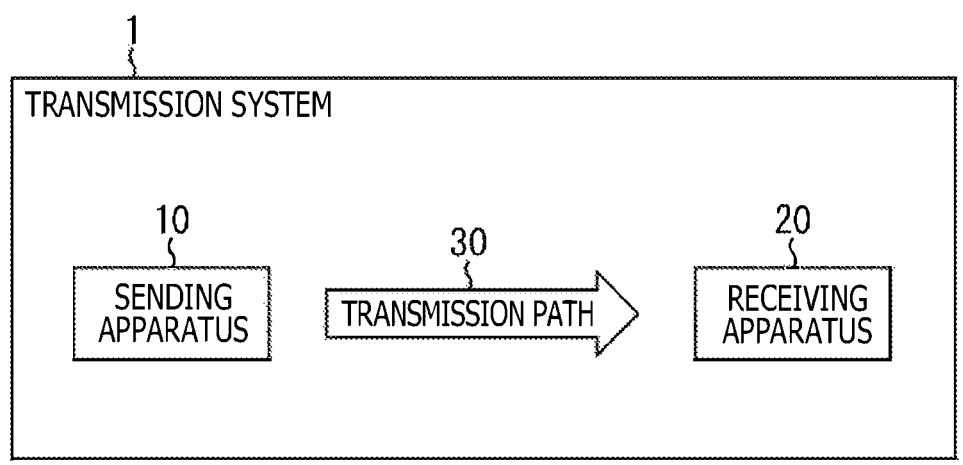
FIG. 1 is a diagram illustrating an example of a configuration of a transmission system to which the present technology is applied.

1. System configuration
2. Time information processing in accordance with a time information mode
 (A) Contents of the processing in the time information mode
 (B) Correspondence between the leap second and the summer time (DST)
 (C) Example of syntax
3. Transmission scheme of time information metadata
4. Flows of processing to be executed in each apparatus
5. Variations
6. Computer configuration
<1. System Configuration>
(Exemplary Configuration of a Transmission System)
FIG. 1 depicts a diagram illustrating a configuration of one embodiment of a transmission system to which the present technology is applied. It should be noted that term "system" denotes a logical aggregation of two or more apparatuses.

As depicted in FIG. 1, a transmission system 1 is configured by a sending apparatus 10 and a receiving apparatus 20. In this transmission system 1, data transmission compliant with a digital broadcasting standard such as ATSC (Advanced Television Systems Committee) 3.0, for example, one of the next-generation terrestrial broadcast standards.

The sending apparatus 10 is a sending machine compliant with a digital broadcasting standard such as ATSC 3.0 and sends a broadcast stream including content such as a broadcast program via a transmission path 30. It should be noted that a detail configuration of the sending apparatus 10 will be described later with reference to FIG. 2.

The receiving apparatus 20 is a receiving machine compliant with a digital broadcasting standard such as ATSC 3.0 and receives a broadcast stream sent from the sending apparatus 10 via the transmission path 30, thereby reproducing the content such as a broadcast program. It should be noted that a detail configuration of the receiving apparatus 20 will be described later with reference to FIG. 3.

In the transmission system 1 depicted in FIG. 1, only one unit of the receiving apparatus 20 is illustrated for the brevity of description; however, it is also practicable to arrange two or more receiving apparatuses 20 in which a digital broadcast signal sent from the sending apparatus 10 is simultaneously received by the two or more receiving apparatuses 20 via the transmission path 30.

It is also practicable to arrange two or more sending apparatuses 10. Each of the two or more sending apparatuses 10 can send a broadcast stream on a separate channel, a separate frequency band, for example, in which the receiving apparatus 20 can select a channel by which to receive the broadcast stream from among the channels of the two or more sending apparatuses 10.

Further, in the transmission system 1 depicted in FIG. 1, the transmission path 30 may be a satellite broadcast using a broadcasting satellite (BS: Broadcasting Satellite) or a communication satellite (CS: Communication Satellite) or a wired broadcasting (CATV) using cables, for example, in addition to terrestrial wave (terrestrial broadcasting).

Figure 2:
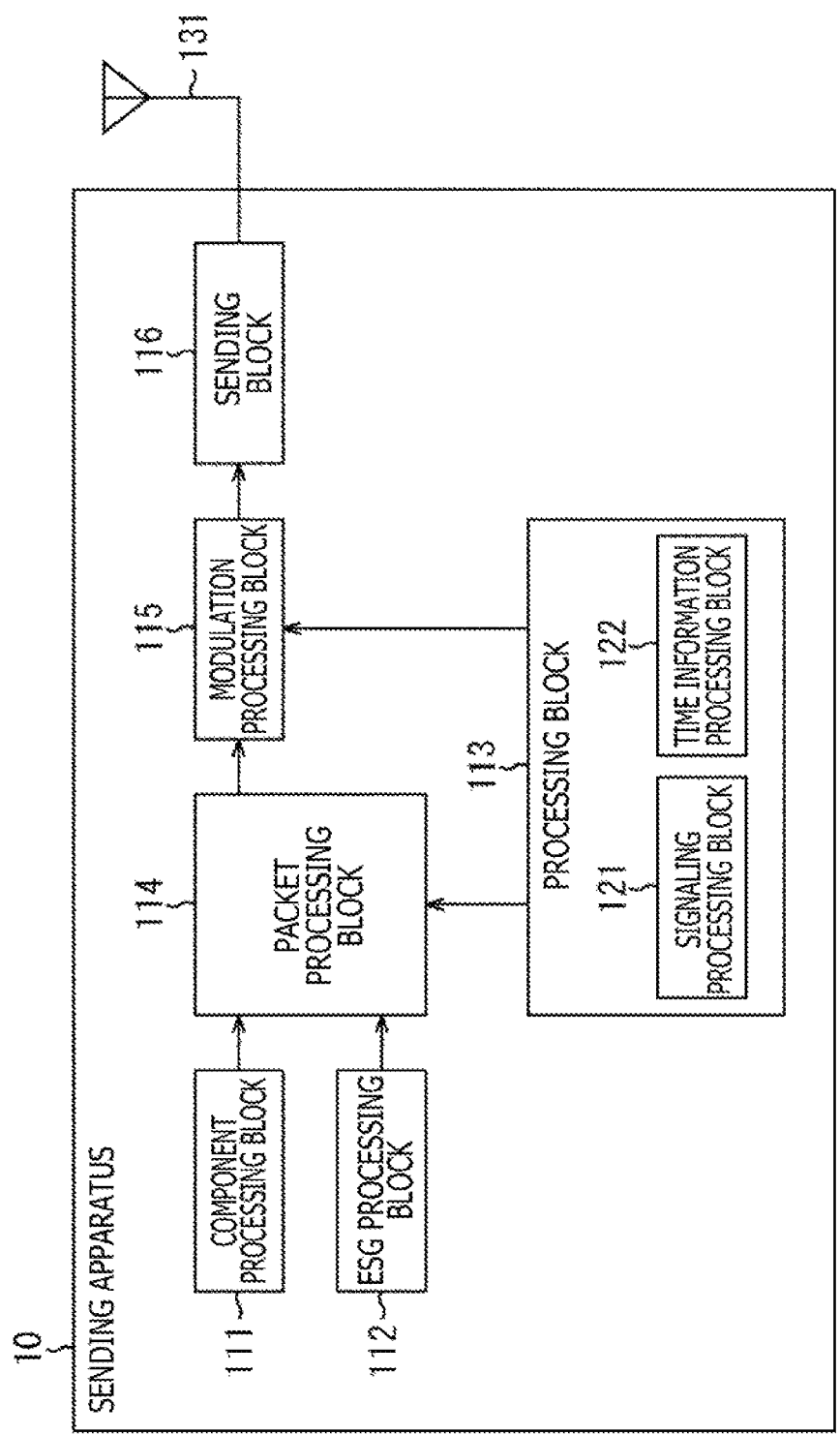
FIG. 2 is a diagram illustrating an example of a configuration of a sending apparatus.

(Exemplary Configuration of the Sending Apparatus)
FIG. 2 depicts an exemplary configuration of the sending apparatus 10 depicted in FIG. 1.

As depicted in FIG. 2, the sending apparatus 10 is configured by a component processing block 111, an ESG processing block 112, a processing block 113, a packet processing block 114, a modulation processing block 115, and a sending block 116.

The component processing block 111 obtains content entered therein. The content here includes live content (a live broadcast program such as sports, for example) sent from a site of coverage via a transmission path or a communication line or recorded content (a program recorded in advance such as dramas, for example) accumulated in a storage.

The component processing block 111 processes (encodes, for example) the data of a video or audio component making up content and supplies resultant data to the packet processing block 114.

The ESG processing block 112 obtains the data of ESG (Electronic Service Guide) that is an electronic service guide (an electronic program table). The ESG processing block 112 processes the ESG data and supplies the resultant data to the packet processing block 114.

The processing block 113 executes processing related with information, such as signaling and time information. The processing block 113 includes a signaling processing block 121 and a time information processing block 122.

The signaling processing block 121 processes (generates) signaling and supplies the processed signaling to the packet processing block 114 or the modulation processing block 115.

For example, ATSC 3.0 assumes to specify LLS (Link Layer Signaling) and SLS (Service Layer Signaling) for signaling in which the SLS signaling for each service is obtained in accordance with the information described in the LLS signal obtained before. In addition, the signaling includes the signaling (L1 signaling) in the physical layer.

The time information processing block 122 processes (generates) time information and supplies the processed time information to the signaling processing block 121. It should be noted that, for the time information, UTC (Coordinated Universal Time), PTP (Precision Time Protocol), or local time (LT), for example, is used, details thereof being described later.

Further, the time information processing block 122 generates metadata (hereafter referred to as time information metadata) including information for executing the processing corresponding to a time information mode in accordance with two or more pieces of time information and supplies the generated metadata to the signaling processing block 121.

The signaling processing block 121 processes, as signaling, the time information or time information metadata supplied from the time information processing block 122 and supplies the processed information or metadata to the packet processing block 114 or the modulation processing block 115.

The packet processing block 114 is supplied with video and audio component data from the component processing block 111, ESG data from the ESG processing block 112, and signaling data from the processing block 113 (the signaling processing block 121 thereof). The packet processing block 114 executes packet generation processing by use of the supplied component, ESG, and signaling data.

Here, IP (Internet Protocol) packets including a UDP (User Datagram Protocol) packet is generated and one or more IP packets are encapsulated into an ALP (ATSC Link-layer Protocol) packet, for example. The packets processed by the packet processing block 114 are supplied to the modulation processing block 115. For example, the signaling supplied from the signaling processing block 121 that includes time information or time information metadata can be stored an additional header or a payload of a particular packet.

The modulation processing block 115 processes the packets supplied from the packet processing block 114 so as to generate and process a physical layer frame. Here, the physical layer frame is configured by a bootstrap (BS: Bootstrap), a preamble (Preamble), and a data part. For example, the signaling including time information or time information metadata can be included in the bootstrap or the preamble of the physical layer frame.

It should be noted that the modulation processing block 115 also executes error correction encoding processing (BCH encoding or LDPC (Low Density Parity Check) encoding, for example) and modulation processing (OFDM (Orthogonal Frequency Division Multiplexing), for example). The signal processing by the modulation processing block 115 is supplied to the sending block 116.

The sending block 116 converts the signal supplied from the modulation processing block 115 into an RF (Radio Frequency) signal and sends the RF signal as a digital broadcast signal via an antenna 131.

The sending apparatus 10 is configured as described above. It should be noted that, in FIG. 2, the sending apparatus 10 on the sending side (the broadcasting station) is configured by only one unit for the convenience of description; however, the sending apparatus 10 may be configured by two or more units having the functions of the blocks depicted in FIG. 2.

(Exemplary Configuration of the Receiving Apparatus)

Figure 3:
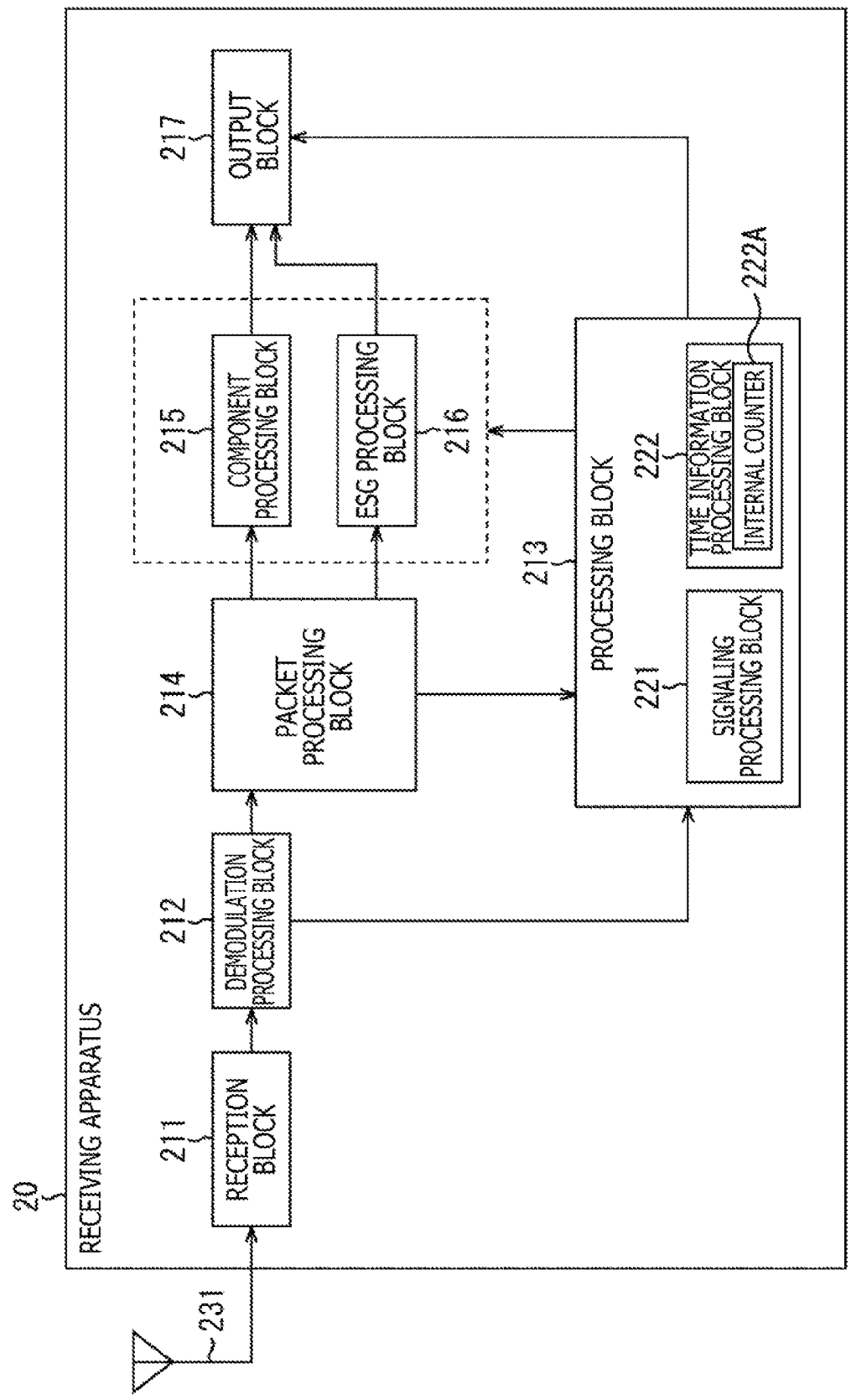
FIG. 3 is a diagram illustrating an example of a configuration of a receiving apparatus.

FIG. 3 depicts an exemplary configuration of the receiving apparatus 20 depicted in FIG. 1.

As depicted in FIG. 3, the receiving apparatus 20 is configured by a receiving block 211, a demodulation processing block 212, a processing block 213, a packet processing block 214, a component processing block 215, an ESG processing block 216, and an output block 217.

The receiving block 211 receives a digital broadcast signal via the antenna 231 and frequency-converts the RF signal into an IF (Intermediate Frequency) signal, thereby supplying the IF signal to the demodulation processing block 212.

The demodulation processing block 212 processes a signal supplied from the receiving block 211 so as to process the physical layer frame, thereby extracting packets. Here, the physical layer frame is configured by a bootstrap, a preamble, and a data part. For example, if signaling including time information or time information metadata is included in the bootstrap or the preamble of the physical layer frame, this signaling is supplied to the processing block 213 (the signaling processing block 221 thereof).

It should be noted the demodulation processing block 212 also executes demodulation processing (OFDM demodulation or the like, for example) and error correction decoding processing (LDPC decoding or BCH decoding, for example). The signal processed by the demodulation processing block 212 is supplied to the packet processing block 214.

The packet processing block 214 processes the packets supplied from the demodulation processing block 212. Here, the processing for an ALP packet is executed and the processing for an IP packet extracted from this ALP packet is further executed, for example. Consequently, IP packets including video and audio component, ESG, and signaling data are obtained, for example. Then, the component data is supplied to the component processing block 215, the ESG data is supplied to the ESG processing block 216, and the signaling data is supplied to the processing block 213 (the signaling processing block 221 thereof).

The processing block 213 executes the processing related with information such as signal and time information. The processing block 213 includes the signaling processing block 221 and a time information processing block 222.

The signaling processing block 221 is supplied with signaling from the demodulation processing block 212 or the packet processing block 214. The signaling from the demodulation processing block 212 includes L1 signaling and the signaling that includes time information or time information metadata, for example. The signaling from the packet processing block 214 includes LLS signaling and SLS signaling and the signaling that includes time information or time information metadata.

The signaling processing block 221 processes signaling so as to control the operation of each block in accordance with the results of this processing. In addition, signaling processing block 221 processing the signaling including time information or time information metadata and supplies the processed signaling to the time information processing block 222.

The time information processing block 222 executes the processing related with time information on the basis of the time information or the time information metadata supplied from the signaling processing block 221. In addition, the time information processing block 222 controls the component processing block 215 or the ESG processing block 216 in accordance with the results of the processing related with time information. It should be noted that the time information processing block 222 may have an internal counter 222A.

Under the control of the processing block 213, the component processing block 215 processes (decodes, for example) video and audio component data supplied from the packet processing block 214 and outputs the processed data to the output block 217. The output block 217 outputs the video and audio corresponding to the component data supplied from the component processing block 215.

Under the control of the processing block 213, the ESG processing block 216 processes the ESG data supplied from the packet processing block 214 and supplies the processed ESG data to the output block 217. The output block 217 displays an electronic service guide corresponding to the ESG data supplied from the ESG processing block 216.

The receiving apparatus 20 is configured as described above. It should be noted that the receiving apparatus 20 may be a mobile receiving machine such as a mobile telephone, a smartphone, or a tablet terminal, in addition to a fixed receiving machine such as a television receiver, a set top box (STB: Set Top Box), or a video recorder. Further, the receiving apparatus 20 may be an in-car device that is installed aboard a vehicle.

<2. Time Information Processing in Accordance with a Time Information Mode>

Meanwhile, in the transmission system 1 (FIG. 1), in order to provide synchronization between the sending apparatus 10 on the sending side and the receiving apparatus 20 on the receiving side, time information is transmitted, thereby realizing such processing using this time information as clock synchronization and presentation synchronization.

Here, for time information, the information regarding time specified by UTC (Coordinated Universal Time), PTP (Precision Time Protocol), or local time (LT: Local Time) may be used.

UTC (Coordinated Universal Time), the time in the atomic time system derived from TAI (International Atomic Time), is the reference time adjusted to the pacing of world time UT1 (namely, the earth rotation). Currently, the standard times of the places around the world are determined on the basis of UTC.

A region in which a common standard time is used is referred to as a time zone (Time Zone) which is represented by a difference from UTC in the indication of the standard time in each region. For example, in the United States of America, the Eastern Standard Time (EST: Eastern Standard Time) is a standard time obtained by delaying UTC by five hours and is expressed as "−0500(EST)." Further, for example, in the United States of America, the Pacific Standard Time (PST: Pacific Standard Time) is a standard time obtained by delaying UTC by eight hours and is expressed as "−0800(PST)."

PTP is the information representative of the 80-bit time specified in IEEE 1588-2008. The 80-bit PTP is configured by a 48-bit second field and a 32-bit nanosecond field. With PTP, the leap second is neither inserted nor deleted, thereby providing a merit of the easy control thereof.

Local time (LT) is the time of the standard time of each time zone. Here, in the United States of America, there are plural time zones inside the state, such as the regions that use the Eastern Standard Time and the Pacific Standard Time; currently, the content transmitted from a broadcasting station (the sending apparatus 10 thereof) is encoded in accordance with the local time. Hence, the real situation is that each local station strongly desires the broadcasting operation with local times.

Further, the processing using time information includes clock synchronization, presentation synchronization, ESG (Electronic Service Guide) display, and time display.

Clock synchronization denotes that a match is provided between the frequency of the system clock generated by the sending apparatus 10 (a clock generation block thereof) and the frequency of the system clock generated by the receiving apparatus 20 (a clock generation block thereof). In the transmission system 1, if this clock synchronization has not been established, then the receiving apparatus 20 would suffer a failure such as the occurrence of a dropped frame, for example, while a digital broadcast signal is received; therefore, the clock synchronization need be realized.

Presentation synchronization denotes that a match is provided between the time information of the sending apparatus 10 (the time information processing block thereof) and the time information of the receiving apparatus 20 (the time information processing block thereof) and the time information (the presentation time information) for presentation unit of components (media) is added to a packet storing the components (data thereof). In the transmission system 1, if the presentation synchronization has not been established, then, in reproducing content, the receiving apparatus 20 cannot properly provide presentation without failing a buffer by providing video and audio synchronization.

The ESG is an electronic service guide (electronic program table) compliant with the specification of OMA (Open Mobile Alliance) or the like. An ESG is displayed with the contents in accordance with the local time of each time zone. That is, in the United States of America, for example, ESG data is supposed to be created as being common throughout the nation (Nation wide); however, in displaying an ESG, the ESG need be displayed with the local time of each time zone.

Time display is a time that is displayed on a screen of the receiving apparatus 20, namely, displayed with a time in accordance with the local time of each time zone. To be more specific, in the United States of America, for example, there are plural time zones in the nation, so that, in displaying a time, the time need be displayed with the local time of each time zone.

As described above, in the transmission system 1, two or more time formats such as UTC, PTP, and local time are assumed as time information, so that measures must be taken to handle these time formats. In addition, since the contents of the processing to be executed in the receiving apparatus 20 are different for different time formats, measures must also be taken to handle the difference. On the other hand, in the transmission system 1, handling of time information requires to take the leap second and the summer time into consideration.

The leap second denotes one second that is inserted in the UTC on the basis of the world-wide treaty so as to prevent UTC going in synchronization with TAI (international atomic time) from getting deviated from the world time (UT1) over long years owning to the change in the earth rotational speed. For example, in the case of UTC or local time, the leap second must be adjusted, while there is no such a need with PTP.

The summer time (DST: Daylight Saving Time) denotes a system of advancing the standard time by one hour for the purpose of effectively using the time zone from sunrise to sunset in the period around the summer of one year or denotes that advanced time. However, in some regions, the difference between the summer time and the normal time is specified as 30 minutes rather than one hour. It should be noted that the summer time is also referred to the summer time (the Summer Time) in addition to the daylight saving time (Daylight Saving Time).

Here, in the current ATSC standard, for a descriptor for handling the summer time, a daylight_saving descriptor is specified. This daylight_saving descriptor has a structure depicted in FIG. 4.

In the daylight_saving descriptor depicted in FIG. 4, a 1-bit DS_status is representative of a period of the summer time (DST). A 5-bit DS_day_of_month is representative of a date on which the summer time (DST) starts or ends. An 8-bit DS_hour is representative of a time at which the summer time (DST) starts or ends. FIG. 5 depicts a basic method of using the daylight_saving descriptor (FIG. 4) throughout the year.

Meanwhile, depending on the operations, the time information used is different from one to another, so that, even if two or more pieces of time information are used, propositions for handling the discontinuous time caused by the leap second or the summer time (DST) have been requested.

Therefore, the present technology specifies a time information mode in accordance with two or more pieces of time information and, at the same time, transmits the time information metadata including the information (the information necessary for the processing of the leap second and the summer time (DST), for example) necessary for executing the processing corresponding to two or more time formats, thereby enabling the processing related with the time information corresponding to various operations in accordance with the time information mode.

(A) Contents of the Processing in the Time Information Mode

FIG. 6 depicts a diagram illustrating the contents of the processing corresponding to the time information mode.

As depicted in FIG. 6, the time information mode is specified for each time information format (each time format). The time formats include UTC (Coordinated Universal Time), PTP, and local time (LT).

That is, if the time format is UTC, then the time information mode thereof is the UTC mode. However, in the UTC mode, depending whether the time zone of component and ESG time lines is UTC or a time zone other than UTC, the contents of the processing become different, so that, for the convenience of description, the UTC mode in the case where the time zone of the time line concerned is called UTC mode A and the UTC mode in the case where the time zone is other than UTC is called UTC mode B for distinction.

If the time format is PTP, then the time information mode thereof is the PTP mode. However, in the PTP mode, the PTP mode in the case where the time zone of component and ESG time lines is UTC is called PTP mode A and the PTP mode in the case where the time zone is other than UTC is called PTP mode B for distinction.

If the time format is the local time, then the time information mode thereof is the local time mode. However, in the local time mode, the local time mode in the case where the time zone of component and ESG time lines is UTC is called local time mode A and the local time mode in the case where the time zone is other than UTC is called local time mode B for distinction.

It should be noted that, although not depicted in FIG. 6, it sometimes occurs that, when the local format is the local time, the time zone of component and ESG time lines becomes the local time; the local time mode in this case is called local time mode C. Detail contents of the time information processing to be executed on the sending side and the receiving side corresponding to local time mode C will be described later with reference to FIG. 18.

(1-1) UTC Mode A

UTC mode A is a time information mode in which the time format is UTC and the time zone of component and ESG time lines is UTC. In this UTC mode A, if the clock synchronization using the UTC as time information is executed in the receiving apparatus 20, offset value correction is executed, thereby correcting the leap second.

Here, in the receiving apparatus 20, in the execution of offset value correction, the offset value correction is executed by use of the offset information (the offset value) included in the time information metadata sent from the sending apparatus 10. In the case of UTC mode A (the UTC mode), this offset value is a difference between the reference time and UTC as depicted in FIG. 7.

As depicted in FIG. 7, the horizontal axis is indicative of elapsed time while the vertical axis is indicative of time, in which reference time L0 indicated by a dash line and UTC time L1 indicated by a solid line is offset value D. It should be noted that, for the reference time, such a time format as PTP or TAI (International Atomic Time), for example that does not correct the leap second and so on is employed. Therefore, as depicted in FIG. 7, reference time L0 such as PTP can be counted in a linear manner.

On the other hand, in the case of UTC, the leap second is inserted (or deleted), so that, if the leap second is inserted in time t1 and time t2, then the offset value after the insertion of the leap second in time t1 gets greater than the offset value after the insertion of the leap second in time t2. That is to say, in the case of UTC mode A (the UTC mode), the offset value is an integrated value of the leap second.

Returning to the description of FIG. 6, UTC mode A does not require the correction of component time line and ESG time line.

On the other hand, in UTC mode A, if the time is displayed (time display) or an ESG is displayed (ESG display) in the receiving apparatus 20, time zone correction is executed, thereby execution conversion from UTC to local time. Further, if time display or ESG display is executed in the receiving apparatus 20 and the summer time (DST) results, then the DST correction using the discontinuous time information included in the time information metadata is executed, thereby processing the local time corresponding to the summer time (DST).

Although not depicted in FIG. 6, if a component is outputted in the receiving apparatus 20, the presentation synchronization using internal time is executed. It should be noted that detail contents of the time information processing to be executed on the sending side and the receiving side corresponding to UTC mode A will be described later with reference to FIG. 12.

(1-2) UTC Mode B

UTC mode B is a time information mode in which the time format is UTC and the time zone of component and ESG time lines is a time zone other than UTC. In this UTC mode B, as with UTC mode A, offset value correction is executed if clock synchronization is executed in the receiving apparatus 20, thereby correcting the leap second. However, in UTC mode B, as with UTC mode A, an integrated value of the leap second that is a difference between reference time (PTP, for example) and UTC is also an offset value.

Further, in UTC mode B, time zone correction is executed on the component and ESG time lines. That is to say, in the receiving apparatus 20, the time zone (other than UTC) of the time line of a component is converted into the local time by the component time zone correction. Still further, in the receiving apparatus 20, the time zone (other than UTC) of the time line of ESG is converted into the local time by the ESG time zone correction.

On the other hand, if time display of ESG display is executed in the receiving apparatus 20, then the time line of ESG need not be corrected because the time zone correction (the conversion into the local time) has been executed in the immediately preceding stage.

Although not depicted in FIG. 6, if a component is outputted in the receiving apparatus 20, the presentation synchronization using internal time is executed on the component on which the time zone correction (the conversion into the local time) has been executed. It should be noted that detail contents of the time information processing to be executed on the sending side and the receiving side corresponding to UTC mode B will be described later with reference to FIG. 13.

(2-1) PTP Mode A

PTP mode A is a time information mode in which the time format is PTP and the time zone of component and ESG time lines is UTC. In this PTP mode A, PTP is used for the time format, so that, if the clock synchronization using PTP as the time information is executed in the receiving apparatus 20, the correction of the leap second need not be executed.

In this case, in the relation between PTP and reference time (PTP or TAI, for example), both PTP time L2 indicated by solid line and reference time L0 indicated by dash line are counted in a linear manner as depicted in FIG. 8, so that the offset value always becomes 0. On the other hand, in the case of PTP mode A (the PTP mode), the conversion from PTP to UTC is required in order to execute time display and ESG display and presentation synchronization, so that, in PTP mode A (the PTP mode), it is required to set a value (a PTP-UTC offset value) for the conversion from PTP to UTC as the offset value. This offset value is included in the time information metadata.

Returning to the description of FIG. 6, in PTP mode A, the correction is not required for the time line of component and the time line of the ESG.

On the other hand, in PTP mode A, if time display or ESG display is executed in the receiving apparatus 20, the offset value correction using the offset information (an offset value) included in the time information metadata is executed, thereby converting PTP to UTC. Then, in the receiving apparatus 20, the time zone correction is executed, thereby converting UTC to the local time. Further, if time display or ESG display is executed in the receiving apparatus 20 and the summer time (DST) is resulted, the DST correction using the discontinuous time information included in the time information metadata is executed, thereby processing the local time corresponding to the summer time (DST).

It should be noted that, although not depicted in FIG. 6, if a component is outputted in the receiving apparatus 20, the presentation synchronization using internal time is executed. Further, detail contents of the time information processing to be executed on the sending side and the receiving side corresponding to PTP mode A will be described later with reference to FIG. 14.

(2-2) PTP Mode B

PTP mode B is a time information mode in which the time format is PTP and the time zone of component time line and ESG time line is a time zone other than UTC. In PTP mode B, as with PTP mode A, if the clock synchronization using The PTP as time information is executed in the receiving apparatus 20, the correction of the leap second is not required.

Further, in PTP mode B, the time zone correction is executed on the component and ESG time lines. That is y, in the receiving apparatus 20, the time zone (other than UTC) of the component time line is converted into the local time by the component time line zone correction. Further, in the receiving apparatus 20, the time zone (other than UTC) of the ESG time line is converted into the local time by the ESG time zone correction.

On the other hand, if time display or ESG display is executed in the receiving apparatus 20, the time line of EST need not be corrected because the time zone correction (the conversion to the local time) has been executed in the immediately preceding stage. However, if time display is executed, for example, if time display is executed, for example, the offset value correction using the offset information (an offset value) included in the time information metadata is executed, thereby converting PTP into UTC.

Although not depicted in FIG. 6, if a component is outputted in the receiving apparatus 20, the presentation synchronization using internal time is executed on the component on which the time zone correction (the conversion to the local time) has been executed. It should be noted that detail contents of the time information processing to be executed on the sending side and the receiving side corresponding to PTP mode B will be described later with reference to FIG. 15.

(3-1) Local Time Mode A

Local time mode A is a time information mode in which the time format is the local time and the time zone of component and ESG time lines is UTC. In this local time mode A, if the clock synchronization using the local time as the time information is executed in the receiving apparatus 20, the offset correction is executed, thereby correcting the leap second and the summer time (DST).

Here, in the receiving apparatus 20, in the execution of offset value correction, the offset value correction is executed by use of the offset information (the offset value) included in the time information metadata sent from the sending apparatus 10. In the case of local mode A (the local time mode), this offset value is a difference between the reference time and local time as depicted in FIG. 9.

As depicted in FIG. 9, a difference between reference time L0 indicated by dash line and local time L3 indicated by solid line provides offset value D. However, for reference time L0, PTP, for example is employed that can be counted in a linear manner.

On the other hand, the leap second is inserted (or deleted) into the local time, so that, if the leap second is inserted at time t1 and time t4, for example, the offset value after the insertion of the leap second at time t4 becomes greater than the offset value after the insertion of the leap second at time t1.

Further, it is necessary for the local time to take the summer time (DST) into consideration, so that the value of offset value fluctuates in accordance with the summer time (DST) between time t2 at which DST starts to time t3 at which DST ends and the summer time (DST) between time t5 at which DST starts and time t6 at which DST ends. That is to say, in the case of local time mode A (the local time mode), the offset value becomes a value (including both the leap second and the summer time (DST)) obtained by adding the integrated value of the leap second and the variation of the summer time (DST) together.

Returning to the description of FIG. 6, in local time mode A, the time zone correction is executed on component and ESG time lines. That is to say, in the receiving apparatus 20, the time zone (UTC) of the component time line is converted into the local time by the component time zone correction. Further, in the receiving apparatus 20, the time zone (UTC) of the ESG time line is converted into the local time by the ESG time zone correction.

On the other hand, if time display or ESG display is executed in the receiving apparatus 20, then the time zone correction (the conversion to the local time) has been executed on the ESG time line in the immediately preceding stage, so that the correction need not be executed.

Although not depicted in FIG. 6, if a component is outputted in the receiving apparatus 20, then the presentation synchronization using internal time is executed on the component on which the time zone correction (the conversion to the local time) has been executed. It should be noted that detail contents of the time information processing to be executed on the sending side and the receiving side corresponding to local time mode A will be described later with reference to FIG. 16.

(3-2) Local Time Mode B

Local time mode B is a time information mode in which the time format is the local time and the time zone of component and ESG time lines is a time zone other than UTC. Also in this local time mode B, as with local time mode A, if clock synchronization is executed in the receiving apparatus 20, offset correction is executed, thereby executing leap second correction. However, in local time mode B, as with local time mode A, a value obtained by adding an integrated value of leap second and a variation of summer time (DST) together that is a difference between reference time (PTP, for example) and local time provides an offset value.

Further, in local time mode B, time zone correction is executed on component and ESG time lines. That is, in the receiving apparatus 20, the time zone (other than UTC) of component time line is converted into the local time by the component time zone correction. Further, in the receiving apparatus 20, the time zone (other than UTC) of ESG time line is converted into the local time.

On the other hand, if time display or ESG display is executed in the receiving apparatus 20, then the correction of the ESG time line is not required because the time zone correction (the conversion to the local time) has been executed in the immediately preceding stage.

Although not depicted in FIG. 6, if a component is outputted in the receiving apparatus 20, the presentation synchronization using internal time is executed on the component on which the time zone correction (the conversion to the local time) has been executed. It should be noted that detail contents of the time information processing to be executed on the sending side and the receiving side corresponding to local time mode B will be described later with reference to FIG. 17.

It should be noted that, in FIG. 6, if the time zone is equal to the local time, then the component time zone correction and the ESG time zone correction need not be executed. Further, if a clock synchronization scheme proposed in Japanese Patent Application No. 2015-157707 by the inventor of the present application in which the physical layer clock synchronizes with the system clock is employed, the offset value correction need not be executed in the clock synchronization using time information that is executed in the UTC mode and the local time mode.

In addition, in the time information processing to be executed in accordance with the time information mode depicted in FIG. 6, the offset value correction using the offset information (the offset value) included in the time information metadata is executed; however, only the information associated with the start time and the end time of supper time (DST) is included in daylight_saving descriptor (FIG. 4) specified in the current ATSC standard, the above-mentioned offset information being not included.

However, the offset information (the offset value) may be transmitted as included in the time information metadata, while an equivalent offset value may be computed inside the receiving apparatus 20 by use of an alternative signal (Leap_Indicator, for example), for example.

Further, it is a general practice for the time information sent from the sending apparatus 10 of a broadcasting station to the receiving apparatus 20 to be generated from GPS time. Here, GPS time is the information of a time measured by use of a GPS (Global Positioning System). It should be noted that, since leap-second adjustment is not executed with the GPS time, the leap second must be adjusted in the conversion to UTC or the like.

Figure 10:
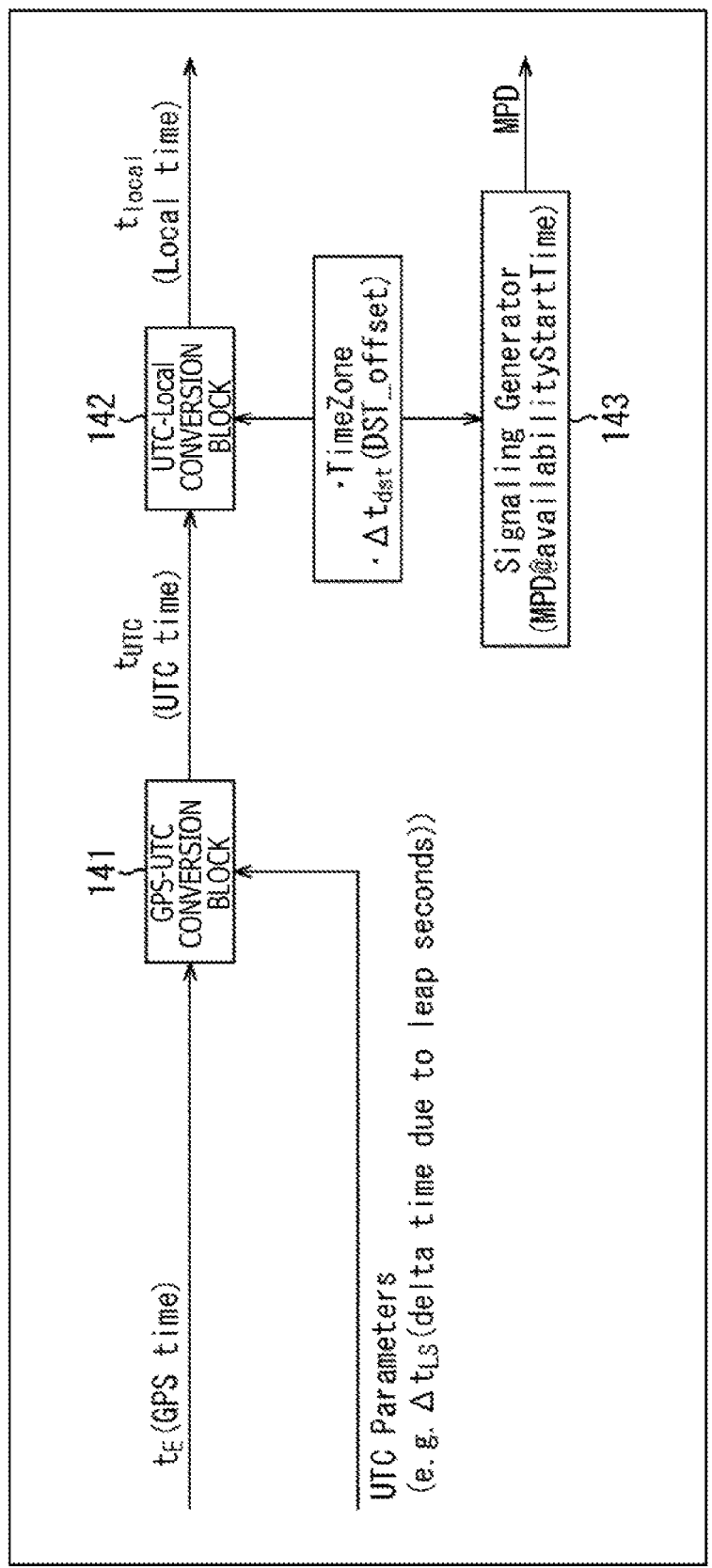
FIG. 10 is a diagram illustrating the conversion of time information.

For example, as depicted in FIG. 10, if UTC is sent as the time information in the sending apparatus 10, a GPS-UTC conversion block 141 converts the GPS time in accordance with a UTC parameter (a leap-second offset value, for example), thereby providing the time information specified in UTC. It should be noted that FIG. 11 depicts an example of UTC parameters. Further, as depicted in FIG. 10, if the local time is sent as the time information, a UTC-Local conversion block 142 converts UTC in accordance with parameters such as time zone and summer time (DST), thereby providing the local time.

It should be noted that, when a signaling generation block 143 sets time information to availabilityStartTime attribute included in the MPD (Media Presentation Description) metadata, for example, the time information concerned is also corrected in accordance with parameters such as time zone and summer time (DST). It should be noted that the MPD metadata is control information for managing the reproduction of a stream of a component (media). Further, the MPD metadata is compliant with the standard of MPEG-DASH (Dynamic Adaptive Streaming over HTTP).

The following describes details of the contents of the time information processing to be executed on the sending side and the receiving side corresponding to the above-described time information mode with reference to FIG. 12 through FIG. 18.

(1-1) UTC Mode A

FIG. 12 depicts a diagram illustrating an overview of the processing to be executed on the sending side and the receiving side corresponding to UTC mode A.

As depicted in FIG. 12, data sent from the sending apparatus 10 of a broadcasting station depicted in the left side of the diagram is received by the receiving apparatus 20 depicted in the right side of the diagram and the time information processing in accordance with UTC mode A is executed in this receiving apparatus 20.

Figure 14:
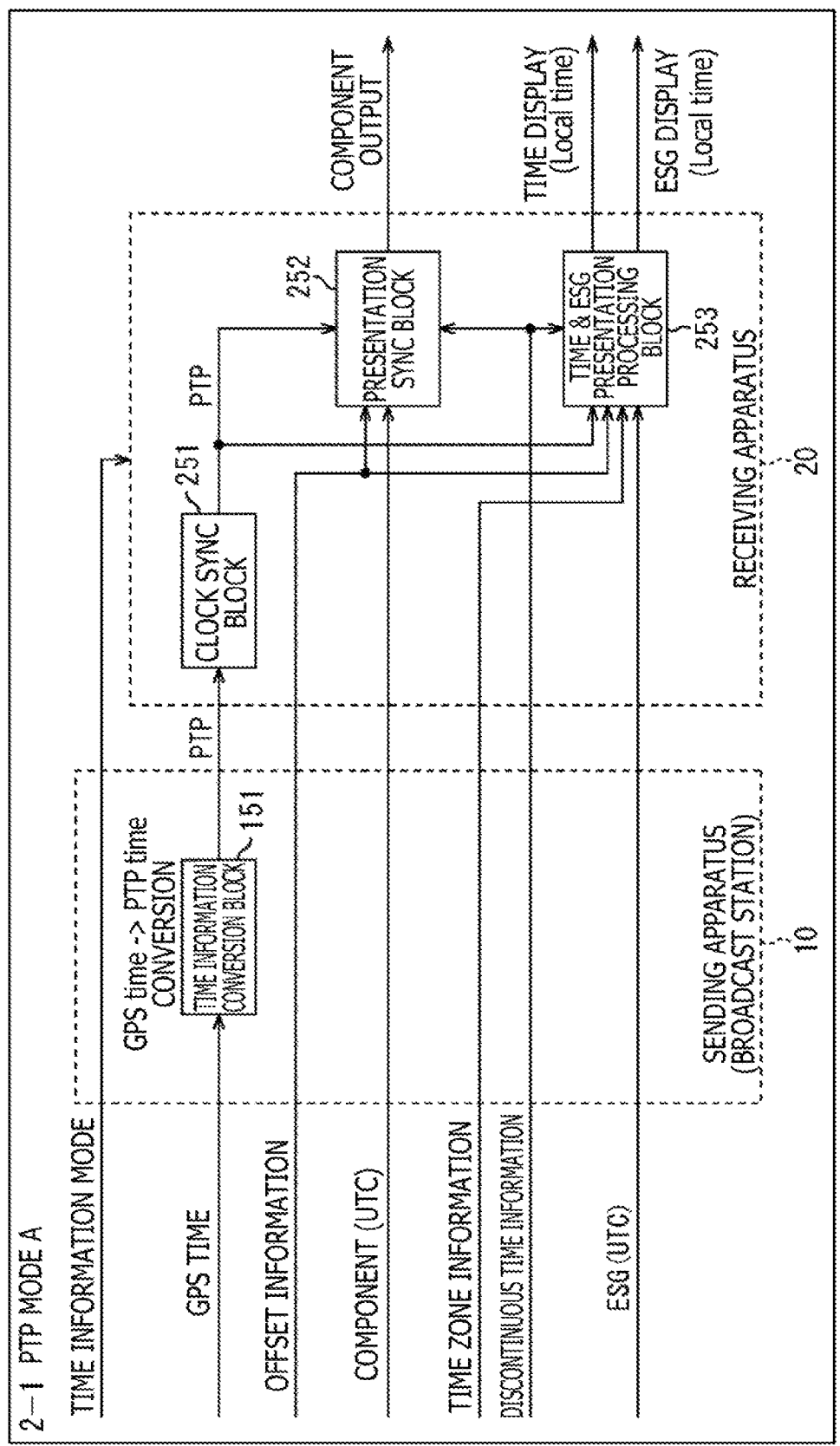
FIG. 14 is a diagram illustrating an overview of the processing by the sending side and the receiving side corresponding to PTP mode A.

It should be noted that, in the sending apparatus 10 depicted in FIG. 12, a time information conversion block 151 corresponds to the time information processing block 122 depicted in FIG. 2. Also, in the receiving apparatus 20 depicted in FIG. 12, a clock synchronization block 251, a presentation synchronization block 252, and time and ESG display processing block 253 correspond to the time information processing block 222, the component processing block 215, and the ESG processing block 216 depicted in FIG. 3, respectively. It should be noted that these relations hold true with other diagrams (FIG. 14, for example).

In the sending apparatus 10 of the broadcasting station, GPS time and offset information are entered in the time information conversion block 151. The time information conversion block 151 converts GPS time to UTC by correcting the difference between GPS time and UTC by use of the offset information as a UTC parameter. Consequently, the UTC as time information is obtained.

Further, in the sending apparatus 10, the time information metadata is generated. This time information metadata includes time information mode, offset information, time zone information, and discontinuous time information.

Here, for the time information mode, the UTC mode is set. For the offset information, an offset value between reference time (PTP, for example) and UTC is set, for example. For the time zone information, information (+/−12 relative to UTC) indicative of the standard time of that region by the difference with UTC is set. The discontinuous time information is the information associated with a discontinuous time such as the leap second and the summer time (DST), including a date and time at which the time becomes discontinuous next, a variation of the time that becomes discontinuous next, and a type of the time that becomes discontinuous.

The sending apparatus 10 sends a broadcast stream including the UTC as time information and time information metadata to the receiving apparatus 20 via the transmission path 30. Also, in the sending apparatus 10, video and audio components and an ESG (the data thereof) are processed so as to be included in a broadcast stream. In the case of UTC mode A, however, the time zone of component and ESG time lines is UTC.

On the other hand, the receiving apparatus 20 receives the broadcast stream sent from the sending apparatus 10 via the transmission path 30. This broadcast stream includes the UTC as time information, time information metadata, video and audio components, and the ESG (the data thereof). In this example, the receiving apparatus 20 operates in UTC mode A (the UTC mode) in accordance with the time information mode included in the time information metadata.

Here, in the receiving apparatus 20, the UTC as time information and the offset information included in the time information metadata are entered in the clock synchronization block 251. The clock synchronization block 251 executes the clock synchronization by use of the UTC as time information.

It should be noted that, in executing the clock synchronization by use of UTC, the clock synchronization block 251 corrects the leap second by executing the offset value correction by use of the offset information (the offset value).

That is, here, the offset value between reference time (PTP, for example) and UTC is indicative of the integrated value of the leap second, so that the leap second is corrected by use of this offset value. That is to say, here, the time information for use in the clock synchronization must be counted in a linear manner, so that reference-time matching can be provided by executing offset value correction.

Then, the clock synchronization block 251 supplies the UTC as internal time to the presentation synchronization block 252 and the time and ESG display processing block 253.

The internal time (UTC) from the clock synchronization block 251, the component (the data thereof) in which the time zone of time line becomes UTC, and the discontinuous time information included in the time information metadata are entered in the presentation synchronization block 252.

The presentation synchronization block 252 realizes presentation synchronization by processing the component (the data thereof) in which the time zone of time line becomes UTC by use of the internal time (UTC) from the clock synchronization block 251. Then, the presentation synchronization block 252 outputs the presentation-synchronized video and audio component (the data thereof). This presentation synchronization realizes, when the receiving apparatus 20 reproduces content, for example, the proper presentation involving no buffer failure by providing video and audio synchronization.

It should be noted that, in the execution of presentation synchronization, the presentation synchronization block 252 can execute the processing that uses the information (the information such as date and time at which the next leap second is adjusted, for example) associated with the leap second that is entered as discontinuous time information as required.

The internal time (UTC) from the clock synchronization block 251, the ESG (the data thereof) in which the time zone of time line becomes UTC, and the time zone information and discontinuous time information included in the time information metadata are entered in the time and ESG display processing block 253.

If time display is executed, the time and ESG display processing block 253 executes time zone correction on the basis of the time zone information, thereby converting the internal time (UTC) into the local time. Then, the time and ESG display processing block 253 displays the time corresponding to the local time.

Further, if ESG display is executed, the time and ESG display processing block 253 executes time zone correction on the basis of the time zone information so as to process the ESG (the data thereof) in which the time zone of time line becomes UTC, thereby converting the time zone (UTC) of the ESG into the local time. Then, the time and ESG display processing block 253 displays the ESG corresponding to the local time.

Still further, if time display or ESG display is executed, the summer time (DST) results, then the time and ESG display processing block 253 execute DST correction on the basis of the discontinuous time information (the information such as the date and time of the next summer time (DST) and a period thereof), thereby executing the processing by the local time corresponding to the summer time (DST). In this DST correction, the standard time (the local time) is advanced by one hour, for example, thereby enabling the processing by the local time corresponding to the summer time (DST).

As described above, in UTC mode A, the sending apparatus 10 transmits the time information metadata including the information (the offset information, for example) for executing the time information processing corresponding to UTC mode A along with the UTC as time information to the receiving apparatus 20 which then can execute the time information processing in accordance with UTC mode A by use this time information metadata.

(1-2) UTC Mode B

Figure 13:
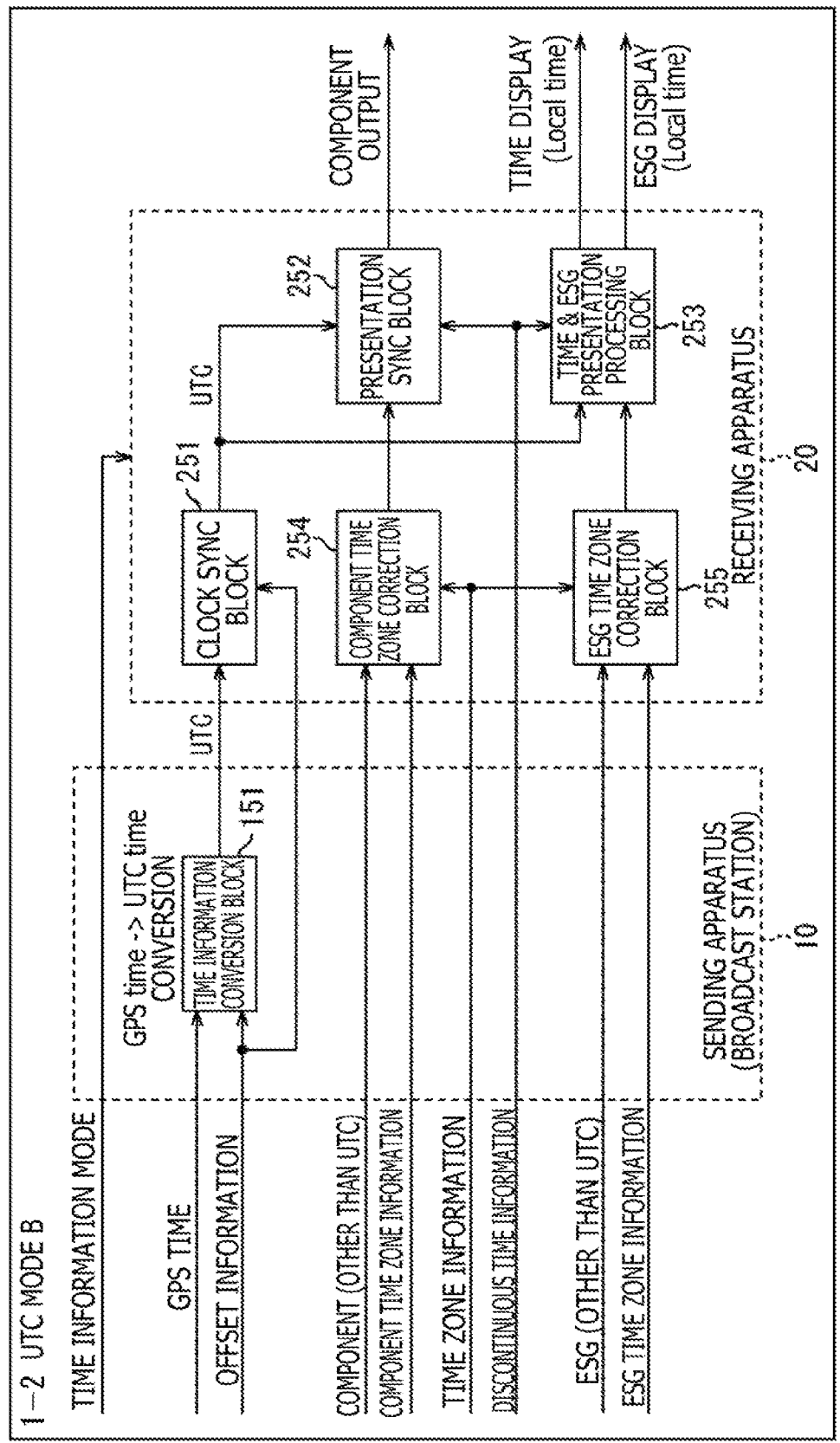
FIG. 13 is a diagram illustrating an overview of the processing by the sending side and the receiving side corresponding to UTC mode B.

FIG. 13 depicts a diagram illustrating an overview of the processing to be executed on the sending side and the receiving side corresponding to UTC mode B.

As depicted in FIG. 13, the data sent from the sending apparatus 10 of the broadcasting station depicted in the left side of the diagram is received by the receiving apparatus 20 depicted in the right side of the diagram and the time information processing corresponding to UTC mode B is executed in this receiving apparatus 20.

It should be noted that, in the sending apparatus 10 depicted in FIG. 13, the time information conversion block 151 corresponds to the time information processing block 122 depicted in FIG. 2. Further, in the receiving apparatus 20 depicted in FIG. 13, the clock synchronization block 251, the presentation synchronization block 252, the time and ESG display processing block 253, a component time zone correction block 254, and an ESG time zone correction block 255 correspond to the time information processing block 222, the component processing block 215, and the ESG processing block 216 depicted in FIG. 3. It should be noted that these relations hold true with other diagrams (FIG. 15 through FIG. 17, for example) to be described later.

In the sending apparatus 10 of the broadcasting station, the time information conversion block 151 corrects the difference between GPS time and UTC by use of the offset information as a UTC parameter, thereby converting GPS time into UTC. Consequently, the UTC as the time information is obtained.

In addition, the time information metadata is generated in the sending apparatus 10. This time information metadata includes time information mode, offset information, component time zone information, time zone information, discontinuous time information, and ESG time zone information.

Here, time information mode, offset information, time zone information, and discontinuous time information are similar to those in UTC mode A (FIG. 12) described above, so that description thereof is skipped. To component time zone information, the time zone of a component is set. To ESG time zone information, the time zone of the ESG is set.

The sending apparatus 10 sends a broadcast stream including the UTC as time information and time information metadata to the receiving apparatus 20 via the transmission path 30. Further, in the sending apparatus 10, video and audio components and the ESG (the data thereof) are processed to be included in a broadcast stream. However, in the case of UTC mode B, the time zone of component and ESG time lines is a time zone other than UTC.

On the other hand, in the receiving apparatus 20, a broadcast stream sent from the sending apparatus 10 via the transmission path 30 is received. This broadcast stream includes the UTC as time information, time information metadata, video and audio components, and the ESG (the data thereof). The receiving apparatus 20 operates in UTC mode B (the UTC mode) in accordance with the time information mode included in the time information metadata.

Here, in the receiving apparatus 20, the UTC as time information and the offset information included in the time information metadata are entered in the clock synchronization block 251. In the clock synchronization block 251, clock synchronization by use of the UTC as time information is executed.

However, in executing clock synchronization using UTC, the clock synchronization block 251 corrects the leap second by executing offset value correction by use of the offset information (the offset value). That is to say, here, since the offset value between reference time (PTP, for example) and UTC is indicative of an integrated value of the leap second, the leap second is corrected by use of this offset value.

Next, the clock synchronization block 251 supplies the UTC as internal time to the presentation synchronization block 252 and the time and ESG display processing block 253.

The component (data thereof) in which the time zone of time line is a time zone other than UTC, the component time zone information and the time zone information included in the time information metadata are entered in the component time zone correction block 254.

The component time zone correction block 254 executes component time zone correction on the basis of the component time zone information and the time zone information, thereby converting the time zone (other than UTC) of the component into the local time. Then, the component time zone correction block 254 supplies the component (the data thereof) after the time zone correction to the presentation synchronization block 252.

The internal clock (UTC) from the clock synchronization block 251, the component (the data thereof) from the component time zone correction block 254, and the discontinuous time information included in the time information metadata are entered in the presentation synchronization block 252.

The presentation synchronization block 252 processes the component (the data thereof) in which the time zone of time line becomes the local time in accordance with the internal time (UTC) from the clock synchronization block 251, thereby realizing presentation synchronization. Then, the presentation synchronization block 252 outputs the presentation-synchronized video and audio components (the data thereof.) It should be noted that, in executing presentation synchronization, the presentation synchronization block 252 can execute the processing that uses discontinuous time information (the information associated with the leap second, for example) as required.

The ESG (the data thereof) in which the time zone of time line becomes a time zone other than UTC and the ESG time zone information and the time zone information included in the time information metadata are entered in the ESG time zone correction block 255.

The ESG time zone correction block 255 executes ESG time zone correction on the basis of the ESG time zone information and the time zone information, thereby converting the time zone (other than UTC) of an ESG into the local time. Then, the ESG time zone correction block 255 supplies the ESG (the data thereof) after the time zone correction to the time and ESG display processing block 253.

The internal clock (UTC) from the clock synchronization block 251, the ESG (the data thereof) from the ESG time zone correction block 255, and the discontinuous time information included in the time information metadata are entered in the time and ESG display processing block 253.

If time display is executed, the time and ESG display processing block 253 processes the internal time (UTC) and the ESG (the data thereof), for example, thereby displaying the time corresponding to the local time. Further, if ESG display is executed, the time and ESG display processing block 253 processes the EST (the data thereof) in which the time zone of time line becomes the local time, thereby displaying the ESG corresponding to the local time.

It should be noted that, in executing time display or ESG display, the time and ESG display processing block 253 can execute the processing that uses discontinuous time information (the information associated with the leap second, for example) as required.

As described above, in UTC mode B, the sending apparatus 10 transmits the time information metadata including the information (the offset information, for example) for executing the time information processing corresponding to UTC mode B along with the UTC as time information to the receiving apparatus 20 which then can execute the time information processing in accordance with UTC mode B by use this time information metadata.

(2-1) PTP Mode A

FIG. 14 depicts a diagram illustrating an overview of the processing to be executed on the sending side and the receiving side corresponding to PTP mode A.

As depicted in FIG. 14, the data sent from the sending apparatus 10 of a broadcasting station depicted in the left side of the diagram is received by the receiving apparatus 20 depicted in the right side of the diagram and the time information processing in accordance with PTP mode A is executed in the receiving apparatus 20.

In the sending apparatus 10 in the broadcasting station, the time information conversion block 151 converts the GPS time entered therein into PTP. Consequently, the PTP as time information is obtained.

Further, in the sending apparatus 10, time information metadata is generated. This time information metadata includes time information mode, offset information, time zone information, and discontinuous time information. Here, for the time information mode, a PTP mode is set. For the offset information, a value (a PTP-UTC offset value) for converting PTP into UTC is set.

The sending apparatus 10 sends a broadcast stream including the PTP as time information and the time information metadata to the receiving apparatus 20 via the transmission path 30. Further, in the sending apparatus 10, the video and audio components and the ESG (the data thereof) are processed to be included in the broadcast stream. However, in the case of PTP mode A, the time zone of component and ESG time lines is UTC.

On the other hand, in the receiving apparatus 20, the broadcast stream sent from the sending apparatus 10 via the transmission path 30 is received. This broadcast stream includes the PTP as time information, time information metadata, video and audio components, and the ESG (the data thereof). The receiving apparatus 20 operates in PTP mode A (the PTP mode) in accordance with the time information mode included in the time information metadata.

Here, in the receiving apparatus 20, the clock synchronization is executed by the clock synchronization block 251 by use of the PTP as time information. However, if the PTP is used as time information, the leap second need not be executed in the clock synchronization. The clock synchronization block 251 supplies the PTP as internal time to the presentation synchronization block 252 and the time and ESG display processing block 253.

The internal time (PTP) from the clock synchronization block 251, the component (the data thereof) in which the time zone of time line becomes UTC, and the offset information and the discontinuous time information both included in the time information metadata are entered in the presentation synchronization block 252.

The presentation synchronization block 252 executes offset value correction by use of the PTP-UTC offset value included in the offset information, thereby converting the internal time (PTP) from the clock synchronization block

251 into UTC. By use of the UTC obtained by converting the internal time (PTP), the presentation synchronization block 252 processes the component (the data thereof) in which the time zone of time line becomes UTC, thereby realizing presentation synchronization. Then, the presentation synchronization block 252 outputs the presentation-synchronized video and audio components (the data thereof).

It should be noted that, in executing presentation synchronization, the presentation synchronization block 252 can execute the processing that uses the discontinuous information (the information associated with the leap second, for example) as required.

The internal time (PTP) from the clock synchronization block 251 the ESG (the data thereof) in which the time zone of time line becomes UTC, and the offset information, the time zone information, and discontinuous time information all included in the time information metadata are entered in the time and ESG display processing block 253.

If time display or ESG display is executed, the time and ESG display processing block 253 executes offset value correction by use of the PTP-UTC offset value included in the offset information, thereby converting the internal time (PTP) from the clock synchronization block 251 into UTC.

Then, if time display is executed, the time and ESG display processing block 253 executes time zone correction on the basis of the time zone information, thereby converting the UTC obtained by converting the internal time (PTP) into the local time. Next, the time and ESG display processing block 253 displays the time corresponding to the local time.

In addition, if ESG display is executed, the time and ESG display processing block 253 executes time zone correction on the basis of the time zone information, thereby converting the UTC obtained by converting the internal time (PTP) into the local time. Then, the time and ESG display processing block 253 displays the time corresponding to the local time.

Further, if time display or ESG display is executed and the summer time (DST) results, the time and ESG display processing block 253 executes DST correction on the basis of the discontinuous time information (the information such as the date and time of the next summer time (DST) and a period thereof), thereby executing the processing by the local time corresponding to the summer time (DST).

As described above, in PTP mode A, the sending apparatus 10 transmits the time information metadata including the information (the offset information, for example) for executing the time information processing corresponding to PTP mode A along with the PTP as time information to the receiving apparatus 20 which then can execute the time information processing in accordance with PTP mode A by use this time information metadata.

(2-2) PTP Mode B

Figure 15:
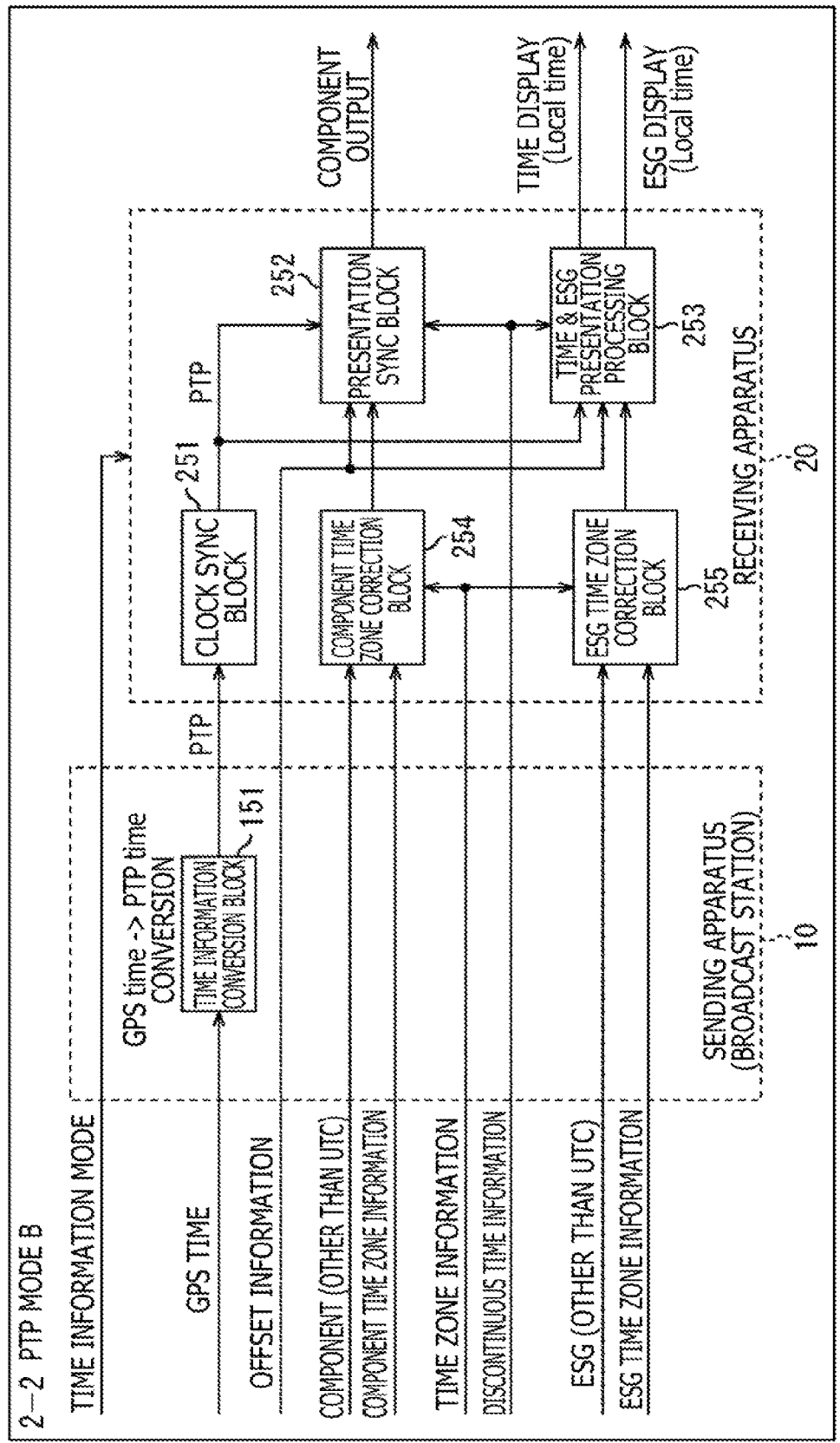
FIG. 15 is a diagram illustrating an overview of the processing by the sending side and the receiving side corresponding to PTP mode B.

FIG. 15 depicts a diagram illustrating an overview of the processing to be executed on the sending side and the receiving side corresponding to PTP mode B.

As depicted in FIG. 15, the data sent from the sending apparatus 10 of a broadcasting station depicted in the left side of the diagram is received by the receiving apparatus 20 depicted in the right side of the diagram and the time information processing in accordance with PTP mode B is executed in the receiving apparatus 20.

In the sending apparatus 10 in the broadcasting station, the time information conversion block 151 converts the GPS time entered therein into PTP. Consequently, the PTP as time information is obtained.

Further, in the sending apparatus 10, time information metadata is generated. This time information metadata includes time information mode, offset information, component time zone information, time zone information, discontinuous time information, and ESG time zone information. Here, for the time information mode, a PTP mode is set. For the offset information, a value (a PTP-UTC offset value) for converting PTP into UTC is set.

The sending apparatus 10 sends a broadcast stream including the PTP as time information and the time information metadata to the receiving apparatus 20 via the transmission path 30. Further, in the sending apparatus 10, the video and audio components and the ESG (the data thereof) are processed to be included in the broadcast stream. However, in the case of PTP mode B, the time zone of component and ESG time lines is a time zone other than UTC.

On the other hand, in the receiving apparatus 20, the broadcast stream sent from the sending apparatus 10 via the transmission path 30 is received. This broadcast stream includes the PTP as time information, time information metadata, video and audio components, and the ESG (the data thereof). The receiving apparatus 20 operates in PTP mode B (the PTP mode) in accordance with the time information mode included in the time information metadata.

Here, in the receiving apparatus 20, the clock synchronization is executed by the clock synchronization block 251 by use of the PTP as time information as with PTP mode A (FIG. 14) described above. The clock synchronization block 251 supplies the PTP as internal time to the presentation synchronization block 252 and the time and ESG display processing block 253.

The component (the data thereof) in which the time zone of time line becomes a time zone other than UTC and the component time zone information and the time zone information both included in the time information metadata are entered in component time zone correction block 254.

The component time zone correction block 254 execute component correction on the basis of the component time zone information and the time zone information, thereby converting the time zone (other than UTC) of component into the local time. Then, the component time zone correction block 254 supplies the component (the data thereof) after the time zone correction to the presentation synchronization block 252.

The internal time (PTP) from the clock synchronization block 251, the component (the data thereof) from the component time zone correction block 254, and the offset information and the discontinuous time information both included in the time information metadata are entered in the presentation synchronization block 252.

The presentation synchronization block 252 executes offset value correction by use of the PTP-UTC offset value included in the offset information, thereby converting the internal time (PTP) from the clock synchronization block 251 into UTC. By use of the UTC obtained by converting the internal time (PTP), the presentation synchronization block 252 processes the component in which the time zone of time line becomes the local time, thereby realizing presentation synchronization. Then, the presentation synchronization block 252 outputs the presentation-synchronized video and audio components (the data thereof).

The ESG (the data thereof) in which the time zone of time line becomes a time zone other than UTC and the ESG time zone information and the time zone information both included in the time information metadata are entered in the ESG time zone correction block 255.

The ESG time zone correction block 255 executes ESG time zone correction on the basis of the ESG time zone information and the time zone information, thereby converting the time zone (other than UTC) of an ESG into the local time. Then, the ESG time zone correction block 255 supplies the ESG (the data thereof) after the time zone correction to the time and ESG display processing block 253.

The internal time (PTP) from the clock synchronization block 251, the ESG (the data thereof) from the ESG time zone correction block 255, and the offset information and the discontinuous time information both included in the time information metadata are entered in the time and ESG display processing block 253.

If time display is executed, the time and ESG display processing block 253 executes offset value correction by use of the PTP-UTC offset value included in the offset information, thereby converting the internal time (PTP) from the clock synchronization block 251 into UTC. Then, time and ESG display processing block 253 processes the UTC obtained by the conversion of the internal time (PTP) and the ESG (the data thereof), thereby displaying the time corresponding to the local time, for example.

Further, if ESG display is executed, the time and ESG display processing block 253 processes the ESG (the data thereof) in which the time zone of time line becomes the local time, thereby displaying the ESG corresponding to the local time.

It should be noted that, in executing time display or ESG display, the time and ESG display processing block 253 can execute the processing that uses the discontinuous time information (the information associated with the leap second, for example) as required.

As described above, in PTP mode B, the sending apparatus 10 transmits the time information metadata including the information (the offset information, for example) for executing the time information processing corresponding to PTP mode B along with the PTP as time information to the receiving apparatus 20 which then can execute the time information processing in accordance with PTP mode B by use this time information metadata.

(3-1) Local Time Mode A

Figure 16:
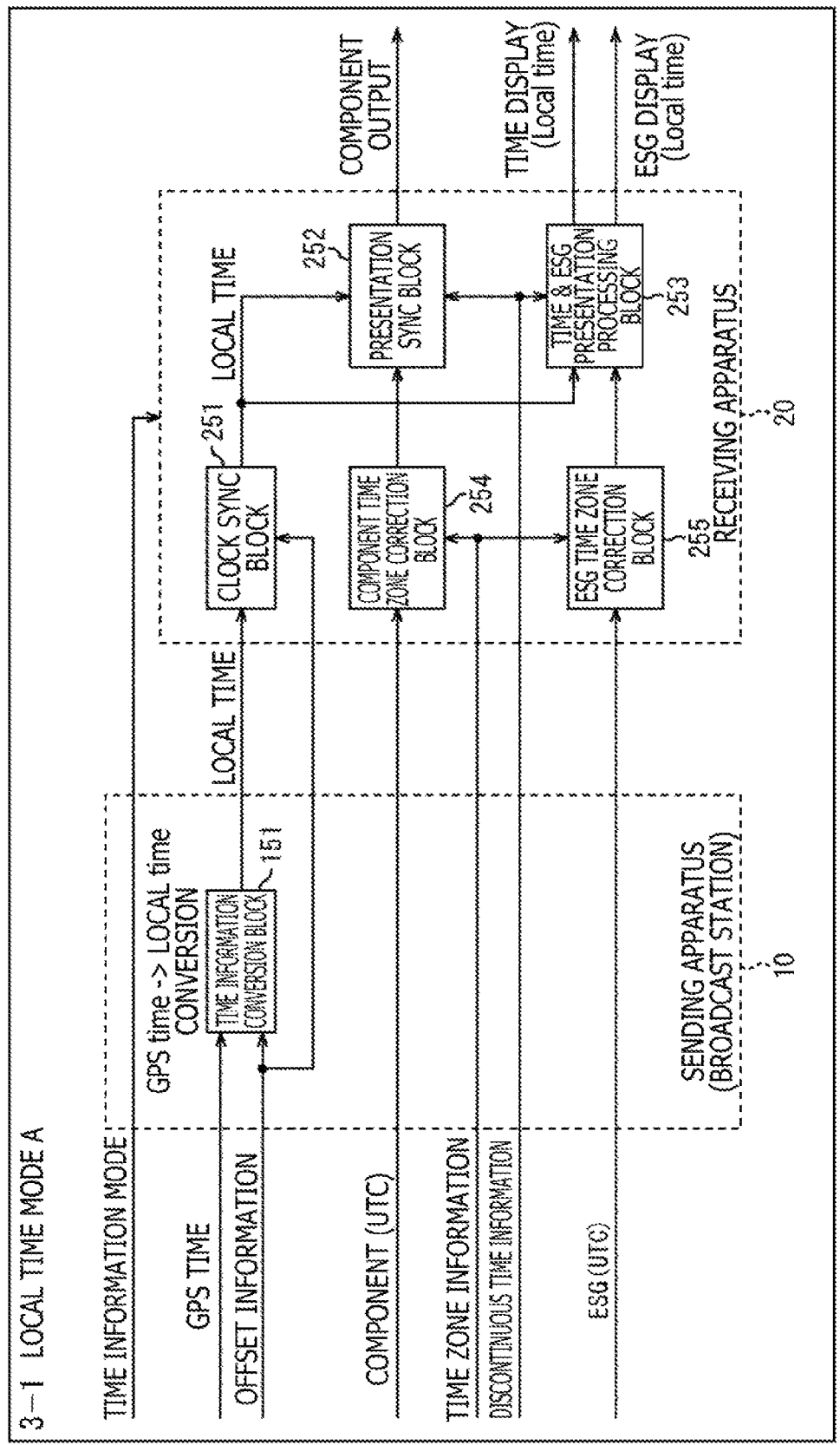
FIG. 16 is a diagram illustrating an overview of the processing by the sending side and the receiving side corresponding to local time mode A.

FIG. 16 depicts a diagram illustrating an overview of the processing to be executed on the sending side and the receiving side corresponding to local time mode A.

As depicted in FIG. 16, the data sent from the sending apparatus 10 of a broadcasting station depicted in the left side of the diagram is received by the receiving apparatus 20 depicted in the right side of the diagram and the time information processing in accordance with local time mode A is executed in the receiving apparatus 20.

In the sending apparatus 10 in the broadcasting station, the time information conversion block 151 converts GPS time into local time by correcting the difference between the GPS time and the local time by use of offset information. Consequently, the local time as time information is obtained.

Further, in the sending apparatus 10, time information metadata is generated. This time information metadata includes time information mode, offset information, time zone information, and discontinuous time information. Here, for the time information mode, a local time mode is set. For the offset information, an offset value between the reference time (PTP, for example) and the local time is set, for example.

The sending apparatus 10 sends a broadcast stream including the local time as time information and the time information metadata to the receiving apparatus 20 via the transmission path 30. Further, in the sending apparatus 10, the video and audio components and the ESG (the data thereof) are processed to be included in the broadcast stream. However, in the case of local time mode A, the time zone of component and ESG time lines is UTC.

On the other hand, in the receiving apparatus 20, the broadcast stream sent from the sending apparatus 10 via the transmission path 30 is received. This broadcast stream includes the local time as time information, time information metadata, video and audio components, and the ESG (the data thereof). The receiving apparatus 20 operates in local time mode A (the local time mode) in accordance with the time information mode included in the time information metadata.

Here, in the receiving apparatus 20, the local time as time information and the offset information included in the time information metadata are entered in the clock synchronization block 251. In the clock synchronization block 251, clock synchronization is executed by use of the local time as time information.

However, in executing the clock synchronization by use of the local time, the clock synchronization block 251 corrects the leap second and the summer time (DST) by executing offset value correction by use of offset information (an offset value).

That is, here, the offset value between the reference time (PTP, for example) and the local time is indicative of a value (a value including both the leap second and the summer time (DST)) obtained by adding the integrated value of the leap second and the variation of the summer time (DST), so that both the leap second and the summer time (DST) are corrected by use of this offset value. That is to say, here, the time information for use in clock synchronization must be counted in a linear manner, so that reference-time matching can be provided by executing offset value correction.

Then, the clock synchronization block 251 supplies the local time as internal time to presentation synchronization block 252 and the time and ESG display processing block 253.

The component (the data thereof) in which the time zone of time line becomes UTC and the time zone information included in the time information metadata are entered in the component time zone correction block 254.

The component time zone correction block 254 executes component time zone correction on the basis of time zone information, thereby converting the time zone (UTC) of a component into the local time. Then, the component time zone correction block 254 supplies the component (the data thereof) after the time zone correction to the presentation synchronization block 252.

The internal time (the local time) from the clock synchronization block 251, the component (the data thereof) from the component time zone correction block 254, and the discontinuous time information included in the time information metadata are entered in the presentation synchronization block 252.

By use of the internal time (the local time) from the clock synchronization block 251, the presentation synchronization block 252 processes the component (the data thereof) in which the time zone of time line becomes the local time, thereby realizing presentation synchronization. Then, the presentation synchronization block 252 outputs the presentation-synchronized video and audio components (the data thereof). It should be noted that, in executing presentation synchronization, presentation synchronization block 252 can execute the processing that uses the discontinuous information (the information associated with the leap second, for example) as required.

The ESG (the data thereof) in which the time zone of time line becomes UTC and the time zone information included in the time information metadata are entered in the ESG time zone correction block 255.

The ESG time zone correction block 255 executes ESG time zone correction on the basis of time zone information, thereby converting the time zone (UTC) of an ESG into the local time. Then, the ESG time zone correction block 255 supplies the ESG (the data thereof) after the time zone correction to the time and ESG display processing block 253.

The internal time (the local time) from the clock synchronization block 251, the ESG (the data thereof) from the ESG time zone correction block 255, and the discontinuous time information included in the time information metadata are entered in the time and ESG display processing block 253.

If time display is executed, the time and ESG display processing block 253 processes the internal time (the local time) from the clock synchronization block 251, thereby displaying the time corresponding to the local time. Further, if ESG display is executed, the time and ESG display processing block 253 processes the ESG (the data thereof) in which the time zone of time line becomes the local time, thereby displaying the ESG corresponding to the local time.

It should be noted that, in executing time display or ESG display, the time and ESG display processing block 253 can execute the processing by use of the discontinuous time information (the information associated with the leap second, for example) as required.

As described above, in the local time mode A, the sending apparatus 10 transmits the time information metadata including the information (the offset information, for example) for executing the time information processing corresponding to the local time mode A along with the local time as time information to the receiving apparatus 20 which then can execute the time information processing in accordance with the local time mode A by use this time information metadata.

(3-2) Local Time Mode B

Figure 17:
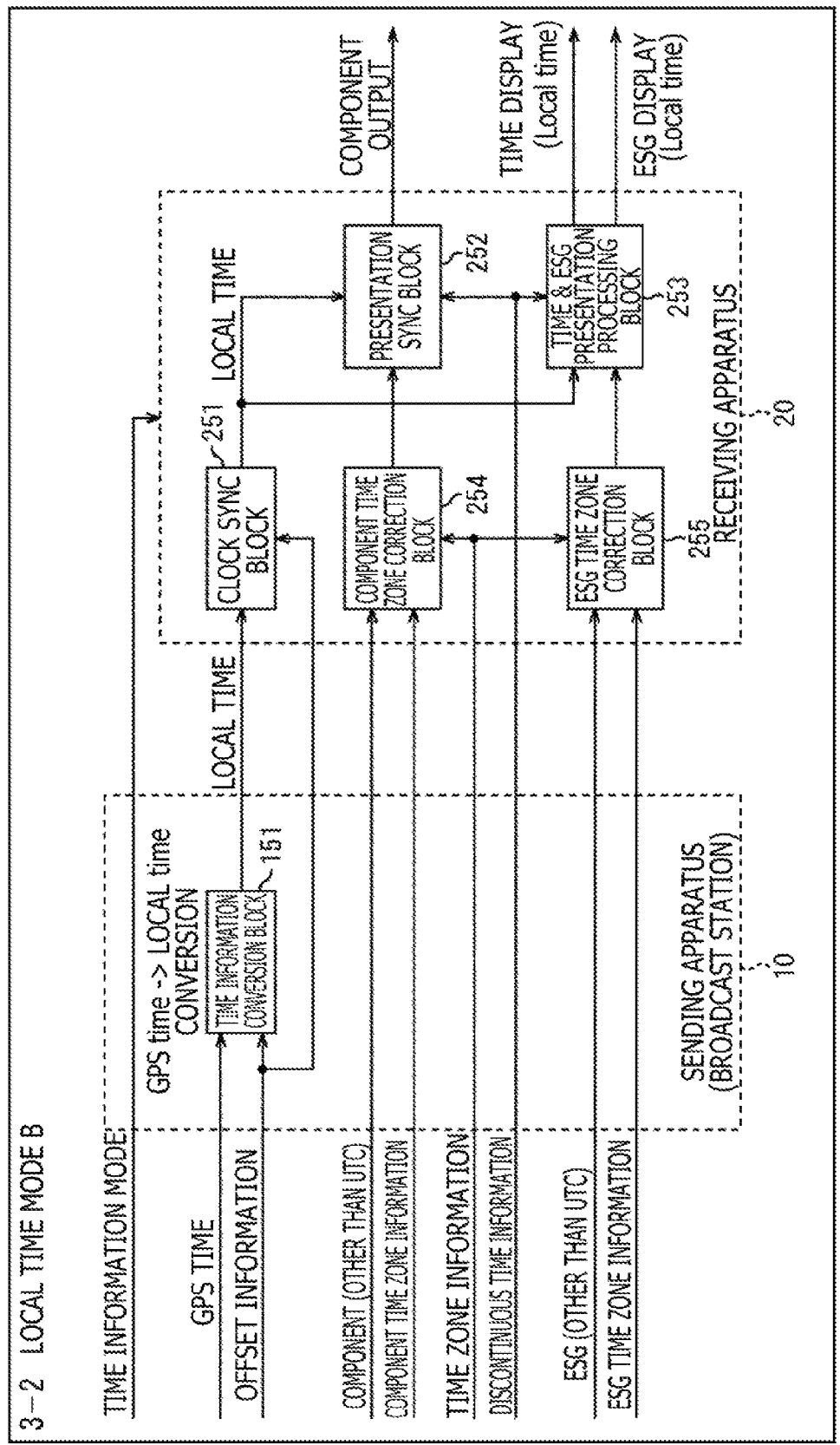
FIG. 17 is a diagram illustrating an overview of the processing by the sending side and the receiving side corresponding to local time mode B.

FIG. 17 depicts a diagram illustrating an overview of the processing to be executed on the sending side and the receiving side corresponding to local time mode B.

As depicted in FIG. 17, the data sent from the sending apparatus 10 of a broadcasting station depicted in the left side of the diagram is received by the receiving apparatus 20 depicted in the right side of the diagram and the time information processing in accordance with local time mode B is executed in the receiving apparatus 20.

In the sending apparatus 10 in the broadcasting station, the time information conversion block 151 converts GPS time into local time by correcting the difference between the GPS time and the local time by use of offset information. Consequently, the local time as time information is obtained.

Further, in the sending apparatus 10, time information metadata is generated. This time information metadata includes time information mode, offset information, component time zone information, time zone information, discontinuous time information, and ESG time zone information. Here, for the time information mode, a local time mode is set. For the offset information, an offset value between the reference time (PTP, for example) and the local time are set, for example.

The sending apparatus 10 sends a broadcast stream including the local time as time information and the time information metadata to the receiving apparatus 20 via the transmission path 30. Further, in the sending apparatus 10, the video and audio components and the ESG (the data thereof) are processed to be included in the broadcast stream. However, in the case of local time mode B, the time zone of component and ESG time lines is a time zone other than UTC.

On the other hand, in the receiving apparatus 20, the broadcast stream sent from the sending apparatus 10 via the transmission path 30 is received. This broadcast stream includes the local time as time information, time information metadata, video and audio components, and the ESG (the data thereof). The receiving apparatus 20 operates in local time mode B (the local time mode) in accordance with the time information mode included in the time information metadata.

Here, in the receiving apparatus 20, the local time as time information and the offset information included in the time information metadata are entered in the clock synchronization block 251. In the clock synchronization block 251, clock synchronization is executed by use of the local time as time information.

However, in executing the clock synchronization by use of the local time, the clock synchronization block 251 corrects the leap second and the summer time (DST) by executing offset value correction by use of offset information (an offset value). That is, the offset value between the reference time (PTP, for example) and the local time is indicative of a value (a value including both the leap second and the summer time (DST)) obtained by adding the integrated value of the leap second and the variation of the summer time (DST), so that both the leap second and the summer time (DST) are corrected by use of this offset value.

Then, the clock synchronization block 251 supplies the local time as internal time to the presentation synchronization block 252 and the time and ESG display processing block 253.

The component (the data thereof) in which the time zone of time line becomes a time zone other than UTC and the component time zone information and the time zone information both included in the time information metadata are entered in the component time zone correction block 254.

The component time zone correction block 254 executes component time zone correction on the basis of the component time zone information and the time zone information, thereby converting the time zone (other than UTC) of a component into the local time. Then, the component time zone correction block 254 supplies the component (the data thereof) after the time zone correction to the presentation synchronization block 252.

The internal time (the local time) from the clock synchronization block 251, the component (the data thereof) from the component time zone correction block 254, and the discontinuous time information included in the time information metadata are entered in the presentation synchronization block 252.

By use of the internal time (the local time) from the clock synchronization block 251, the presentation synchronization block 252 processes the component (the data thereof) in which the time zone of time line becomes the local time, thereby realizing presentation synchronization. Then, the presentation synchronization block 252 outputs the presentation-synchronized video and audio components (the data thereof). It should be noted that, in executing presentation synchronization, presentation synchronization block 252 can execute the processing that uses the discontinuous information (the information associated with the leap second, for example) as required.

The ESG (the data thereof) in which the time zone of time line becomes a time zone other than UTC and the ESG time zone information and the time zone information both included in the time information metadata are entered in the ESG time zone correction block 255.

The ESG time zone correction block 255 executes ESG time zone correction on the basis of the ESG time zone information and the time zone information, thereby converting the time zone (other than UTC) of an ESG into the local time. Then, the ESG time zone correction block 255 supplies the ESG (the data thereof) after the time zone correction to the time and ESG display processing block 253.

The internal time (the local time) from the clock synchronization block 251, the ESG (the data thereof) from the ESG time zone correction block 255, and the discontinuous time information included in the time information metadata are entered in the time and ESG display processing block 253.

If time display is executed, the time and ESG display processing block 253 processes the internal time (the local time) from the clock synchronization block 251, thereby displaying the time corresponding to the local time. Further, if ESG display is executed, the time and ESG display processing block 253 processes the ESG (the data thereof) in which the time zone of time line becomes the local time, thereby displaying the ESG corresponding to the local time.

It should be noted that, in executing time display or ESG display, the time and ESG display processing block 253 can execute the processing by use of the discontinuous time information (the information associated with the leap second, for example) as required.

As described above, in the local time mode B, the sending apparatus 10 transmits the time information metadata including the information (the offset information, for example) for executing the time information processing corresponding to the local time mode B along with the local time as time information to the receiving apparatus 20 which then can execute the time information processing in accordance with the local time mode B by use this time information metadata.

(3-3) Local Time Mode C

Figure 18:
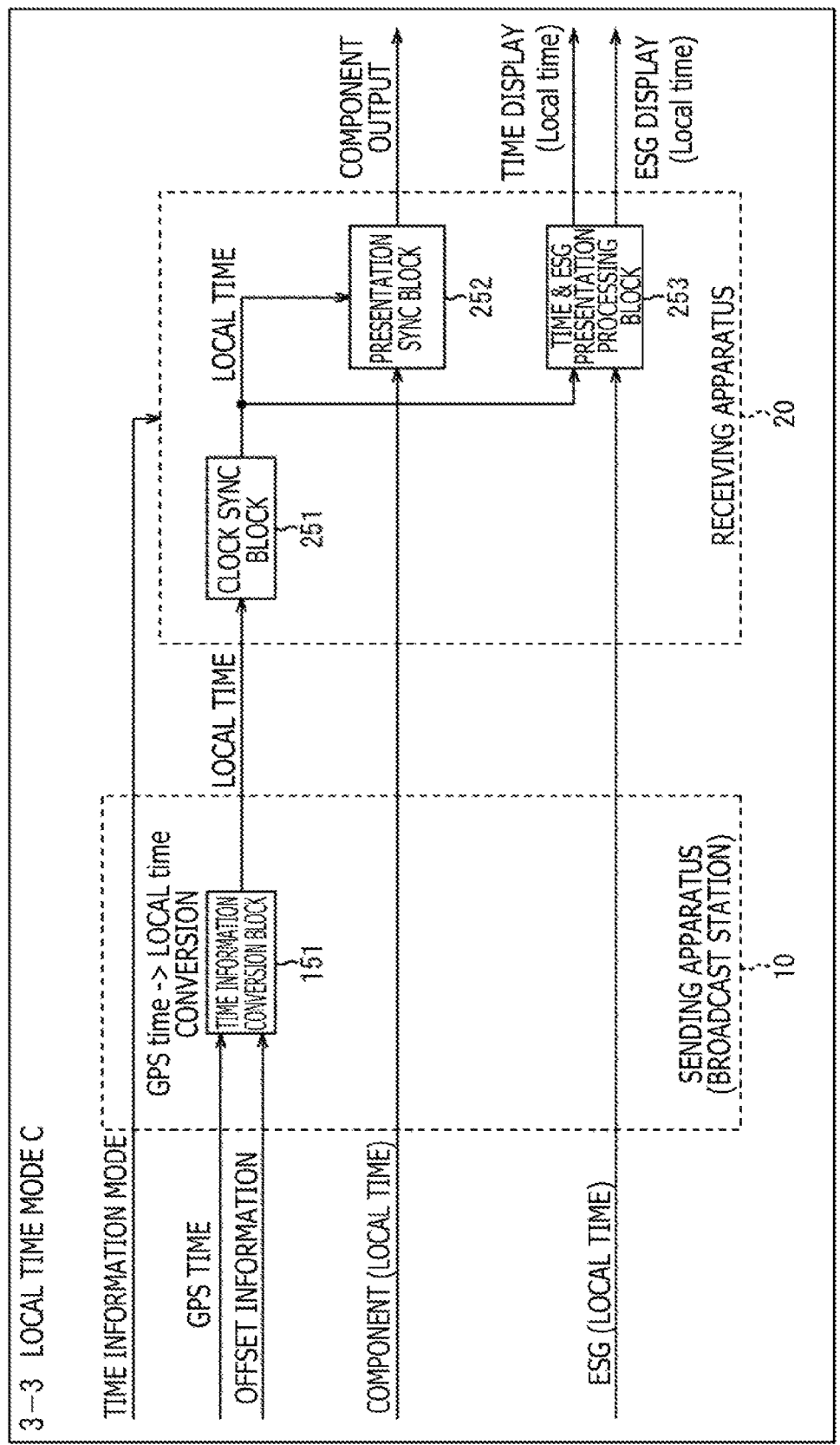
FIG. 18 is a diagram illustrating an overview of the processing by the sending side and the receiving side corresponding to local time mode C.

FIG. 18 depicts a diagram illustrating an overview of the processing to be executed on the sending side and the receiving side corresponding to local time mode C.

As depicted in FIG. 18, the data sent from the sending apparatus 10 of a broadcasting station depicted in the left side of the diagram is received by the receiving apparatus 20 depicted in the right side of the diagram and the time information processing in accordance with local time mode C is executed in the receiving apparatus 20.

In the sending apparatus 10 in the broadcasting station, the time information conversion block 151 converts GPS time into local time by correcting the difference between the GPS time and the local time by use of offset information. Consequently, the local time as time information is obtained.

Further, in the sending apparatus 10, time information metadata is generated. This time information metadata includes time information mode. Here, for the time information mode, a local time mode is set.

The sending apparatus 10 sends a broadcast stream including the local time as time information and the time information metadata to the receiving apparatus 20 via the transmission path 30. Further, in the sending apparatus 10, the video and audio components and the ESG (the data thereof) are processed to be included in the broadcast stream. However, in the case of local time mode B, the time zone of component and ESG time lines is the local time.

On the other hand, in the receiving apparatus 20, the broadcast stream sent from the sending apparatus 10 via the transmission path 30 is received. This broadcast stream includes the local time as time information, time information metadata, video and audio components, and the ESG (the data thereof). The receiving apparatus 20 operates in local time mode C (the local time mode) in accordance with the time information mode included in the time information metadata.

Here, in the receiving apparatus 20, in the clock synchronization block 251, clock synchronization is executed by use of the local time as time information. Further, the clock synchronization block 251 supplies the local time as internal time to the presentation synchronization block 252 and the time and ESG display processing block 253.

However, in this example of local time mode C, the above-mentioned clock synchronization scheme in which the physical layer clock synchronizes with the system clock is employed, so that the offset value is not needed in the clock synchronization in the clock synchronization block 251.

The internal clock (the local time) from the clock synchronization block 251 and the component (the data thereof) in which the time zone of time line becomes the local time are entered in the presentation synchronization block 252.

By use of the internal time (the local time) from the clock synchronization block 251, the presentation synchronization block 252 processes the component (the data thereof) in which the time zone of time line becomes the local time, thereby realizing presentation synchronization. Then, the presentation synchronization block 252 outputs the presentation-synchronized video and audio components (the data thereof).

The internal time (the local time) from the clock synchronization block 251 and the ESG (the data thereof) in which the time zone of time line becomes the local time are entered in the time and ESG display processing block 253.

If time display is executed, the time and ESG display processing block 253 processes the internal time (the local time) from the clock synchronization block 251, thereby displaying the time corresponding to the local time. Further, if ESG display is executed, the time and ESG display processing block 253 processes the ESG (the data thereof) in which the time zone of time line becomes the local time, thereby displaying the ESG corresponding to the local time.

As described above, in the local time mode C, the sending apparatus 10 transmits the time information metadata including the information for executing the time information processing corresponding to the local time mode C along with the local time as time information to the receiving apparatus 20 which then can execute the time information processing in accordance with the local time mode C by use this time information metadata.

It should be noted that, in FIG. 18, the clock synchronization scheme in which the above-proposed physical layer clock is synchronized with the system clock is employed so as to make the offset value unnecessary for the clock synchronization by the clock synchronization block 251. However, if this clock synchronization scheme is not used, the offset information (the offset value between the reference time (PTP, for example) and the local time) may be included in the time information metadata. Then, in the receiving apparatus 20, in executing the clock synchronization by use of local time, the clock synchronization block 251 can use the offset value between the reference time (PTP, for example) and the local time so as to execute offset value correction, thereby correcting the leap second and the summer time (DST).

(B) Correspondence Between the Leap Second and the Summer Time (DST)

(Example of the Adjustment of Time by Leap Second Correction)

Figure 19:
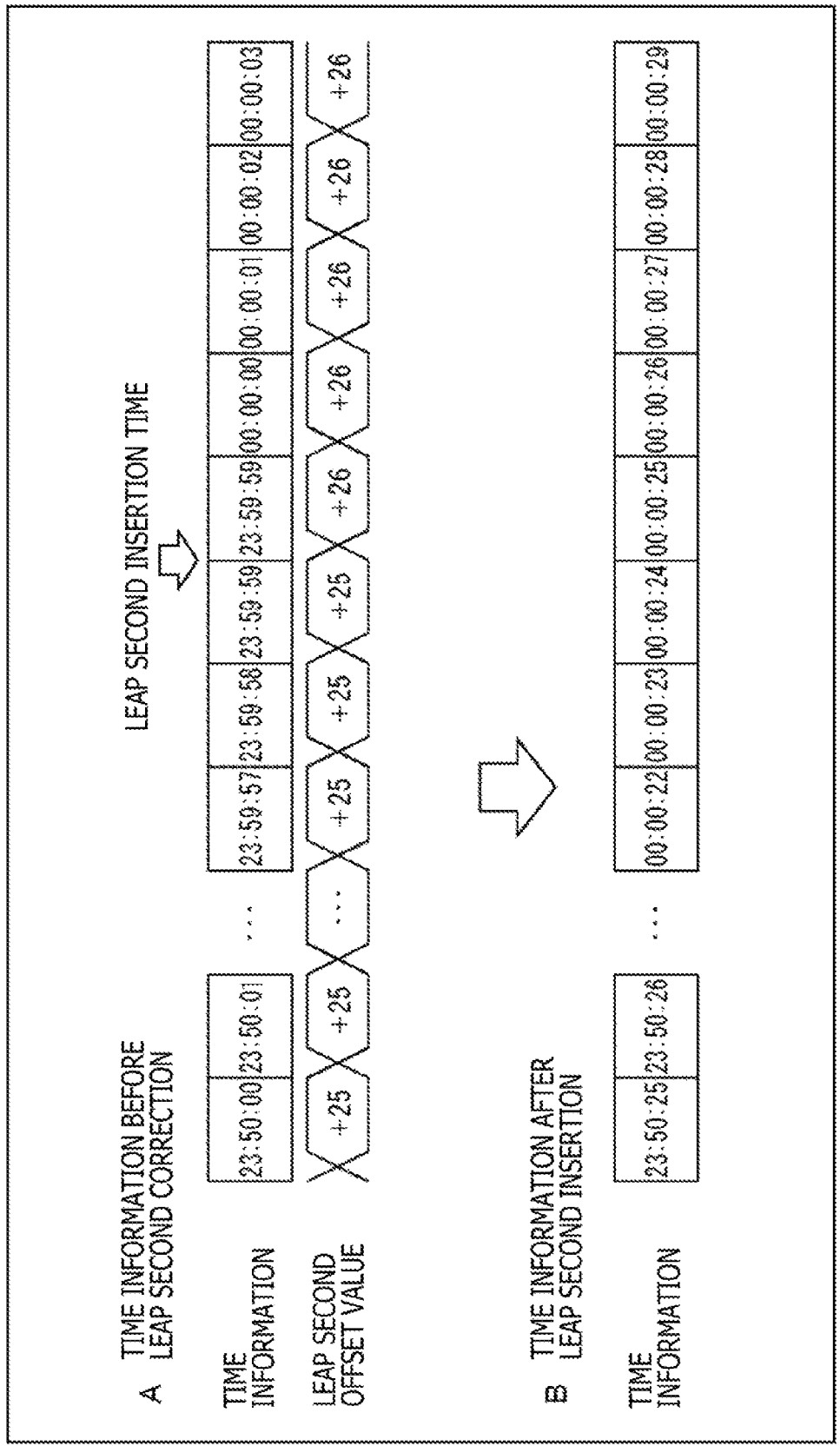
FIG. 19 is a diagram illustrating an example of the adjustment of time by the leap second correction using time information metadata.

FIG. 19 depicts a diagram illustrating an example of the adjustment of time by the leap second correction by use of time information metadata executed by the receiving apparatus 20.

As depicted in FIG. 19, the direction of time the direction from the left side of the diagram to the right side thereof and the time series of the time information before and after the leap second correction are indicated in A of FIG. 19 and B of FIG. 19.

In the time series before the leap second correction depicted in A of FIG. 19, the number in each of consecutive rectangles is indicative of the time corresponding to the time information such as UTC and the number in each of consecutive pentagons below the above-mentioned consecutive rectangles is indicative of the offset value (unit: second) of the leap second in the time concerned. However, the offset value of the leap second is obtained from the offset information or the discontinuous time information included in the time information metadata. Further, the leap second insertion time is identified by the start time and the end time of the leap second included in this time information metadata (the discontinuous time information).

For example, is the leap second is inserted at 23:59:59 of 6/30, then +25 seconds are set to the offset value of the leap second. That is, this denotes that the leap second has been inserted 25 times up to this point of time. From the time at which the leap second has been inserted or deleted up to 23:59:59 of 6/30 that is immediately before the insertion of the leap second, +25 seconds are set to the offset value of the leap second.

Then, when the time in accordance with the time information is switched from 23:59:59 of 6/30 to 00:00:00 of 7/1, the offset value of the leap second is adjusted from +25 seconds to +26 seconds in accordance with the insertion (+1 second) of the leap second at the time in accordance with the time information. Then, subsequent to 00:00:00 of 7/1, +26 seconds after the adjustment is set to the offset value of the leap second.

On the other hand, the time series depicted in B of FIG. 19 is indicative of the time series after the leap second correction by use of the offset value of the leap second corresponding to the time series depicted in A of FIG. 19. For example, in the time series depicted in A of FIG. 19, 23:50:00 of 6/30 becomes, after the leap second correction, 23:50:25 obtained by adding 25 seconds as indicated by the time series depicted in B of FIG. 19 because the offset value of the leap second is +25 seconds. Subsequently, likewise, from 23:50:01 of 6/30 up to 23:59:59 immediately before the leap second is inserted, the time after the leap second correction becomes the time with 25 seconds added in accordance with the offset value of the leap second.

Then, when, in the time series depicted in A of FIG. 19, the time in accordance with the time information such as UTC is switched from 23:59:59 of 6/30 to 00:00:00 of 7/1, the leap second is inserted (+1 second) to adjust the offset value of the leap second from +25 seconds to +26 seconds, so that, subsequently, in the time series depicted in B of FIG. 19, the time after the leap second correction becomes the time with 26 seconds added in accordance with the offset value of the leap second.

Here, if 23:59:59 of 6/30 at which the leap second is inserted is focused, then +25 seconds are set to 23:59:59 immediately before as the offset value of the leap second and the time after the leap second correction becomes 00:00:24 of 7/1. On the other hand, +26 seconds are set to 23:59:59 immediately after the insertion of the leap second as the offset value of the leap second and the time after the leap second correction becomes 00:00:25 of 7/1.

As described above, in the leap second correction using an offset value of the leap second, the offset values of the leap second can be added so as to make conversion to continuous times as with . . . , 00:00:25, 00:00:26, . . . , even before or after the insertion of the leap second. Hence, in the case of UTC, for example, even in the time information requiring leap second correction, the time after leap second correction can be handled as a continuous time (time information), thereby enabling the use of this time information for presentation synchronization.

Figure 20:
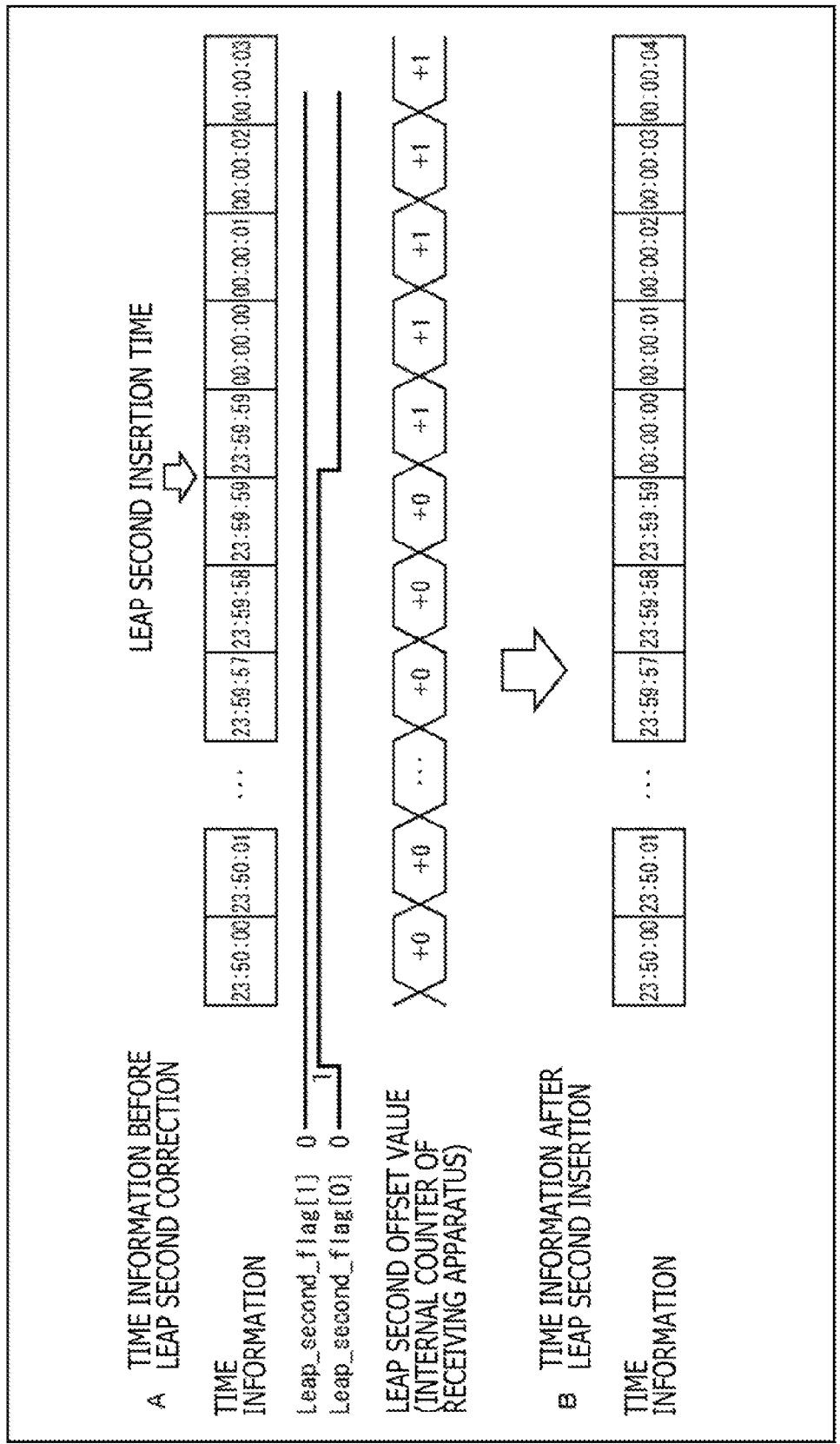
FIG. 20 is a diagram illustrating an example of the adjustment of time by the leap second correction using an internal counter.

Example of the Adjustment of Time by the Leap Second Correction by Use of an Internal Counter FIG. 20 depicts a diagram illustrating an example of the adjustment of time by the leap second correction using an internal counter.

As depicted in FIG. 20, the direction of time the direction from the left side of the diagram to the right side thereof and the time series of the time information before and after the leap second correction are indicated in A of FIG. 20 and B of FIG. 20.

In the time series before the leap second correction depicted in A of FIG. 20, the number in each of consecutive rectangles is indicative of the time corresponding to the time information such as UTC and, below these consecutive rectangles, a timing chart of the leap second flags (Leap_second_flag) is indicated.

That is, Leap_second_flag[0] is indicative of a leap second occurrence time; for example, the information that leap second adjustment processing is executed can be given by setting up a bit from one day before (before 24 hours) the insertion (+1 second) of the leap second. Further, Leap_second_flag[1] is also indicative of the insertion or the deletion of the leap second; in this example, "0" is set as Leap_second_flag[1] because the insertion (+1 second) of the leap second is executed.

Here, if the leap second is inserted at 23:59:59 of 6/30, for example, Leap_second_flag[0] is switched from "0" to "1" when it becomes one day before (24 hours before) the leap second adjustment processing, for example is executed. Consequently, the information that the leap second adjustment processing is executed within 24 hours is sent to the receiving apparatus 20. Then, this state continues until the time in accordance with the time information such as UTC becomes 23:59:59 of 6/30 and, when 23:59:59 of 6/30 is reached, Leap_second_flag[0] is switched from "1" to "0" in accordance with the insertion of the leap second into the time in accordance with the time information.

Further, the consecutive pentagons below the timing chart of the leap second flags (Leap_second_flag) are indicative of a timing chart of the internal counter 222A of the receiving apparatus 20 (the time information processing block 222 thereof). However, in the timing chart of the internal counter 222A of the receiving apparatus 20, the number in each of the pentagons is indicative of the value held in the internal counter 222A. That is to say, in the internal counter 222A in the receiving apparatus 20, the initial value thereof is "+0;" however, when the Leap_second_flag[0] has been switched from "1" to "0," the counter value is advanced by 1, subsequently "+1" being held.

On the other hand, the time series depicted in B of FIG. 20 is indicative of a time series after the second correction using the value of the internal counter 222A of the receiving apparatus 20. For example, since, in the time series in A of FIG. 20, the value of the internal counter 222A is +40 seconds, the time after the leap second correction remains to be 23:50:00 of 6/30 as depicted in the time series in B of FIG. 20. Subsequently, likewise, the value of the internal counter 222A becomes +0 second from 23:50:01 of 6/30 up to 23:59:59 immediate before the insertion of the leap second, so that the time after the leap second correction is the similar time to that before the correction.

Then, when the time series in accordance with the time information such as UTC becomes 23:59:59 in the time series in A of FIG. 20, the leap second is inserted (+1 second) so as to count up the value of the internal counter 222A from +0 second to +1 second, so that, subsequently, the time after the leap second correction becomes a time obtained by adding 1 second in accordance with the value of the internal counter 222A in the time series in B of FIG. 20.

Here, an attention is paid that 23:59:59 of 6/30 at which the leap second is inserted, +0 second is set to the 23:59:59 immediately before as the value of the internal counter 222A, the time after the leap second correction remaining to be 23:59:59 of 6/30. On the other hand, +1 second is set to the 23:59:59 immediately after the insertion of the leap second as the value of the internal counter 222A, the time after the leap second correction becoming 00:00:00 of 7/1.

As described above, in the leap second correction by use of the internal counter 222A of the receiving apparatus 20, the values of the internal counter 222A are added so as to make conversion like . . . , 23:59:59, 00:00:00, . . . even before or after the insertion of the leap second. Hence, even with the time information for which the leap second correction is necessary as with UTC, for example, the time before or after the leap second correction can be handled as a continuous time (time information), thereby making this time information usable for presentation synchronization.

Further, holding a value in accordance with a leap second flag (Leap_second_flag) by the internal counter 222A of the receiving apparatus 20 allows the acquisition of the similar effect as that obtained in a case where the leap second offset described above with reference to FIG. 19 is used.

That is, in FIG. 20, if the leap second is inserted next, the value of the internal counter 222A is counted from +1 second up to +2 seconds before or after this insertion in accordance with a leap second flag. Likewise, subsequently, every time the leap second is inserted, so that the value of the internal counter 222A is equivalent to the above-described offset value of the leap second. Therefore, in the receiving apparatus 20, holding the value in accordance with the leap second flag by the internal counter 222A makes it unnecessary for the offset value of the leap second to be included in the time information metadata.

It should be noted that the case where the leap second is inserted is described in the example depicted in FIG. 20; however, it is possible for the leap second to be deleted (−1 second) in the case of which the value of the internal counter 222A of the receiving apparatus 20 is down counted. In the deletion of the leap second, "1" is set as Leap_second_flag [1].

(Example of the Adjustment of Time by DST Correction)

Figure 21:
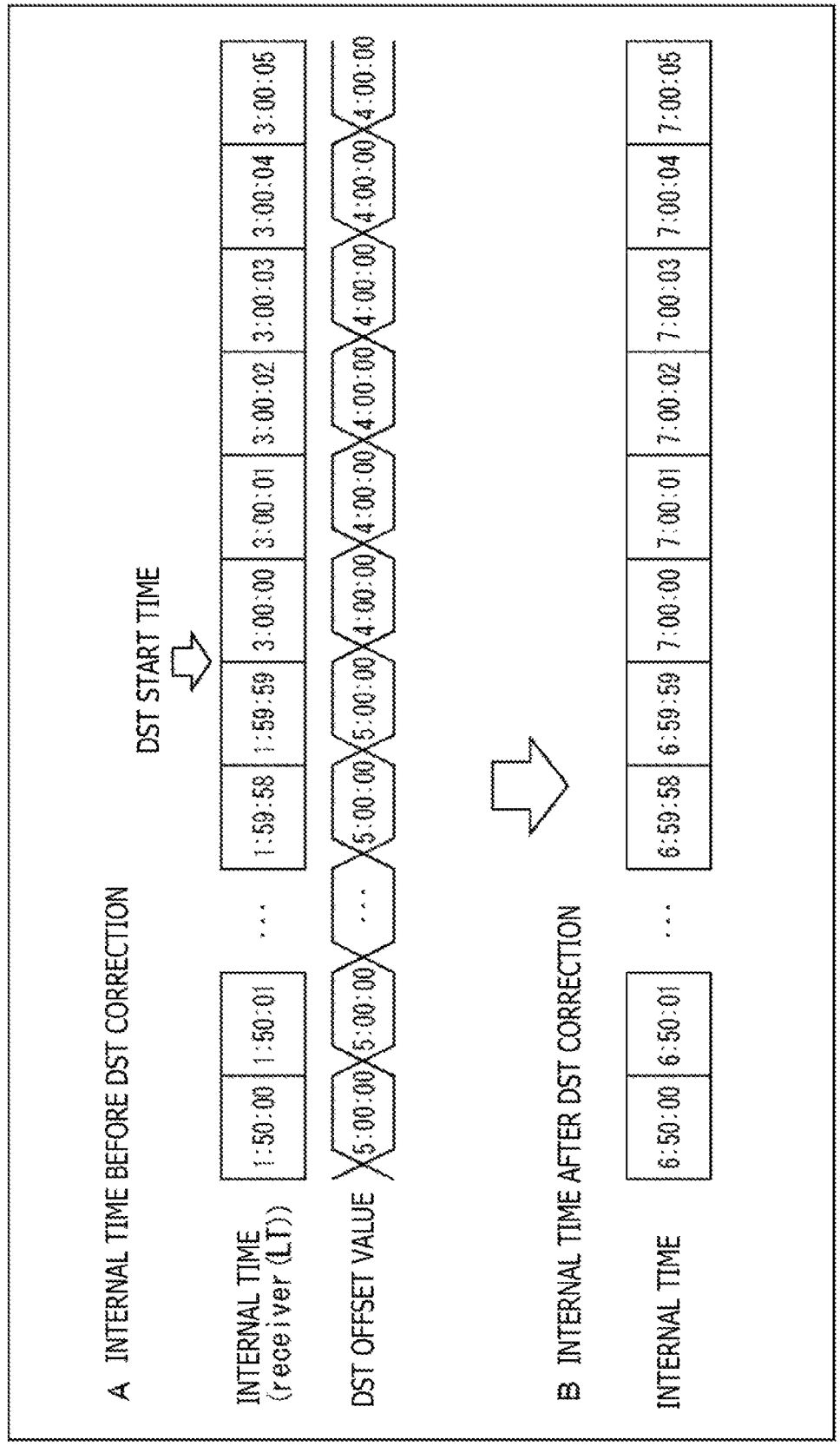
FIG. 21 is a diagram illustrating an example of the adjustment of time by DST correction using time information metadata.

FIG. 21 depicts a diagram illustrating an example of the adjustment of the time by the DST correction by use of time information metadata executed by the receiving apparatus 20.

As depicted in FIG. 21, the direction of time the direction from the left side of the diagram to the right side thereof and the time series of the internal time before and after the DST correction are indicated in A of FIG. 21 and B of FIG. 21.

In the time series before DST correction in A of FIG. 21, the number in each of consecutive rectangles is indicative of the internal time such as local time and the number in the pentagons below the consecutive rectangles is indicative of the DST offset value (unit: hour, minute, and second) in this internal time. However, the DST offset value can be obtained from the offset information or the discontinuous time information both included in the time information metadata. Further, the start time of the summer time (DST) is identified by the date or time included in this information metadata (the discontinuous time information) at which the time becomes discontinuous next.

For example, if the standard time ends at 1:59:59 of 3/9 and the summer time (DST) start at 2:00:00 of 3/9, then 5:00:00 is set as the DST offset for a period from the time at which the last summer time (DST) ended and 1:59:59 of 3/9 at which the summer time (DST) starts.

Then, when the internal time is switched from 1:59:59 of 3/9 to 2:00:00, the internal time becomes the start time of the summer time (DST) and the internal time is switched from 1:59:59 to 3:00:00, upon which the DST offset value is adjusted from 5:00:00 to 4:00:00. Subsequent to 3:00:00 of 3/9, the 4:00:00 after the adjustment is set as the DST offset value.

On the other hand, the time series in B of FIG. 21 is indicative of the time series after the DST correction by use of the DST offset value corresponding to the time series in A of FIG. 21. For example, in the time series in A of FIG. 21, since the DST offset value is 5:00:00, 1:50:00 of 3/9 becomes, after the DST correction, 6:50:00 of 3/9 obtained by adding 5:00:00 as depicted with the time series in B of FIG. 21. Subsequently, likewise, in the period from 1:50:01 of 3/9 to 1:59:59 of 3/9 immediately before the start of the summer time (DST), the time after the DST correction becomes the time obtained by adding 5:00:00 in accordance with the DST offset value.

Then, when the internal time is switched from 1:59:59 of 3/9 to 2:00:00 in the time series in A of FIG. 21, the start time of the summer time (DST) starts, upon which the DST offset value is adjusted from 5:00:00 to 4:00:00, so that, subsequently, the time after the DST correction becomes the time obtained by adding 4:00:00 in accordance with the DST offset value in the time series in B of FIG. 21.

Here, when switching from 1:59:59 of 3/9 that is the start time of the summer time (DST) to 3:00:00 is focused, 5:00:00 is set to 1:59:59 immediately before as a DST offset value, upon which the time after the DST correction becomes 6:59:59 of 3/9. On the other hand, 4:00:00 is set to the 3:00:00 immediately after the switching to the summer time (DST) as a DST offset time, upon which the time after the DST correction becomes 7:00:00 of 3/9.

As described above, in the DST correction by use of a DST offset value, the offset values of the DST offset values can be added so as to make conversion to continuous times as with . . . , 6:59:59, 7:00:00, . . . , even before or after the insertion of the leap second. Hence, for example, even in such regions where the summer time (DST) is practiced as the United States of America and European countries, the time after the DST correction can be handled as a continuous time (an internal time), so that this internal time can be used for presentation synchronization.

(Relation Between Internal Time and Media Time Line)

Figure 22:
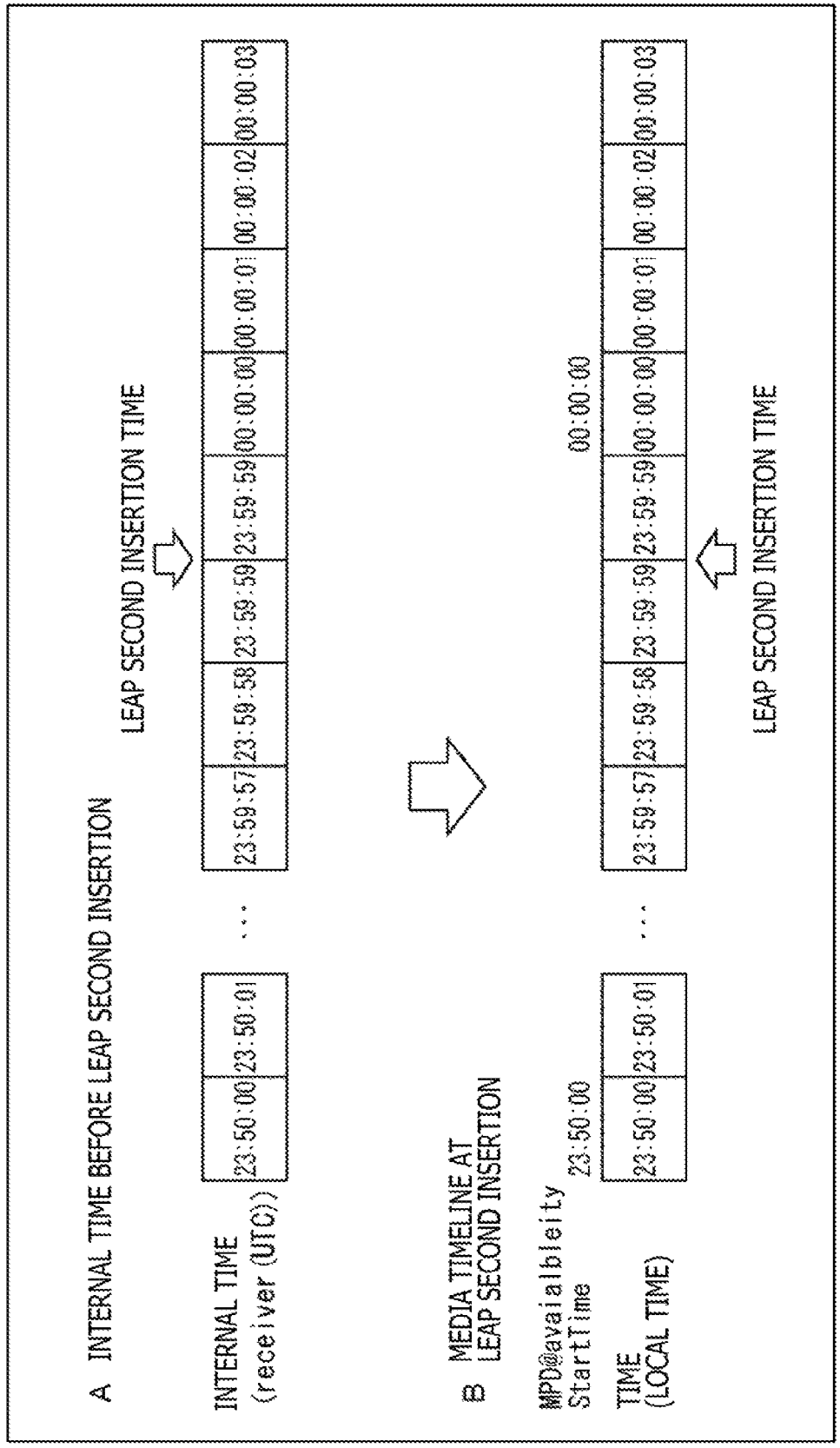
FIG. 22 is a diagram illustrating a relation between internal time and media time line with the leap second inserted.

The following describes the relation between the internal time of the receiving apparatus 20 and a media time line (the time line of a component) based on MPD (availabilityStartTime attribute thereof) with reference to FIG. 22 and FIG. 23. First, the relation between the internal time and the media time line at the time of leap second insertion is described with reference to FIG. 22; then, the relation between the internal time and the media time line at the time of the start of the summer time (DST) is described with reference to FIG. 23.

As depicted in FIG. 22, the time series of the internal time at the time of leap second insertion and the time series of the media time line at the time of leap second insertion are indicated in A of FIG. 22 and B of FIG. 22, respectively.

In the time series of the internal time at the time of leap second insertion in A of FIG. 22, the number in each of consecutive rectangles is indicative of a time in accordance with the internal time of UTC or the like. In this example, the leap second is inserted (+1 second) when the internal time is switched from 23:59:59 of 6/30 to 00:00:00 of 7/1.

Here, in the sending apparatus 10, it is configured that the anchor information (namely, availabilityStartTime of MPD) described to a component (media) is synchronized with the time information of UTC or the like. Hence, in the time series of the media time line in B of FIG. 22, the leap second is inserted (+1 second) with the same timing as the time series of the internal time in A of FIG. 22, thereby correctly following the mutual time series in the receiving apparatus 20.

It should be noted that in the time series of the media time line in B of FIG. 22, the local time is used; however, in the case of different time zones, the time zone of the component may be corrected by use of the component time zone information or the time zone information both included in the time information metadata.

Further, in FIG. 23, the time series of the internal time at the time of start of the summer time (DST) and the time series of the media time line at the start of the summer time (DST) are indicated in A of FIG. 23 and B of FIG. 23, respectively.

In the time series of the internal time at the start of the summer time (DST) in A of FIG. 23, the number in each of consecutive rectangles is indicative of the time in accordance with the internal time such as the local time. In this example, when the internal time is switched from 1:59:59 of 3/9 to 2:00:00, the internal time becomes the start time of the summer time (DST), 1:59:59 being switched to 3:00:00.

Here, in the sending apparatus 10, it is configured that the anchor information (namely, availabilityStartTime of MPD) described to a component (media) is synchronized with the time information such as the local time or the like. Hence, in the time series of the media time line in B of FIG. 23, the summer time (DST) starts with the same timing as the time series of the internal time in A depicted of FIG. 23, thereby correctly following the mutual time series in the receiving apparatus 20.

It should be noted that, in B of in FIG. 23, an example of the time series of a media time line (the time line of a component) is depicted; however, the time line of ESG is processed by the sending apparatus 10 of a broadcasting station, so that the ESG can be synchronized for display by the similar processing to that of a component (media) described above in the receiving apparatus 20.

(C) Example of Syntax (Syntax of Time Information Metadata)

FIG. 24 depicts a diagram illustrating an example of the syntax of time information metadata.

A 3-bit time_mode is a time information mode specified for each format of time information (a time format). For example, if "0" is set for this time_mode, then the time information mode is the UTC mode. If "1" is set for time_mode, for example, the PTP mode is provided; if "2" is set for time_mode, the local time mode is provided.

A 5-bit timezone is time zone information. For this time zone information, the information (+/−12 for UtC) represented by the standard time of that region by a difference with UTC.

A 16-bit timeOffset is offset information. For this offset information, an offset value between a standard time and a discontinuous time is included. For the standard time, a time specified by the standard, such as a time specified by PTP, for example, is used.

For example, if the time information mode is the UTC mode, then the integrated value of the leap second is set as the offset value between the standard time (PTP, for example) and UTC. Further, if the time information mode is a PTP mode, for example, a value (a PTP-UTC offset value) for converting PTP to UTC is set for an offset value between standard time (PTP, for example) and the discontinuous time (UTC, for example).

Still further, if the time information mode is the local time, for example, a value (a value including both the leap second and the summer time (DST)) obtained by adding the integrated value of the leap second and the variation of the summer time (DST) together is set to the offset value between the standard time (PTP, for example) and the local time.

An 8-bit nextTimeJumpday, an 8-bit nextTimeJumphour, a 16-bit timeJumpValue, and a 3-bit timeJumpType are discontinuous time information.

A date on which the time becomes discontinuous next is set to nextTimeJumpday. An hour at which the time becomes discontinuous next is set to nextJumphour. A variation of the time that becomes discontinuous next is set to timeJumpValue.

A type of the time at which the time becomes discontinuous text is set to timeJumpType. For example, if "0" is set for this timeJumpType, the type of time at which the time becomes discontinuous next is the leap second and the information associated with the leap second is included in the discontinuous time information. Further, if "1" is set for timeJumpType, the type of the time at which the time becomes discontinuous next is the summer time (DST) and the information associated with the summer time (DST) is included in the discontinuous time information.

A 5-bit media_timezone is component timezone information. A 5-bit esg_timezone is ESG time zone information. It should be noted that a 3-bit reserved is an undefined area.

It should be noted that the syntax of the time information metadata depicted in FIG. 24 is illustrative only; therefore, new information may be added to or a part of information may be deleted from this time information metadata. For example, as described above with reference to FIG. 20, if a leap second occurrence time or the like is notified with a leap second flag (Leap_second_flag), a leap second flag may be added to the time information metadata instead of the discontinuous time information or the offset information.

To be more specific, in this case, Leap_second_flag[0] indicative of a time at which the leap second occurs and Leap_second_flag[1] indicative of the insertion or the deletion of the leap second are added. It should be noted that, for example, if "0" is set as Leap_second_flag[1], it may indicate that the leap second is inserted (+1 second); if "1" is set as Leap_second_flag[1], it may indicate that the leap second is deleted (−1 second).

It should be noted that, in FIG. 24, in the bit train representation (Mnemonic), "uimsbf" is the abbreviation of "unsigned integer most significant bit first" denoting that the result of bit computation is handled as an integer. Further, "bslbf" is the abbreviation of "bit string, left bit first" denoting this is handled as a bit string. Still further, "tcimsbf" is the abbreviation of "two's complement integer, most significant first."

<3. Transmission Scheme of Time Information Metadata>

(Over View of the Transmission Scheme of Time Information Metadata)

FIG. 25 depicts a diagram illustrating an overview of the transmission scheme of time information metadata.

The time information metadata can be transmitted by use of any one of the following six transmission schemes (A) through (F).

(A) Descriptor transmission scheme
(B) ALP additional header transmission scheme
(C) L2 signaling header transmission scheme
(D) L2 signaling transmission scheme
(E) BBP additional header transmission scheme
(F) L1 signaling transmission scheme Meanwhile, in ATSC3.0, it is determined mainly to employ I/UDP, namely, the scheme (hereafter referred to as IP transmission scheme) that uses IP (Internet Protocol) packets including, namely UDP (User Datagram Protocol) packets, rather than TS (Transport System) packets. Further, with broadcasting standards other than ATSC3.0, the employment of IP transmission scheme is expected in the future.

In ATSC3.0, the use of ROUTE (Real-Time Object Delivery over Unidirectional Transport) is assumed for a transport protocol.

Here, ROUTE is a protocol that is an extension of FLUTE (File Delivery over Unidirectional Transport) that is suited for the multi-cast transfer of binary files in one direction. Use of this ROUTE session allows the transmission of video and audio components and signaling.

Further, in ATSC3.0, the use of the LLS (Link Layer Signaling) signaling and the SLS (Service Layer Signaling) signaling is assumed for signaling. The LLS signaling is a signaling that is obtained before the SLS signaling and the SLS signaling is obtained in accordance with the information included in LLS signaling.

This LLS signaling includes such metadata as SLT (Service List Table) and EAT (Emergency Alerting Table), RRT (Region Rating Table), for example.

The SLT metadata includes the information indicative of configurations of a stream and a service in a broadcasting network, such as the information (selection information) necessary for selecting services. The EAT metadata includes the information related with the emergency information that is the information to be alerted in emergency. The RRT metadata includes the information related with rating. ESG (Electronic Service Guide) is an electronic program table.

Further, the SLS signaling includes metadata such as USBD (User Service Bundle Description) or USD (User Service Description), S-TSID (Service-based Transport Session Instance Description), and MPD (Media Presentation Description) for each service, for example.

The USBD or USD metadata includes the information such as the destinations of acquisition of other metadata. The S-TSID metadata is an extension of LSID (LCT Session Instance Description) to ATSC3.0 and provides the control information of the ROUTE protocol. The MPD metadata is the control information for managing the reproduction of a component stream.

It should be noted that the metadata such as USBD, USD, S-TSID, and MPD are described with a markup language such as XML (Extensible Markup Language) or the like.

Further, the MPD metadata is compliant with the standard of MPEG-DASH (Dynamic Adaptive Streaming over HTTP).

Figure 26:
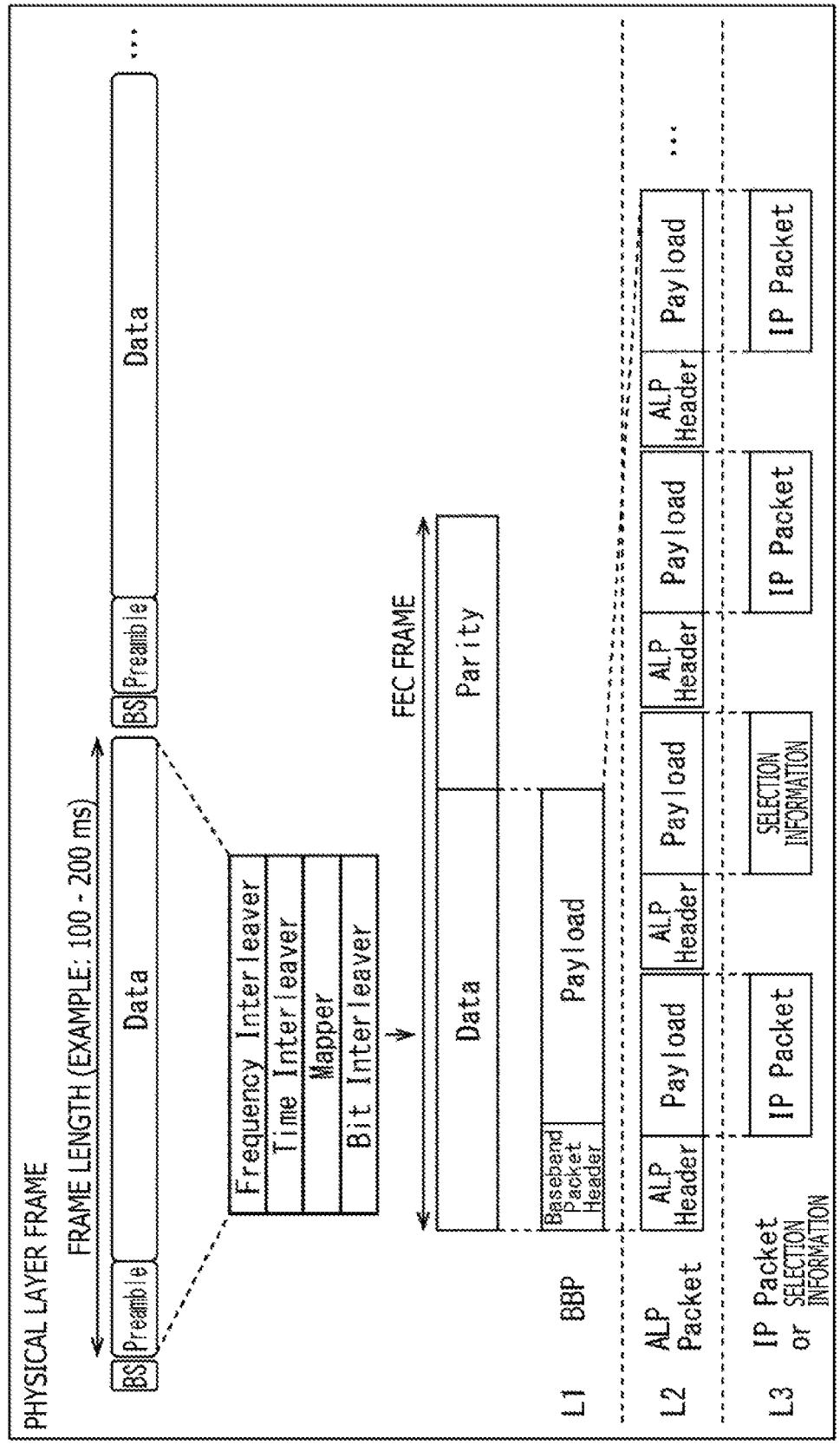
FIG. 26 is a diagram illustrating a structure of each layer.

Here, as depicted in FIG. 26, in a protocol stack of the IP transmission scheme, the layer 1 (L1) that is a physical layer, the layer 2 (L2) that is an upper layer of the layer 1, and the layer 3 (L3) that is an upper layer of the layer 2 are structured in a hierarchical manner.

An IP packet is configured by an IP header (IP Header) and a payload (Payload). In the payload of each IP packet, the data of video and audio components and the data of signaling such as the SLS signaling are arranged. Here, if the descriptor transmission scheme is used, the time information metadata as a descriptor is arranged in the payload of an IP packet, for example.

In the layer 2 (L2), an ALP packet (ALP (ATSC Link-layer Protocol) Packet) is transmitted as a transmission packet. The ALP packet is configured by an ALP header (ALP Header) and a payload (Payload). In the payload of the ALP packet, one or more IP packets or selection information is arranged to be encapsulated (encapsulation).

Here, if the ALP additional header transmission scheme is used the time information metadata is arranged in the additional header of this ALP packet. If the L2 signaling header transmission scheme is used, the time information metadata is arranged in the header of the L2 signaling that is arranged in the payload of the ALP packet. Further, if the L2 signaling transmission scheme is used, the time information metadata as the L2 signaling is arranged in the payload of the ALP packet.

In the layer 1 (L1), BBP (Baseband Packet) as a transmission packet is transmitted. The BBP is configured by a BBP header (Baseband Packet Header) and a payload (Payload). In the payload of BBP, one or more ALP packets are arranged to be encapsulated. Here, if the BBP additional header transmission scheme is used, the time information metadata is arranged in this BBP additional header.

Further, in the layer 1, the data (Data) obtained by scrambling one or more BBPs is mapped onto an FEC frame (FEC Frame) to which an error correction parity (Parity) in the physical layer is added.

Here, the physical layer frame (Physical Frame) of the layer 1 (L1) is configured by a preamble (Preamble) and a data part (Data). Further, onto the data part of the physical layer frame, the data that is obtained by executing the processing (modulation processing) of the physical layer such as bit-interleaving two or more FEC frames and then interleaving in the time direction and the frequency direction is mapped.

Here, if the L1 signaling transmission scheme is used, the time information metadata as the L1 signaling is arranged in the bootstrap or the preamble of the physical layer frame. It should be noted that the frame length of the physical layer frame is 100 to 200 ms, for example.

In what follows detail contents of the six transmission schemes (A) through (F) depicted in FIG. 25 will be described.

(A) Descriptor Transmission Scheme

First, the description transmission scheme is described with reference to FIG. 27. In this description transmission scheme, the time information metadata (time_info) as a descriptor is transmitted by the IP packet including a UDP packet as with the LLS signaling, for example.

In the time information metadata (the descriptor) depicted in FIG. 27, an 8-bit time_info_id, a 3-bit time_mode, a 5-bit timezone, a 16-bit timeOffset, an 8-bit nextTimeJumpday, an 8-bit nextTimeJumphour, a 16-bit timeJumpValue, a 3-bit timeJumpType, a 5-bit media_timezone, and a 5-bit esg_timezone.

To the 8-bit time_info_id, the ID indicative of the type of this descriptor is set. It should be noted that the information other than time_info_id is similar to the information included in the time information metadata depicted in FIG. 24, so that the description thereof is skipped here.

As described above, by use of the descriptor transmission scheme for the transmission format for transmitting the time information metadata so as to transmit the descriptor including the time information metadata by IP packets, the time information metadata (the descriptor) included in the IP packets is extracted in the receiving apparatus 20 (FIG. 1), so that, on the basis of this time information metadata, the time information processing in accordance with the time information mode can be executed.

(B) ALP Additional Header Transmission Scheme

Next, the ALP additional header transmission scheme is described with reference to FIG. 28 and FIG. 29. In this ALP additional header transmission scheme, time information metadata is transmitted by use of the ALP additional header.

Figure 28:
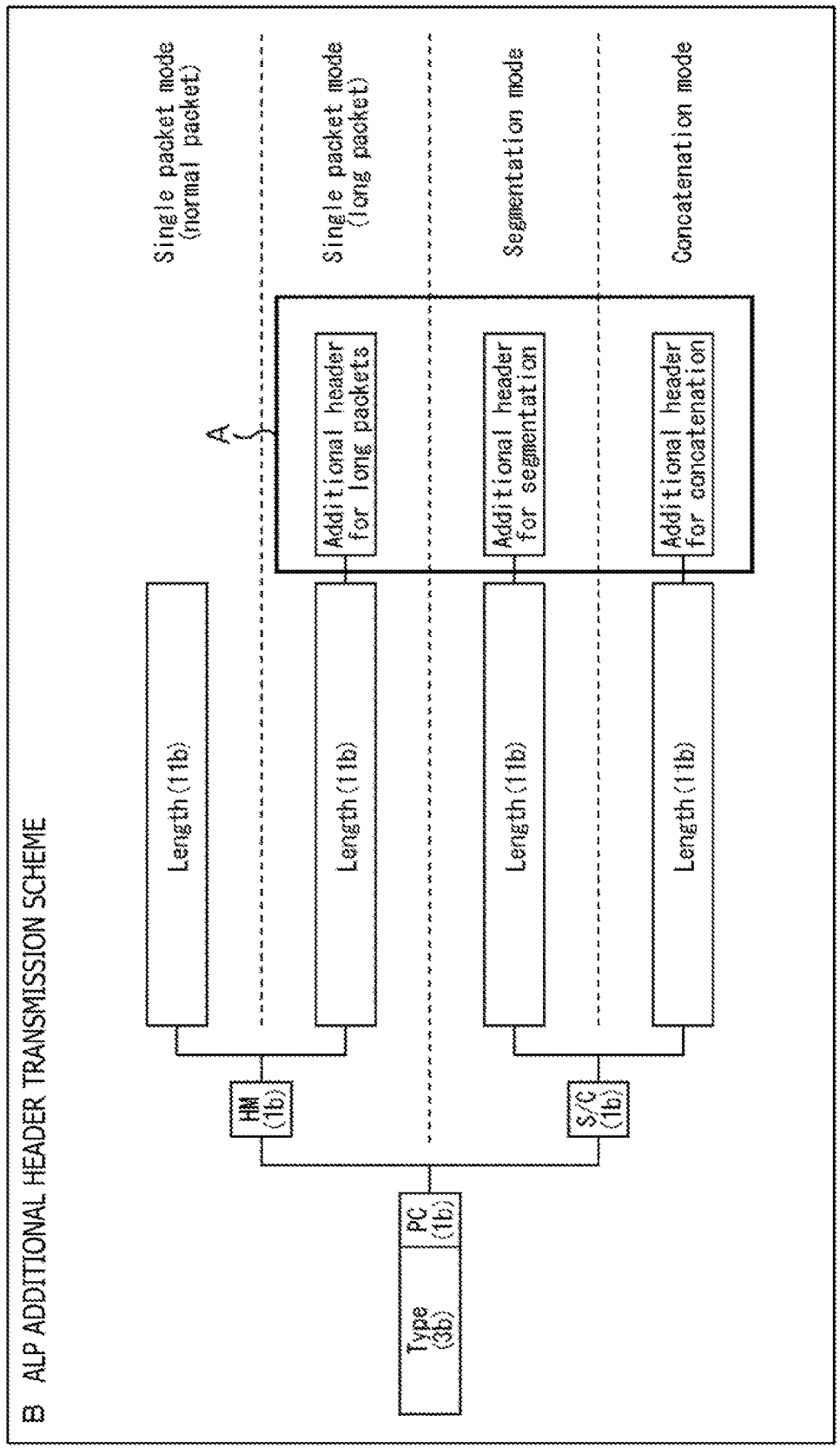
FIG. 28 is a diagram illustrating an ALP additional header transmission scheme.

FIG. 28 depicts a diagram illustrating the configuration of the ALP packet. In the ALP packet depicted in FIG. 28, 3-bit type information (Type) is set to the beginning of the ALP header. To this type information, the information related with the type of the data that is arranged in the payload of the ALP packet is set.

In the ALP header, the type information is followed by 1-bit packet setting information (PC: Packet Configuration) is arranged. If "0" is set for the packet setting information, the single packet mode (Single packet mode) is provided in accordance with the 1-bit header mode (HM: Header Mode) arranged next, 11-bit length information (Length) and the additional header (Additional header) being arranged in the ALP header. Further, in the ALP packet, the payload is arranged next to the ALP header.

It should be noted that, in the single packet mode, the ALP packet in which the additional header is not arranged is referred to a normal packet (normal packet), while the ALP packet in the additional header is arranged is referred to as a long packet (long packet).

On the other hand, if "1" is set as the packet setting information (PC), then the segmentation mode (Segmentation mode) or the concatenation mode (Concatenation mode) is provided in accordance with 1-bit S/C (Segmentation/Concatenation) that is arranged next, the 11-bit length information (Length) and the additional header (Additional header) being arranged in the ALP header.

Here, in the ALP additional header transmission scheme, the time information metadata is arranged in the additional header (Additional header) enclosed by frame A depicted in the diagram. That is, in the case of the single packet mode (the long packet) and the segmentation mode, if "1" is set as an optional additional header flag (OHF: Optional Header Extension Flag) in the additional header, an optional header (Optional Header) is arranged. In the case of the concatenation mode, if "1" is set as a sub-stream identifier flag (SIF: Sub-stream Identifier Flag) in the additional header, the optional header is arranged.

Figure 29:
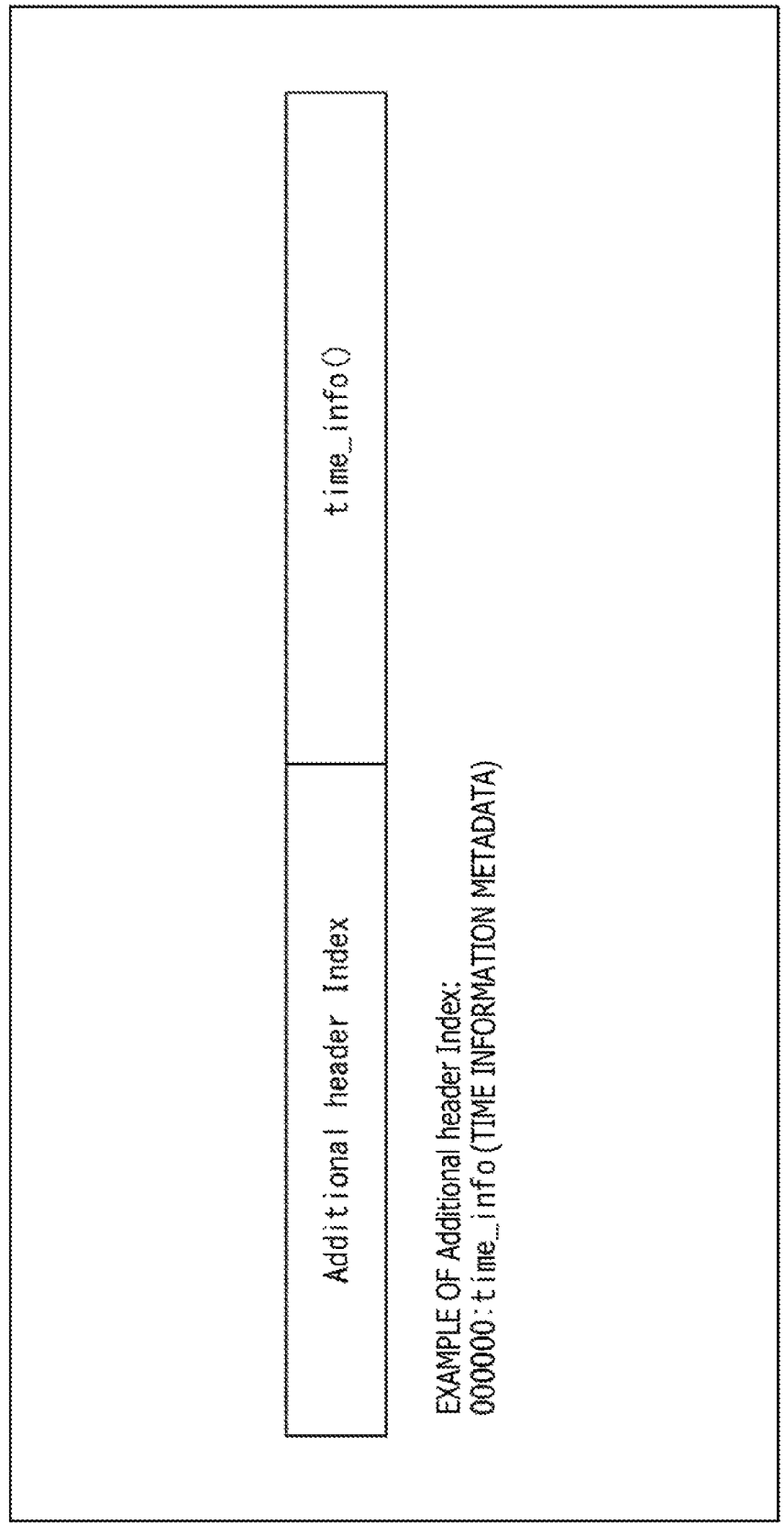
FIG. 29 is a diagram illustrating an ALP additional header transmission scheme.

In this optional header, a structural body depicted in FIG. 29 can be arranged. In the structural body depicted in FIG. 29, various kinds of information is arranged for each of the additional header index information (Additional header Index). For example, if "000000" is set as the additional header index information, then the arrangement of the time information metadata (time_info) in the optional header can be defined. Here, the time information metadata indicated in FIG. 24 can be arranged.

As described above, by transmitting the time information metadata as arranged in the additional header of an ALP packet by use of the ALP additional header transmission scheme as the transmission format for transmitting the time information metadata, the time information metadata arranged in the additional header of the ALP packet is extracted in the receiving apparatus 20 (FIG. 1), so that the time information processing in accordance with the time information mode can be executed on the basis of this time information metadata.

(C) L2 Signaling Header Transmission Scheme

Figure 30:
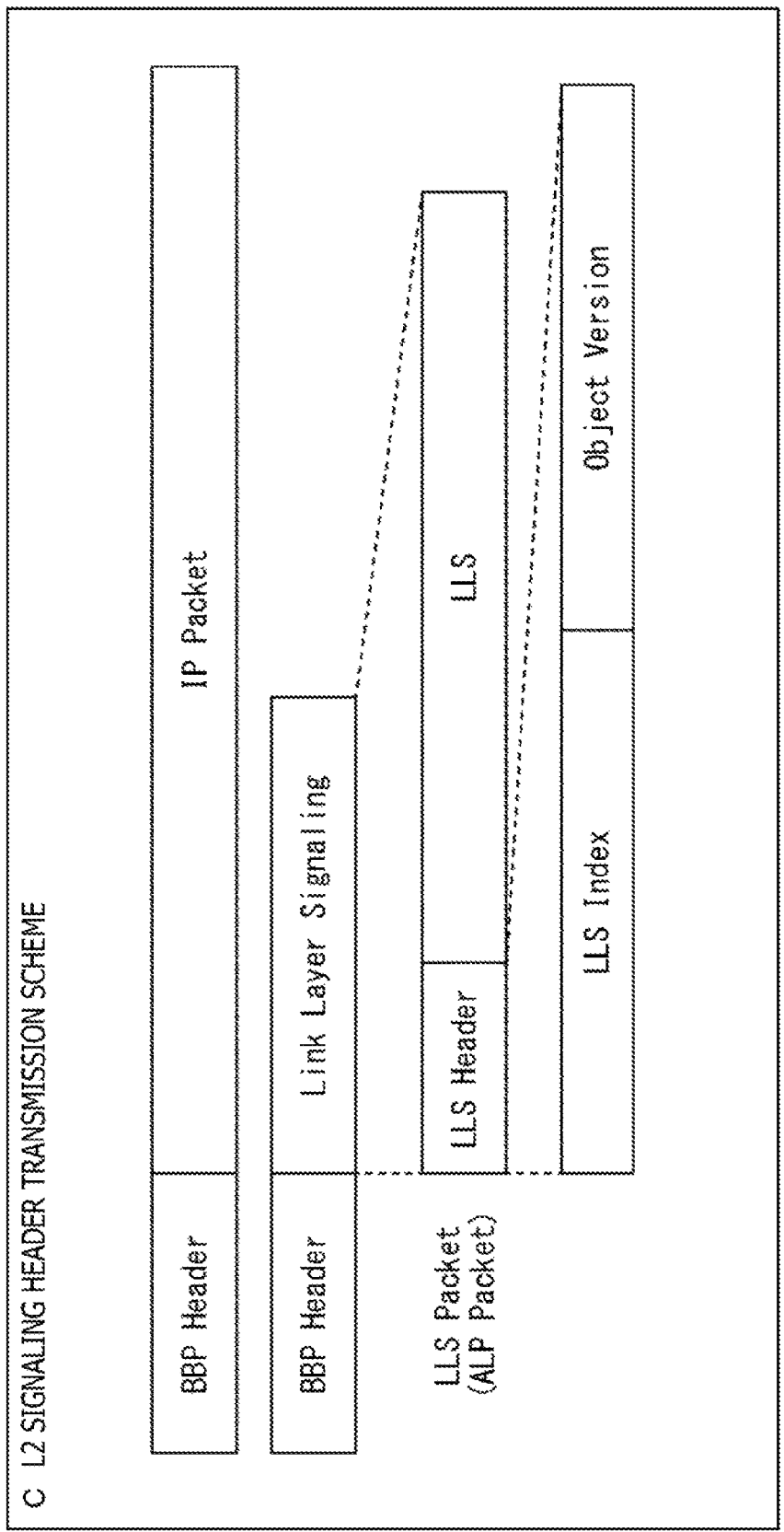
FIG. 30 is a diagram illustrating an L2 signaling header transmission scheme.

The following describes the L2 signaling header transmission scheme with reference to FIG. 30 and FIG. 31. In this L2 signaling header transmission scheme, the time information metadata is transmitted by use of the header of the L2 signaling.

FIG. 30 depicts a diagram illustrating a configuration of an LLS (Link Layer Signaling) packet as an ALP packet of layer 2.

As depicted in FIG. 30, IP packets and L2 signaling are arranged in the payload of an ALP packet; however, in this example, the case in which the LLS signaling is arranged for the L2 signaling is depicted. The LLS signaling is the signaling that is obtained prior to the SLS signaling. For this LLS signaling, the metadata such as SLT, EAT, and PRT are included.

Here, if the LLS signaling is arranged in the payload of an ALP packet, then this ALP packet may also be said to be an LLS packet (LLS Packet). This LLS packet is configured by an LLS header (LLS Header) and a payload in which the LLS signaling (LLS) is arranged. In addition, in this case, one or more LLS packets are arranged in the payload of BBP to be encapsulated.

A structural body including of LLS index information (LLS Index) and object version information (Object Version) can be arranged in the LLS header.

In the LLS index information, compression information (Compression Scheme), type information (Fragment Type), and extension type information (Type Extension) are arranged. To the compression information, the information indicative of compression or non-compression of the target LLS signaling is set. For example, if "0000" is set, it indicates non-compression; if "0001" is set, it indicates that the compression is done in zip format.

To the type information (Fragment Type), the information associated with the type of LLS signaling is set. For example, "000000" can be set to SLT, "000001" to EAT, and "000010" to RRT. To the extension type information, an extension parameter for each type is set. Further, in the object version information, the information associated with the version of an object is arranged.

Moreover, the structural body to be arranged in the LLS header can include the time information metadata (time_info) in addition to the LLS index information and the object version information as depicted in FIG. 31. Here, the time information metadata indicated in FIG. 24 can be arranged.

As described above, by transmitting the time information metadata as arranged in the header of L2 signaling by use of the L2 signaling header transmission scheme as the transmission format for transmitting the time information metadata, the time information metadata arranged in the header of L2 signaling is extracted in the receiving apparatus 20 (FIG. 1), so that the time information processing in accordance with the time information mode can be executed on the basis of this time information metadata.

(D) L2 Signaling Transmission Scheme

The following describes the L2 signaling transmission scheme with reference to FIG. 32. In this L2 signaling transmission scheme, the time information metadata is transmitted by use of the main body of the L2 signaling that is arranged in the payload of an ALP packet.

The time information metadata (the L2 signaling) depicted in FIG. 32 includes an 8-bit time_info_id, a 3-bit time_mode, a 5-bit timezone, a 16-bit timeOffset, an 8-bit nextTimeJumpday, an 8-bit nextTimeJumphour, a 16-bit timeJumpValue, a 3-bit timeJumpType, a 5-bit media_timezone, and a 5-bit esg_timezone.

It should be noted that the information included in the time information metadata depicted in FIG. 32 is similar to the information included in the time information metadata depicted in FIG. 24 or FIG. 27, so that the description thereof is skipped.

Further, here, the time information metadata itself depicted in FIG. 32 may be arranged as L2 signaling into the payload of an ALP packet or the time information metadata depicted in FIG. 32 may be included in the L2 signaling (the LLS signaling, for example) arranged in the payload of an ALP packet.

As described above, by transmitting the time information metadata as arranged in the main body of L2 signaling by use of the L2 signaling transmission scheme as the transmission format for transmitting the time information metadata, the time information metadata arranged in the main body of L2 signaling is extracted in the receiving apparatus 20 (FIG. 1), so that the time information processing in accordance with the time information mode can be executed on the basis of this time information metadata.

(E) BBP Additional Header Transmission Scheme

The following describes the BBP additional header scheme with reference to FIG. 33 through FIG. 36. In this BBP additional header transmission scheme, the time information metadata is transmitted by use of the BBP additional header.

Figure 33:
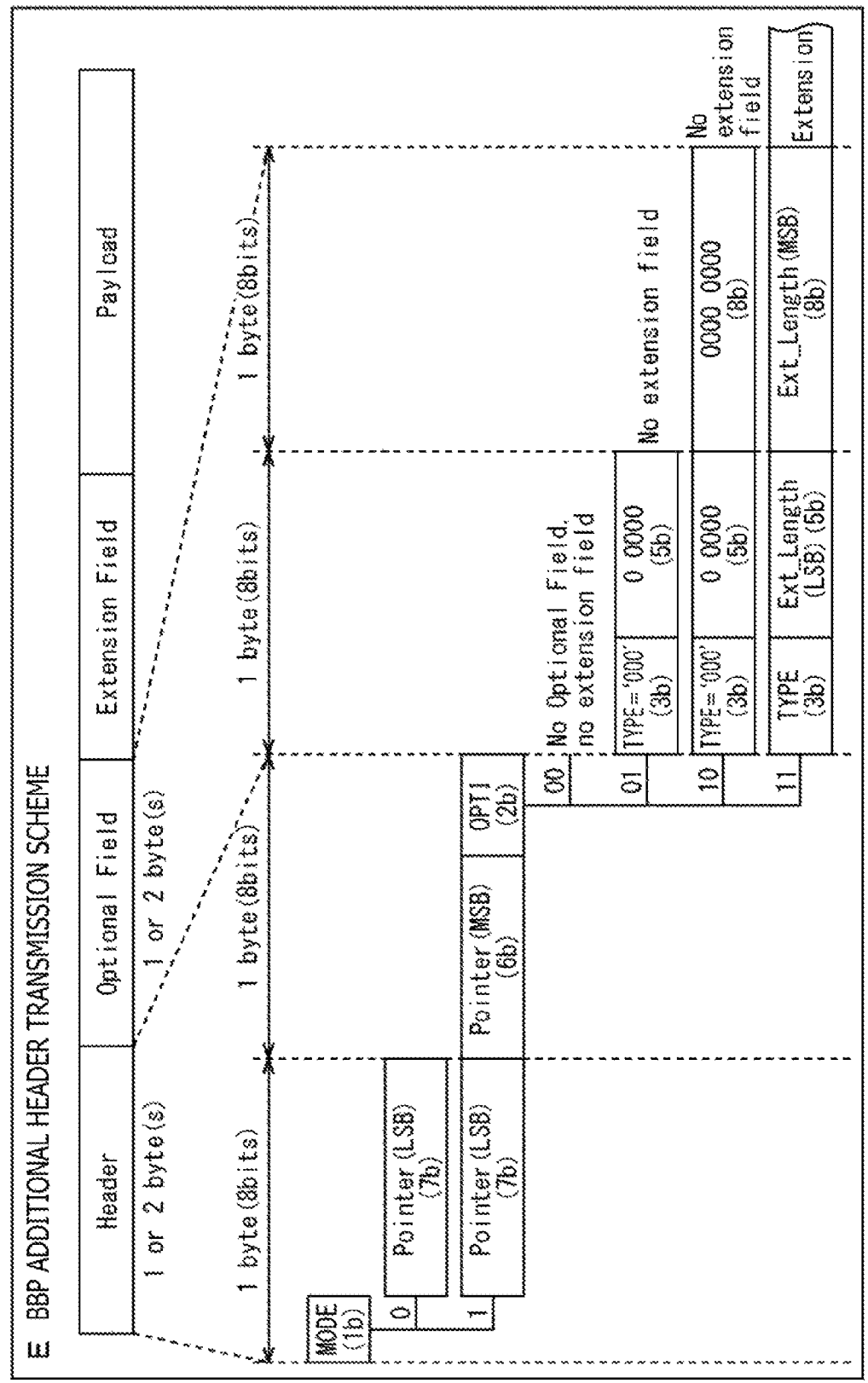
FIG. 33 is a diagram illustrating a BBP additional header transmission scheme.

FIG. 33 depicts a diagram illustrating a configuration of BBP (Baseband Packet). In FIG. 33, BBP is configured by a BBP header and a payload (Payload). In the BBP header, an optional field (Optional Field) and an extension field (Extension Field) can be arranged in addition to a 1-byte or 2-byte header (Header).

That is, if "0" is set for the 1-bit mode (MODE) in the header (Header), then 7-bit pointer information (Pointer (LSB)) is arranged. It should be noted that the pointer information is information indicative of the position of the ALP packet that is arranged in the payload of BBP. For example, if the data of an ALP packet arranged last in a certain BBP is arranged over to a next BBP, then the positional information of an ALP packet arranged at the beginning of the next BBP can be set as the pointer information.

If "1" is set as the mode (MODE), then 7-bit pointer information (Pointer (LSB)), 6-bit pointer information (Pointer (MSB)), and a 2-bit optional flag (OPTI: OPTIONAL) are arranged. The optional flag provides information indicative whether or not to extend the header by arranging the optional field (Optional Field) and the extension field (Extension Field).

Figure 34:
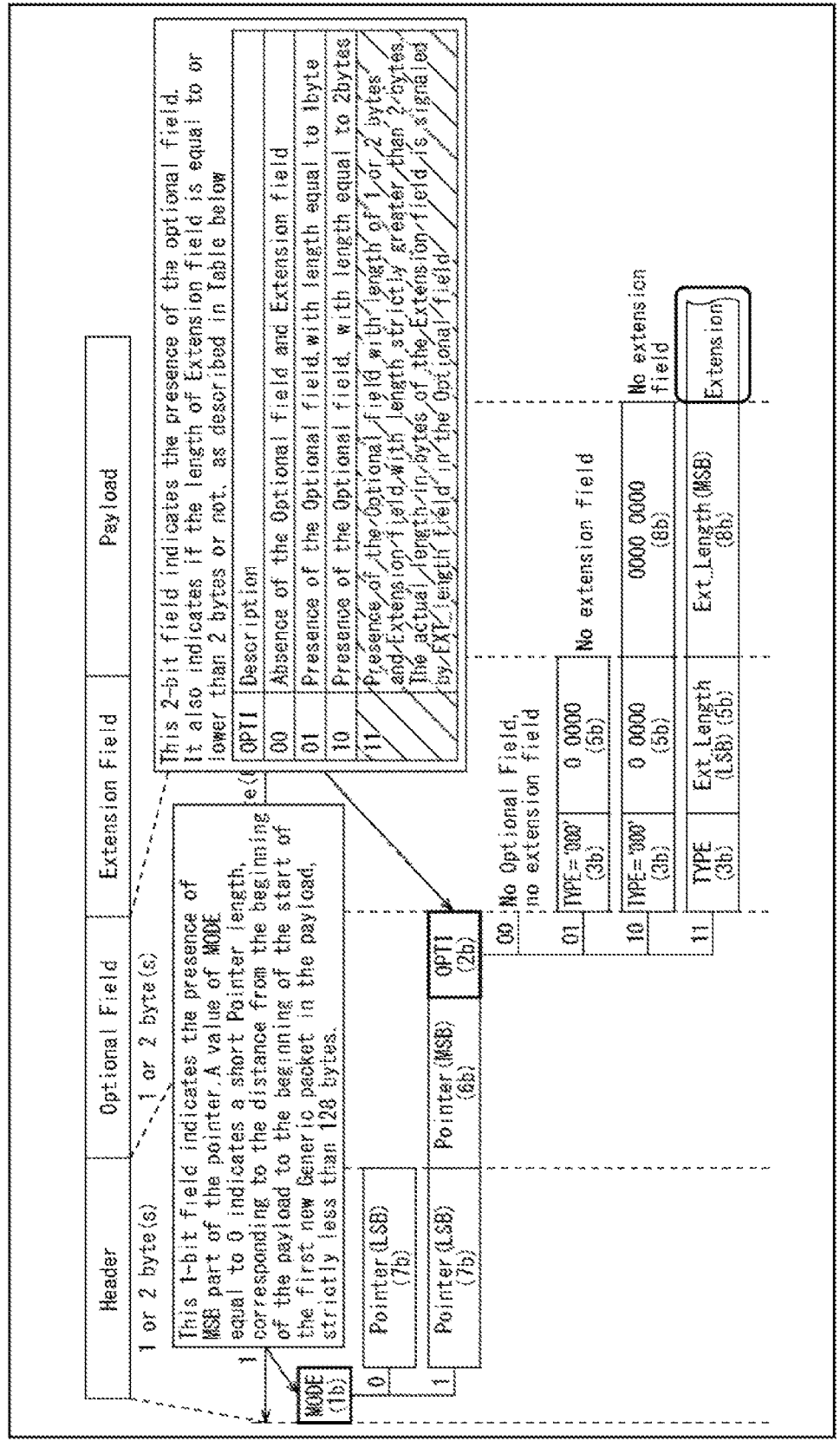
FIG. 34 is a diagram illustrating a BBP additional header transmission scheme.

That is, if the extension of the optional field and the extension field is not done as depicted in FIG. 34, "00" is set to the optional flag. If only the extension of the optional field is done, "01" or "10" is set to the optional flag. It should be noted that, if "01" is set for the optional flag, then 1-byte (8 bits) stuffing is done on the optional field. If "10" is set for the optional flag, then 2-byte (16 bits) stuffing is done on the optional field.

Figure 35:
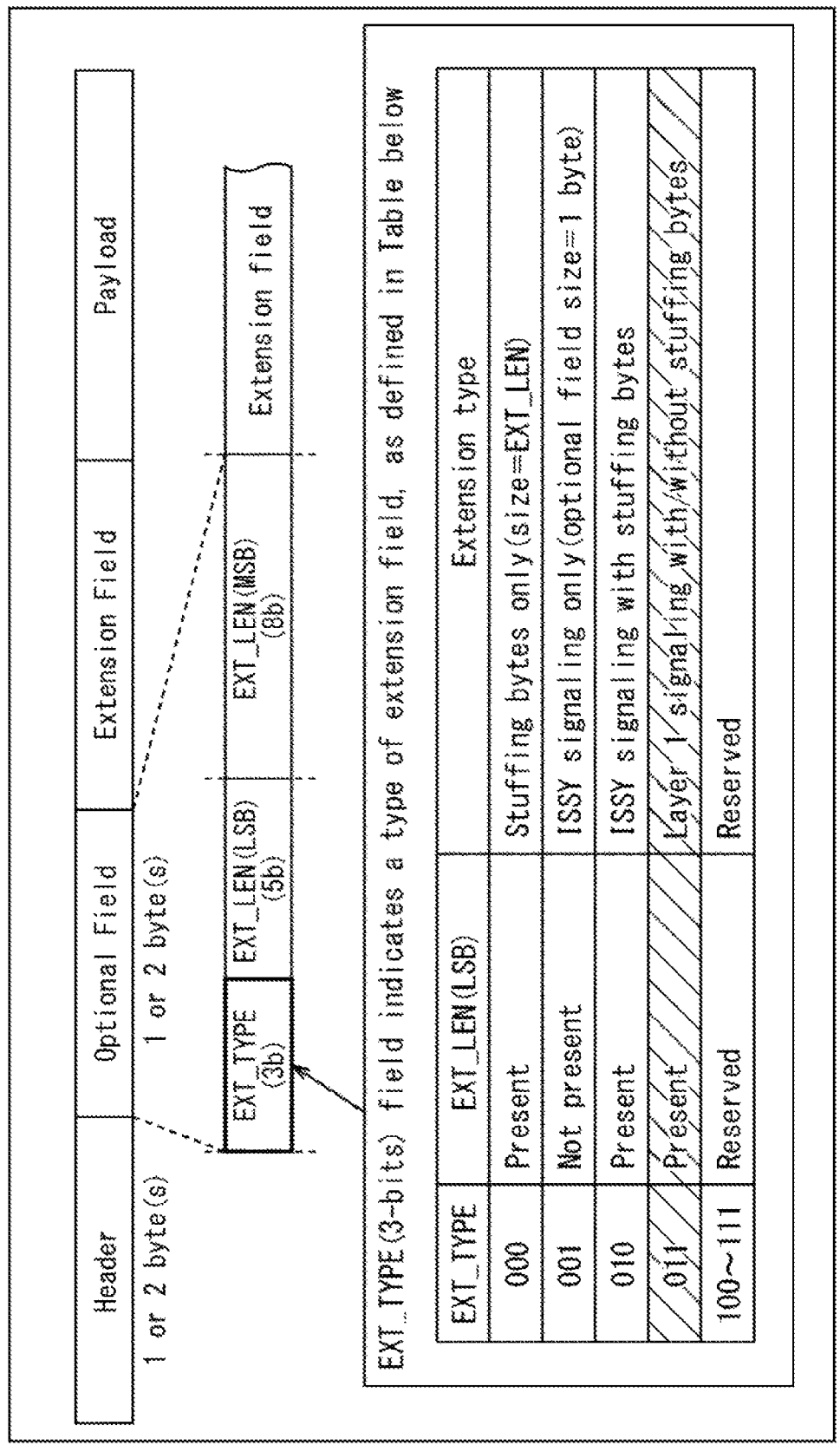
FIG. 35 is a diagram illustrating a BBP additional header transmission scheme.

Further, if the extension of the optional field and the extension field is executed, "11" is set to the optional flag. In this case, 3-bit extension type information (TYPE (EXT_TYPE)) is set to the beginning of the optional field. This type information provides extension length information (EXT_Length (LSB)) and the extension field type (Extension type) that are arranged next to the extension type information as depicted in FIG. 35.

That is, if the extension length information is arranged and only stuffing bytes (Stuffing Bytes) are arranged, "000" is set to the extension type information. Further, if the extension length information is not arranged and ISSY (Input Stream Synchronization) is arranged, "001" is set to the extension type information. Still further, if the extension length information is arranged and stuffing bytes are arranged in the extension field along with ISSY, then "010" is set to the extension type information.

In addition, if the extension length information is arranged and L1 signaling is arranged in the extension field, then "011" is set to the extension type information. In this case, the arrangement of stuffing byes can be done as desired. It should be noted that, in FIG. 35, the extension type information "100" through "111" are left undefined (Reserved).

Then, in the L1 additional header transmission scheme, the time information metadata is arranged as the L1 signaling of this extension field (the BBP additional header). That is, if the BBP additional header transmission scheme is used, "11" is set to the optional flag (OPTI) so as to extend the optional field and the extension field; in addition, "011" is set to the extension type information (EXT_TYPE) of the optional field, thereby arranging the L1 signaling including the time information metadata into the extension field.

Figure 36:
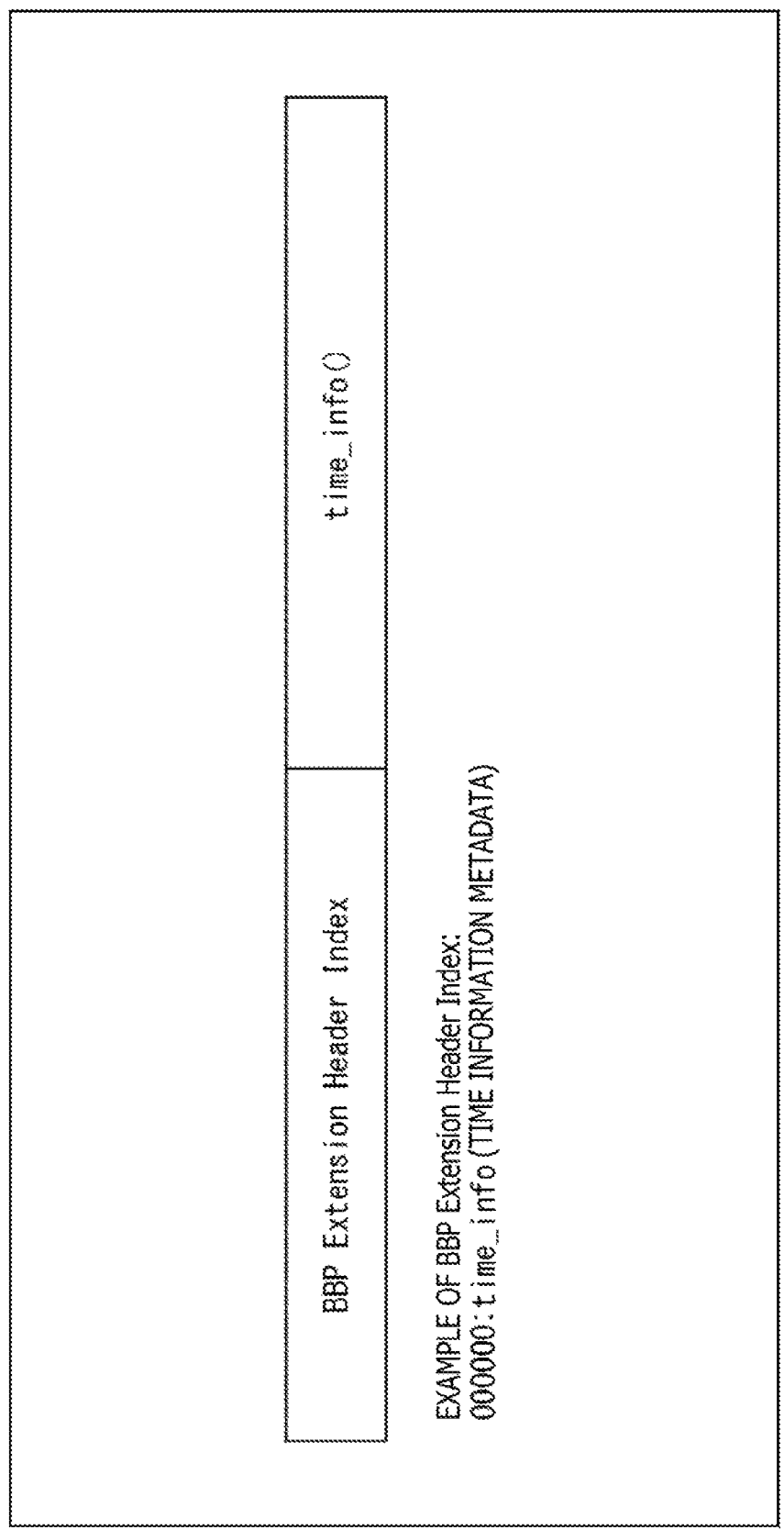
FIG. 36 is a diagram illustrating a BBP additional header transmission scheme.

The structural body depicted in FIG. 36 can be arranged in the extension field. In the structural body depicted in FIG. 36, various kinds of information are arranged for each piece of additional header index information (BBP Additional header Index). If "000000" is set for the additional header index information, then the arrangement of the time information metadata (time_info) in the extension field can be defined. The time information metadata depicted in FIG. 24 can be arranged here.

As described above, by transmitting the time information metadata as arranged in the BBP additional header by use of the BBP additional header transmission scheme as the transmission format for transmitting the time information metadata, the time information metadata arranged in the BBP additional header is extracted in the receiving apparatus 20 (FIG. 1), so that the time information processing in accordance with the time information mode can be executed on the basis of this time information metadata.

(F) L1 Signaling Transmission Scheme

Lastly, the L1 signaling transmission scheme is described with reference to FIG. 37. In this L1 signaling transmission scheme, the time information metadata is transmitted by use of the main body of L1 signaling.

Figure 37:
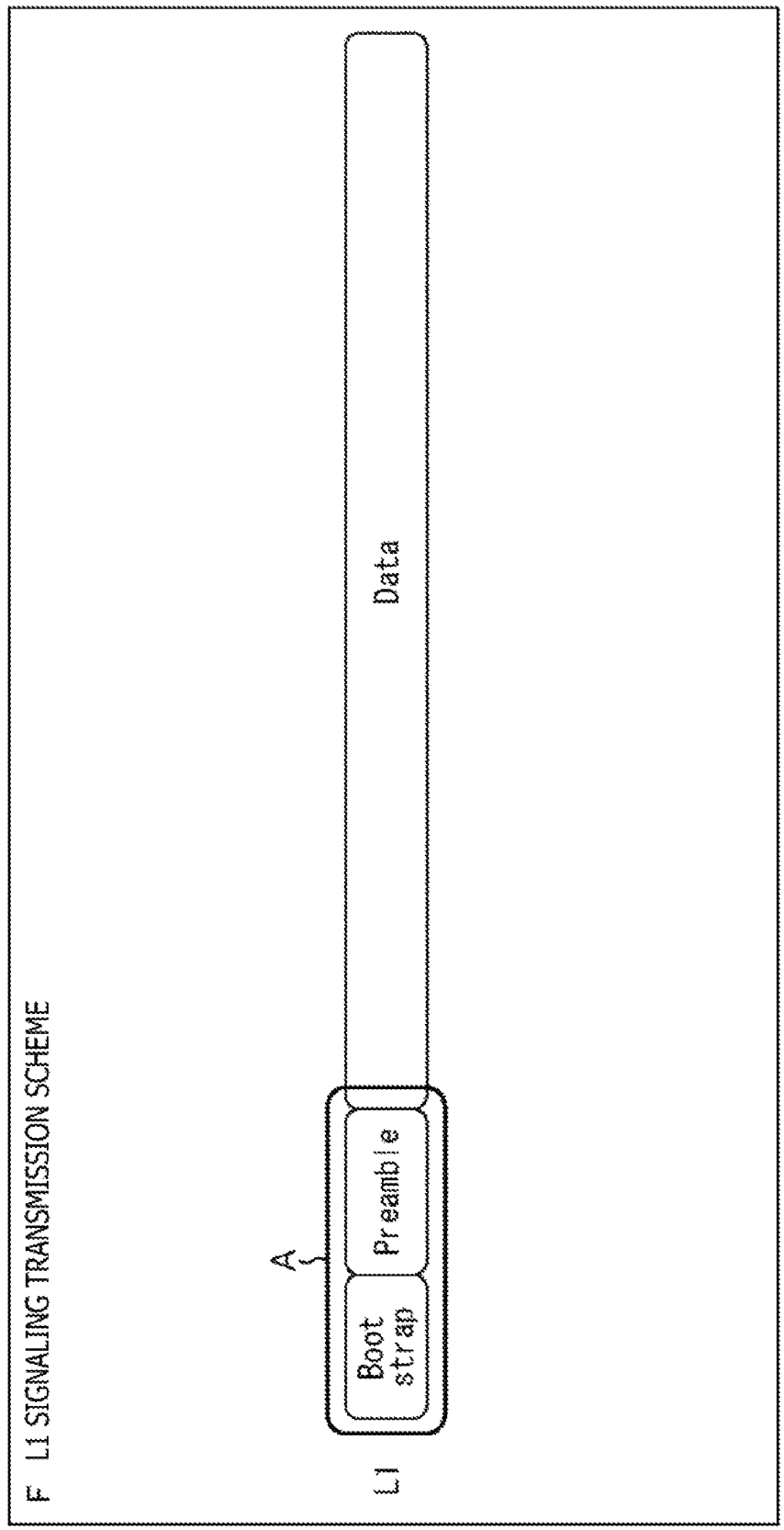
FIG. 37 is a diagram illustrating an L1 signaling transmission scheme.

As depicted in FIG. 37, the physical layer frame is configured by a bootstrap (BS: Bootstrap) and a preamble (Preamble), a data part (Data).

Here, in the L1 signaling transmission scheme, the time information metadata as L1 signaling is arranged in the bootstrap or the preamble enclosed by frame A depicted in the diagram. The time information metadata indicated in FIG. 24 can be arranged here.

It should be noted here that the time information metadata itself depicted in FIG. 24 may be arranged in the bootstrap or the preamble of the physical layer frame or the time information metadata depicted in FIG. 24 may be included in the L1 signaling (L1-post signaling) arranged in the bootstrap or the preamble.

As described above, by transmitting the time information metadata as arranged in the main body of L1 signaling by use of the L1 signaling transmission scheme as the transmission format for transmitting the time information metadata, the time information metadata arranged in the main body of L1 signaling is extracted in the receiving apparatus 20 (FIG. 1), so that the time information processing in accordance with the time information mode can be executed on the basis of this time information metadata.

<4. Flows of Processing to be Executed in Each Apparatus>

Figure 38:
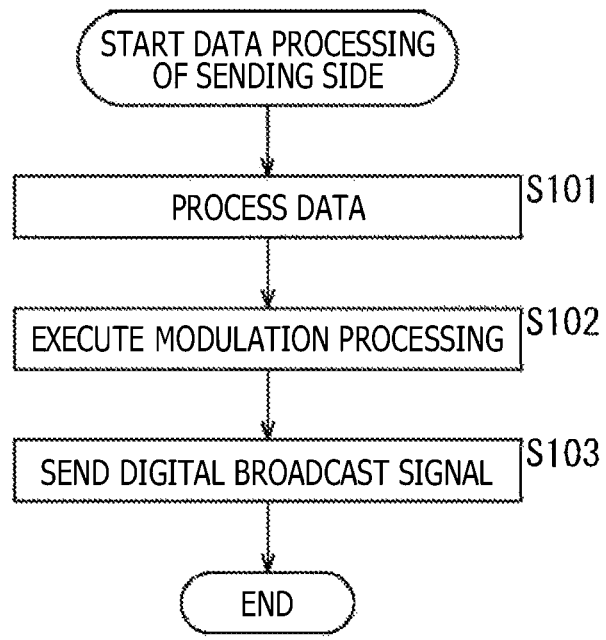
FIG. 38 is a flowchart indicative of a flow of the data processing on the seconding side.
Figure 39:
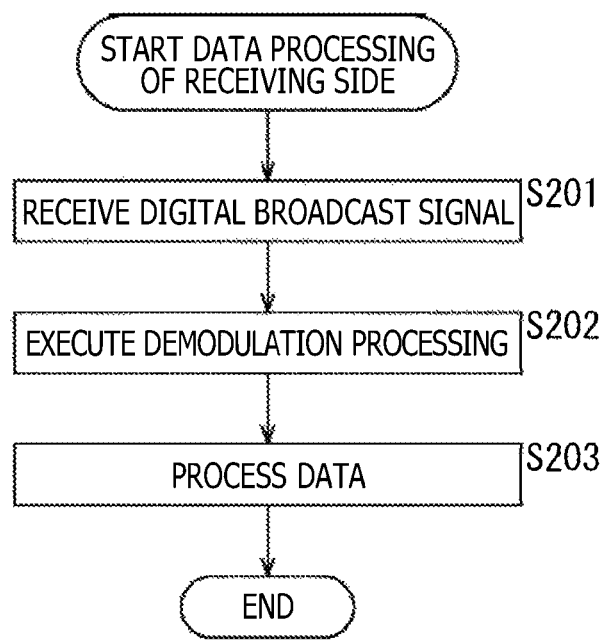
FIG. 39 is a flowchart indicative of a flow of the processing on the receiving side.

The following describes the flows of the data processing operations that are executed in the sending apparatus 10 and the receiving apparatus 20 configuring the transmission system 1 depicted in FIG. 1 with reference to the flowcharts of FIG. 38 and FIG. 39.

(The Data Processing on the Sending Side)

First, with reference to the flowchart depicted in FIG. 38, the flow of the data processing to be executed on the sending side by the sending apparatus 10 depicted in FIG. 1 will be described.

In step S101, the data processing is executed by the blocks; the component processing block 111 through the packet processing block 114.

In this data processing, the data of components is processed by the component processing block 111. Further, the data of an ESG is processed by the ESG processing block 112. Still further, in the processing block 113, the processing for the data of the signaling by the signaling processing block 121 and the processing (the processing on the sending side depicted in FIG. 12 through FIG. 18, for example) for the time information or the time information metadata by the time information processing block 122 are executed. Then, the processed data is stored in packets by the packet processing block 114.

In step S102, the modulation processing block 115 executes modulation processing on the data processed in step S101.

In step S103, the sending block 116 sends a signal obtained by the processing executed in step S102 as a digital broadcast signal via the antenna 131.

The flow of the data processing on the sending side is as described above.

(The Data Processing on the Receiving Side)

Next, as referenced in the flowchart of FIG. 39, the data processing to be executed on the receiving side by the receiving apparatus 20 in FIG. 1 will be described.

In step S201, the receiving block 211 receives the digital broadcast signal sent from the sending apparatus 10 via the antenna 231.

In step S202, the demodulation processing block 212 executes the demodulation processing on the signal processed in step S201.

In step S203, the data processed in step S202 is processed by the processing block 213 through the ESG processing block 216.

In this data processing, the packets are processed by the packet processing block 214. Further, in the processing block 213, the processing for the data of the signaling by the signaling processing block 221 and the processing (the processing on the receiving side depicted in FIG. 12 through FIG. 18, for example) for the time information or the time information metadata by the time information processing block 222 are executed. Still further, the data of components is processed by the component processing block 215 and the data of the ESG is processed by the ESG processing block 216.

The flow of the data processing on the receiving side is as described above.

<5. Variations>

In the description done above, ATSC (especially, ATSC3.0) that is employed in the United States of America and other countries has been described as a standard of digital broadcasting; however, it is also practicable for the present technology to be applied to ISDB (Integrated Services Digital Broadcasting) employed by Japan and other countries and DVB (Digital Video Broadcasting) employed by European countries. In addition, in the description done above, ATSC3.0 in which the IP transmission scheme is employed has been described, for example; however, other schemes such as the MPEG2-TS (Transport Stream) scheme are applicable in addition to the IP transmission scheme.

In such a case, for digital broadcasting, the present technology is applicable to the satellite broadcasting such as BS (Broadcasting Satellite) in addition to terrestrial broadcasting and CS (Communications Satellite) and wired broadcasting such as cable television (CATV).

It should be noted that the above-mentioned terms such as "signaling" and "packet" are illustrative only; namely, these terms may be expressed by other names. However, the difference in the nomenclature is of formality only; namely, the substantial contents of the target signaling or packet do not depend on the nomenclature. For example, BBP (Baseband Packet) may be referred to as BBS (Baseband Stream). In addition, ESG (Electronic Service Guide) may be referred to as EPG (Electronic Program Guide). It should be noted that the content mentioned above may include electronic books, games, and advertisements and all other content in addition to moving images and music.

Further, in the description done above, time information has been mainly described with the information of time specified by UTC, PTP, and local time; however, any given time information such as the information of time specified by NTP (Network Time Protocol) and 3GPP (Third Generation Partnership Project), the information of time included in GPS (Global Positioning System) information, and the information of time having uniquely determined formats may also be used.

Still further, the present technology is also applicable to predetermined standards (standards other than broadcasting standards) specified on the assumption of the use of transmission paths other than broadcasting networks as transmission paths, namely, such communication lines (communication networks) as the Internet and telephone networks. In that case, for the transmission path 30 of the transmission system 1 (FIG. 1), such communication lines as the Internet and telephone networks are used, thereby making the sending apparatus 10 be a server installed on the Internet. Then, by making the receiving apparatus 20 have communication capabilities, the sending apparatus 10 executes the processing on demand from the receiving apparatus 20. Also, the receiving apparatus 20 processes the data sent from the sending apparatus 10 (the server) via the transmission path 30 (the communication line).

<6. Computer Configuration>

The above-mentioned sequence of processing operations can be executed by hardware or software. In the execution of the sequence of processing operations by software, the programs constituting that software are installed on a computer. FIG. 40 illustrates one example of the hardware of a computer for executing the above-mentioned sequence of processing operations by programs.

In a computer 900, a CPU (Central Processing Unit) 901, a ROM (Read Only Memory) 902, and a RAM (Random Access Memory) 903 are interconnected by a bus 904. The bus 904 is further connected with an input/output interface 905. The input/output interface 905 is connected with an input block 906, an output block 907, a recording block 908, a communication block 909, and a drive 910.

The input block 906 includes a keyboard, a mouse, a microphone, and so on. The output block 907 includes a display, a speaker, and so on. The recording block 908 includes a hard disk drive, a nonvolatile memory, and so on. The communication block 909 includes a network interface and so on. The drive 910 drives a removable medium 911 such as a magnetic disc, an optical disc, a magneto-optical disc, or a semiconductor memory.

With the computer 900 configured as described above, the CPU 901 loads programs from the ROM 902 and the recording block 908 into the RAM 903 via the input/output interface 905 and the bus 904, and executes the loaded programs so as to execute the above-mentioned sequence of processing operations.

Programs to be executed by the computer 900 (the CPU 901) may be provided as recorded to the removable medium 911 that is package media or the like. In addition, programs may be provided through wired or wireless transmission media, such as a local area network, the Internet, or digital satellite broadcasting.

With the computer 900, programs can be installed in the storage block 908 via the input/output interface 905 by loading the removable medium 911 on the drive 910. In addition, programs can be installed in the recording block 908 by receiving the programs in the communication block 909 via a wired or wireless transmission medium. Otherwise, programs can be installed in the ROM 902 or the recording block 908 in advance.

In the present description, the processing operations that the computer executes under the control of programs need not always be executed along the sequence described in the flowcharts. That is, the processing operations that the computer executes under the control of programs also include the processing operations (parallel processing or processing by object, for example) that are executed in parallel or discretely. In addition, each program may be processed by one unit computer (processor) or two or more units of computers in a distributed manner.

While preferred embodiments of the present invention have been described using specific terms, such description is for illustrative purpose only, and it is to be understood by those skilled in the art that changes and variations may be made without departing from the spirit or scope of the following claims.

Further, the present technology can also take the following configuration.

(1)

A receiving apparatus including:

a receiving block configured to receive metadata including information for executing processing related with time information in accordance with a mode corresponding to a plurality of pieces of information, and a processing block configured to execute processing related with the time information on the basis of the metadata.

(2)

The receiving apparatus according (1) above, in which the metadata includes information for correcting discontinuous time information to continuous time information in accordance with the mode, and the processing block corrects discontinuous time information to continuous time information on the basis of the metadata.

(3)

The receiving apparatus according to (2) above, in which the metadata includes an offset value between a reference time providing a reference and a discontinuous time that is discontinuous in accordance with the mode.

(4)

The receiving apparatus according to (3) above, in which the metadata includes a date and time at which a time becomes discontinuous next and a variation of a time that becomes discontinuous next in accordance with the mode.

(5)

The receiving apparatus according ay one of (2) through (4) above, in which the discontinuous time information is one of leap second and summer time (DST: Daylight Saving Time) and the plurality of pieces of time information includes at least one of UTC (Coordinated Universal Time), PTP (Precision Time Protocol), and local time.

(6)

The receiving apparatus according to (5) above, in which if the mode is a mode corresponding to UTC, then the offset value is an offset value between reference time and UTC, representing an integrated value of leap second, and the processing block corrects leap second in accordance with the offset value.

(7)

The receiving apparatus according to (5) or (6) above, in which if the mode is a mode corresponding to PTP, then the offset value is an offset value for converting PTP to UTC, and the processing block converts PTP to UTC in accordance with the offset value.

(8)

The receiving apparatus according to (5) through (7) above, in which if the mode is a mode corresponding to local time, then the offset value is an offset value between reference time and local time, representing a value obtained by adding an integrated value of leap second and a variation of summer time (DST) together, and the processing block corrects leap second and summer time (DST) in accordance with the offset value.

(9)

The receiving apparatus according to (1) through (8) above, in which the metadata includes time zone information of one of a component and an electronic program table and the processing block corrects a time zone of one of the component and the electronic program table in accordance with the time zone information of one of the component and the electronic time table.

(10)

The receiving apparatus according to (1) through (9) above, in which a broadcast stream including the metadata is a broadcast stream corresponding to IP (Internet Protocol) transmission scheme, and the metadata is attached to one of a descriptor included in an IP packet including a UDP (User Datagram Protocol) packet, an additional header of a first transmission packet for transmitting the IP packet, an additional header of a second transmission packet for transmitting the first transmission packet, a signaling included in the first transmission packet, a header of the signaling, and a physical layer frame.

(11)

A data processing method of a receiving apparatus, by the receiving apparatus, including the steps of:

receiving metadata including information for executing processing related with time information in accordance with a mode corresponding to a plurality of pieces of information; and executing processing related with the time information on the basis of the metadata.

(12)

A sending apparatus including:

a generation block configured to generate metadata including information for executing processing related with time information in accordance with a mode corresponding to a plurality of pieces of time information; and a sending block configured to send the metadata.

(13)

The sending apparatus according to (12) above, in which the metadata includes information for correcting discontinuous time information to continuous time information in accordance with the mode.

(14)

The sending apparatus according to (13) above, in which the metadata includes an offset value between a reference time providing a reference and a discontinuous time that is discontinuous in accordance with the mode.

(15)

The sending apparatus according to (13) or (14) above, in which the discontinuous time information is one of leap second and summer time (DST), and the plurality of pieces of time information includes at least one of UTC, PTP, and local time.

(16)

The sending apparatus according to (15) above, in which if the mode is a mode corresponding to UTC, then the offset value is an offset value between reference time and UTC, representing an integrated value of leap second, if the mode is a mode corresponding to PTP, then the offset value is an offset value for converting PTP to UTC, and if the mode is a mode corresponding to local time, then the offset value is an offset value between reference time and local time, representing a value obtained by adding an integrated value of leap second and a variation of summer time (DST) together.

(17)

The sending apparatus according to (12) through (16) above, in which a broadcast stream including the metadata is a broadcast stream corresponding to IP transmission scheme, and the metadata is attached to one of a descriptor included in an IP packet including a UDP packet, an additional header of a first transmission packet for transmitting the IP packet, an additional header of a second transmission packet for transmitting the first transmission packet, a signaling included in the first transmission packet, a header of the signaling, and a physical layer frame.

(18)

A data processing method of a sending apparatus, by the sending apparatus, including the steps of:

generating metadata including information for executing processing related with time information in accordance with a mode corresponding to a plurality of pieces of time information; and sending the metadata.

(19)

A receiving apparatus including:

a receiving block configured to receive metadata including information for executing processing related with time information in accordance with a mode corresponding to a plurality of pieces of time information, the metadata including a flag indicative of one of insertion and deletion of leap second;

a counter configured to count a value in accordance with the flag; and a processing block configured to correct leap second of the time information in accordance with a value of the counter.

(20)

A data processing method of a receiving apparatus having a counter, by the receiving apparatus, including:

receiving metadata including information for executing processing related with time information in accordance with a mode corresponding to a plurality of pieces of time information, the metadata including a flag indicative of one of insertion and deletion of leap second;

counting, by the counter, a value in accordance with the flag; and correcting leap second of the time information in accordance with a value of the counter.

REFERENCE SIGNS LIST

1 Transmission system, 10 Sending apparatus, 20 Receiving apparatus, 30 Transmission path, 111 Component processing block, 112 ESG processing block, 113 Processing block, 114 Packet processing block, 115 Modulation processing block, 116 Sending block, 121 Signaling processing block, 122 Time information processing block, 151 Time information conversion block, 211 Receiving block, 212 Demodulation processing block, 213 Processing block, 214 Packet processing block, 215 Component processing block, 216 ESG processing block, 217 Output block, 221 Signaling processing block, 222 Time information processing block, 222A Internal counter, 251 Clock synchronization block, 252 Presentation synchronization block, 253 Time and ESG display processing block, 254 Component time zone correction block, 255 ESG time zone correction block, 900 Computer, 901 CPU

The invention claimed is:

1. A receiving apparatus comprising:
   circuitry configured to:
      receive reference time information and metadata including information for executing processing related to the reference time information; and
      execute processing related to the reference time information based on the metadata, wherein
   the metadata includes:
      a first offset value between the reference time information and a discontinuous time,
      a second offset value between the discontinuous time and a local time, and a date and time at which a change in a daylight savings time (DST) status is to occur, the local time is determined based on the reference time information and the metadata, a broadcast stream including the metadata is a broadcast stream corresponding to an IP (Internet Protocol) transmission scheme, and the metadata is attached to one of a descriptor included in an IP packet including a UDP (User Datagram Protocol) packet, an additional header of a first transmission packet for transmitting the IP packet, an additional header of a second transmission packet for transmitting the first transmission packet, a signaling included in the first transmission packet, a header of the signaling, and a physical layer frame.

2. The receiving apparatus according to claim 1, wherein:
the discontinuous time includes UTC (Coordinated Universal Time), and
the reference time information includes PTP (Precision Time Protocol) time information.

3. The receiving apparatus according to claim 2, wherein:
the metadata includes leap second information, and
the leap second information is used in determining the UTC.

4. The receiving apparatus according to claim 3, wherein the leap second information indicates whether a leap second is to be inserted into or deleted from the UTC.

5. The receiving apparatus according to claim 2, wherein the second offset value indicates a difference in time between the UTC and a time zone.

6. The receiving apparatus according to claim 1, wherein:
the metadata includes time zone information of at least one of a component or an electronic program table, and
the circuitry corrects a time zone of the at least one of the component or the electronic program table in accordance with the time zone information of the at least one of the component or the electronic program table.

7. A method of a receiving apparatus, the method comprising:
receiving reference time information and metadata including information for executing processing related to the reference time information; and
executing processing related to the reference time information based on the metadata, wherein
the metadata includes:
a first offset value between the reference time information and a discontinuous time,
a second offset value between the discontinuous time and a local time, and
a date and time at which a change in a daylight savings time (DST) status is to occur,
the local time is determined based on the reference time information and the metadata,
a broadcast stream including the metadata is a broadcast stream corresponding to an IP (Internet Protocol) transmission scheme, and
the metadata is attached to one of a descriptor included in an IP packet including a UDP (User Datagram Protocol) packet, an additional header of a first transmission packet for transmitting the IP packet, an additional header of a second transmission packet for transmitting the first transmission packet, a signaling included in the first transmission packet, a header of the signaling, and a physical layer frame.

8. The method according to claim 7, wherein:
the discontinuous time includes UTC (Coordinated Universal Time), and
the reference time information includes PTP (Precision Time Protocol) time information.

9. The method according to claim 8, wherein:
the metadata includes leap second information, and
the leap second information is used in determining the UTC.

10. The method according to claim 9, wherein the leap second information indicates whether a leap second is to be inserted into or deleted from the UTC.

11. The method according to claim 8, wherein the second offset value indicates a difference in time between the UTC and a time zone.

12. The method according to claim 7, wherein:
the metadata includes time zone information of at least one of a component or an electronic program table, and
a time zone of the at least one of the component or the electronic program table is corrected in accordance with the time zone information of the at least one of the component or the electronic program table.

13. A non-transitory computer-readable storage medium containing instructions which when executed by a processor cause the processor to perform a method, the method comprising:
receiving reference time information and metadata including information for executing processing related to the reference time information; and
executing processing related to the reference time information based on the metadata, wherein
the metadata includes:
a first offset value between the reference time information and a discontinuous time,
a second offset value between the discontinuous time and a local time, and
a date and time at which a change in a daylight savings time (DST) status is to occur,
the local time is determined based on the reference time information and the metadata,
a broadcast stream including the metadata is a broadcast stream corresponding to an IP (Internet Protocol) transmission scheme, and
the metadata is attached to one of a descriptor included in an IP packet including a UDP (User Datagram Protocol) packet, an additional header of a first transmission packet for transmitting the IP packet, an additional header of a second transmission packet for transmitting the first transmission packet, a signaling included in the first transmission packet, a header of the signaling, and a physical layer frame.

* * * * *